United States Patent [19]
McCarthy

[11] Patent Number: 5,634,613
[45] Date of Patent: Jun. 3, 1997

[54] TIP VORTEX GENERATION TECHNOLOGY FOR CREATING A LIFT ENHANCING AND DRAG REDUCING UPWASH EFFECT

[76] Inventor: Peter T. McCarthy, 134 Park St. #5, Buffalo, N.Y. 14201

[21] Appl. No.: 276,407

[22] Filed: Jul. 18, 1994

[51] Int. Cl.$^6$ ............... B64C 3/10; B64C 5/08; B64C 23/06; B64C 9/06
[52] U.S. Cl. ........... 244/199; 244/35 R; 244/46; 244/130; 244/198; 244/204; 244/212; 244/215; 244/219
[58] Field of Search ............... 244/35, 36, 46, 244/130, 198, 199, 201, 203, 204, 212, 213, 215, 219

[56] References Cited

U.S. PATENT DOCUMENTS

| | | | |
|---|---|---|---|
| 983,967 | 2/1911 | Etrich | 244/35 R |
| 1,011,767 | 12/1911 | Farum | 244/35 R |
| 1,063,805 | 6/1913 | Krause | 244/198 |
| 1,710,673 | 4/1929 | Bonney | 244/215 |
| 2,123,096 | 7/1938 | Charpentier | 244/130 |
| 2,210,642 | 8/1940 | Thompson | 244/35 R |
| 2,576,981 | 12/1951 | Vogt | 244/199 |
| 2,846,165 | 8/1958 | Axelson | 244/199 |

(List continued on next page.)

FOREIGN PATENT DOCUMENTS

| | | | |
|---|---|---|---|
| 482932A | 4/1992 | European Pat. Off. | 244/199 |
| 768392 | 1/1934 | France | 244/91 |
| 509764 | 2/1930 | Germany | 244/199 |
| 1239302A1 | 6/1986 | U.S.S.R. | |

OTHER PUBLICATIONS

Apr.–May 1991 Issue of *National Wildlife* pp. 15–17. "Can Dragons Teach Us To Fly?" by Mariette Nowak.

*Jacques Cousteau: The Ocean World*, New York: H.N. Abrams 1985. Bottom of p. 100. Subject: Gray's Paradox pp. 100–101.

Walton and Katz "Application of Leading–Edge Vortex Manipulations to Reduce Wing Rock Amplitudes" *Journal of Aircraft* vol. 30, No. 4, pp. 555–557.

Traub and Nurick "Effects of Wing–Tip Vortex Flaps" *Journal of Aircraft*, vol. 30, No. 4, pp. 557–559.

Grantz and Marchman III "Trailing Edge Flap Influence on Leading Edge Vortex Flap Aerodynamics" 1983 *Journal of Aircraft* vol. 20, No 2, pp. 165–169.

Rao "An Exploratory Study of Are–Efficient Vortex Flap Concepts" *Journal of Aircraft* vol. 20, No. 12, pp. 1062–1067.

Lamar and Campbell "Vortex Flaps–Advanced Control Devices for Supercruise Fighters" Jan. 1984, Aerospace America.

*Primary Examiner*—Andres Kashnikow
*Assistant Examiner*—Virna Lissi Mojica

[57] ABSTRACT

Methods for using tip generated vortices to improve performance of foils. These methods include generating a substantially streamwise beneficial vortex (74) near the outboard end (60) of a foil (82). This beneficial vortex (74) spins in the opposite direction of an induced drag vortex (62), and is used to create an upwash field (76) which neutralizes induced drag by deflecting the flow behind the trailing edge (56) at an upward angle. Upwash field (76) causes the lift vector (118) on the foil (82) to tilt forward, thereby creating a forward directed force of induced thrust upon the foil (82). Beneficial vortex (74) is also used to contain and compress the high pressure field existing along the attacking surface of the foil (82), and displace the induced drag vortex (62) inboard from the tip of the foil (82). Numerous performance parameters are improved dramatically by using beneficial vortex (74), as well as by using a double vortex pattern (124). Methods for creating, using, and controlling these vortex patterns are offered along with a variety of embodiments for employing such methods. Described embodiments include a twist (66) along the span of a foil (82b), an anhedral tip droop having a divergent axis of droop curvature (86), a movable vortex flap (102), a cone shaped vortex generator (134), a curved outboard droop (146), and a vortex flap network (162). Methods are also disclosed for reducing overall tip vorticity.

66 Claims, 14 Drawing Sheets

U.S. PATENT DOCUMENTS

| | | | |
|---|---|---|---|
| 3,369,775 | 2/1968 | Rethorst | 244/199 |
| 3,411,738 | 11/1968 | Sargent | 244/199 |
| 3,480,234 | 11/1969 | Cronish, III | 244/130 |
| 3,596,854 | 8/1971 | Haney | 244/199 |
| 3,776,363 | 12/1973 | Kuethe | 244/199 |
| 3,904,151 | 9/1975 | Rethorst . | |
| 4,108,403 | 8/1978 | Finch | 244/199 |
| 4,197,869 | 4/1980 | Moncrieff-Yeates | 137/808 |
| 4,293,110 | 10/1981 | Middleton et al. | 244/199 |
| 4,323,209 | 4/1982 | Thompson | 244/199 |
| 4,382,569 | 5/1983 | Boppe et al. | 244/199 |
| 4,444,367 | 4/1984 | Spillman | 244/199 |
| 4,705,240 | 11/1987 | Dixon | 244/199 |
| 4,722,499 | 2/1988 | Klug | 244/199 |
| 4,776,535 | 10/1988 | Paterson et al. | 244/130 |
| 4,776,542 | 10/1988 | Van Dam | 244/198 |
| 4,949,919 | 8/1990 | Wajnikonis | 244/35 R |
| 4,975,022 | 12/1990 | Perry | 244/198 |
| 5,058,837 | 10/1991 | Wheeler | 244/199 |
| 5,074,234 | 12/1991 | Stearns | 244/199 |
| 5,150,859 | 9/1992 | Ransick . | |
| 5,356,094 | 10/1994 | Sylvain | 244/2 |
| 5,366,177 | 11/1994 | DeCoux | 244/204 |

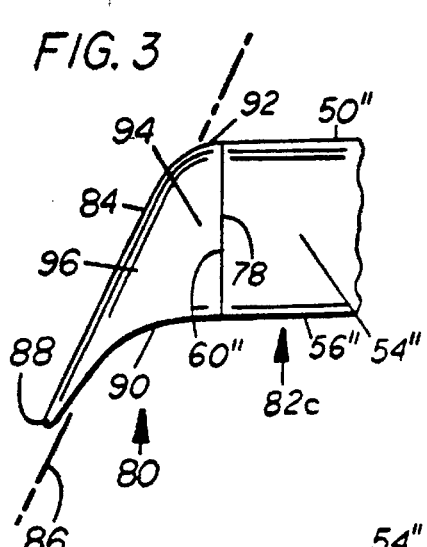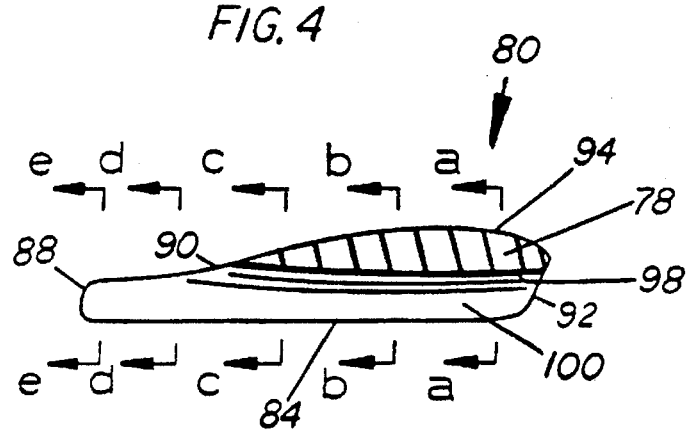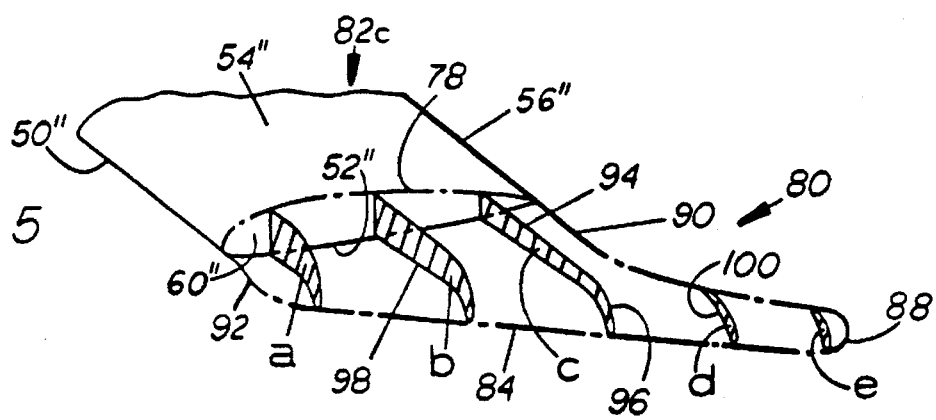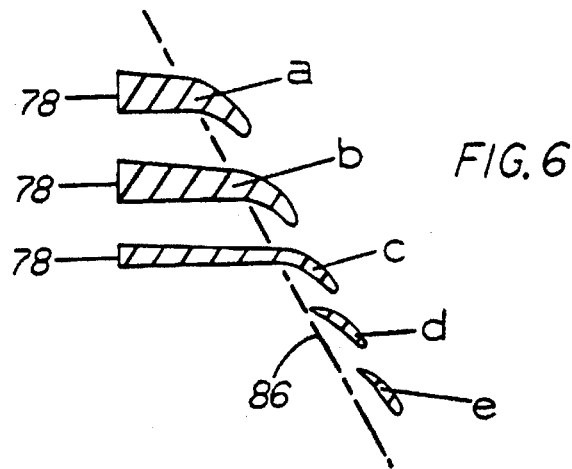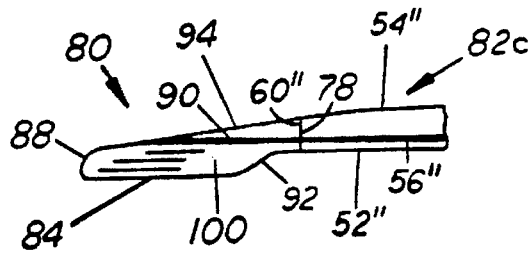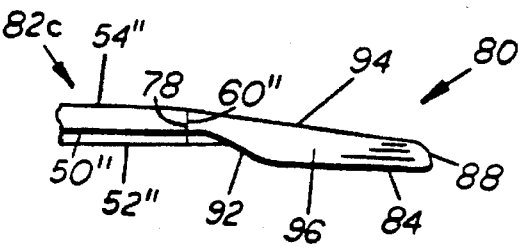

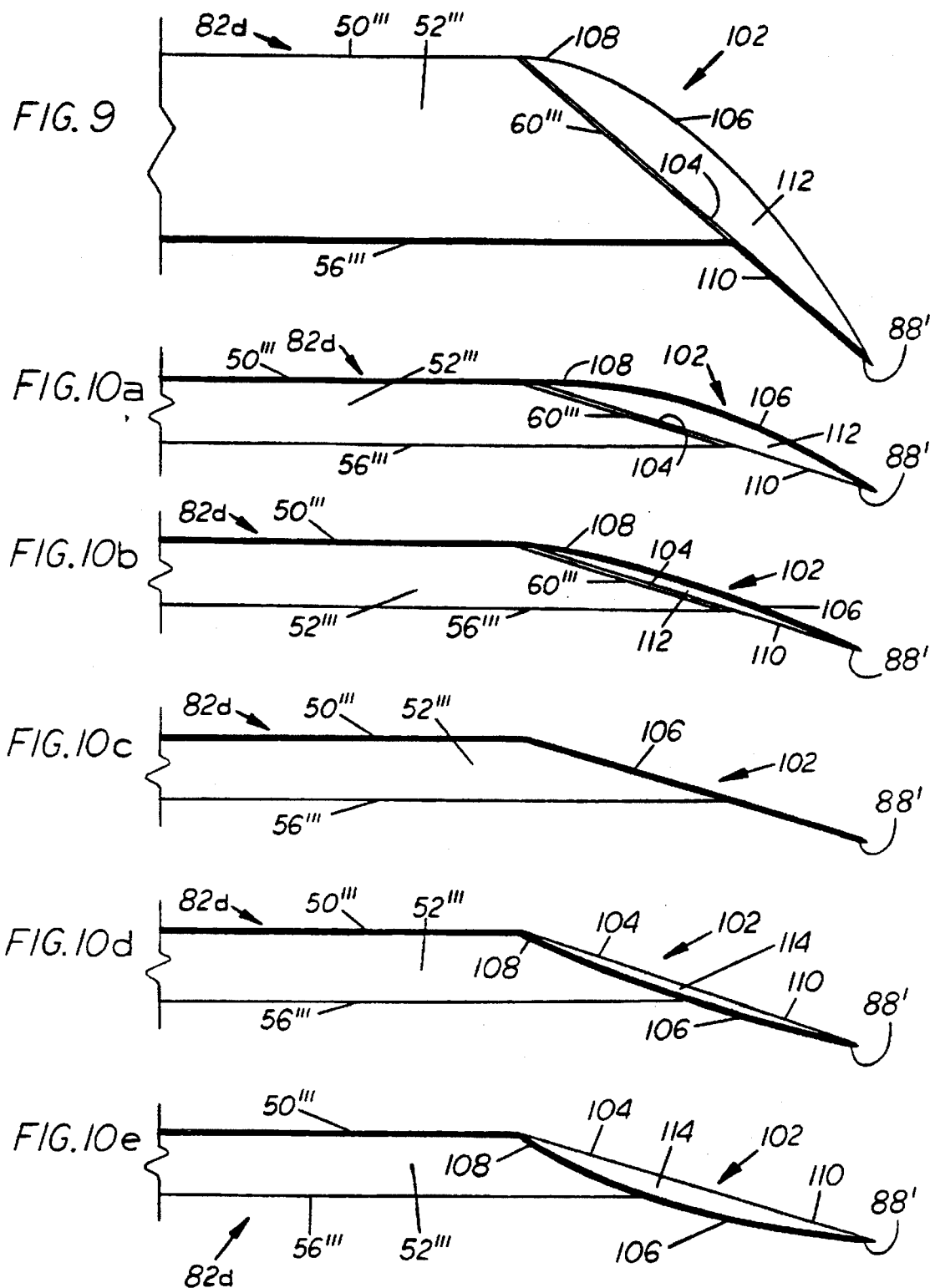

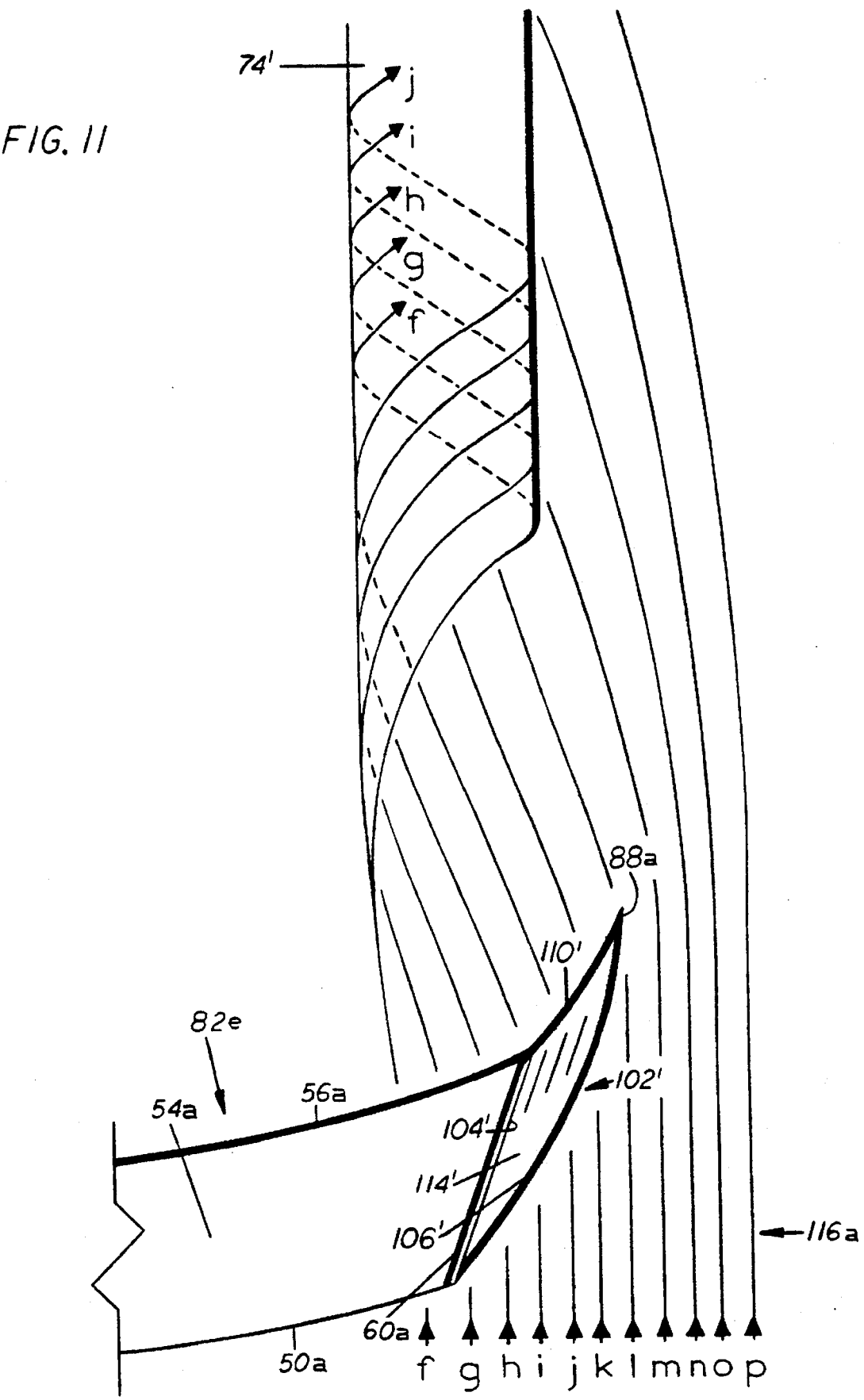

TIP VORTEX GENERATION TECHNOLOGY FOR CREATING A LIFT ENHANCING AND DRAG REDUCING UPWASH EFFECT

BACKGROUND—FIELD OF INVENTION

This invention relates to lift enhancers, specifically to such enhancers that are designed to reduce drag and increase the difference in fluid pressure that occurs between the opposing surfaces of foil type devices.

BACKGROUND—DESCRIPTION OF PRIOR ART

In a relatively new field of research called "unsteady aerodynamics", significant study is being conducted in order to discover methods for creating turbulence in a manner which can allow aircraft to reproduce the ultra-high lift, propulsion, and maneuvering characteristics that have been observed in living organisms such as flying insects. Such possibilities are hypothesized in an article published in the April–May 1991 issue of National Wildlife "Can Dragons Teach Us To Fly?", by Mariette Nowak. In this article, research conducted at the University of Colorado by Dr. Marvin Luttges and several of his graduate students shows that a Dragonfly species known as *libellula luctuosa* is able to easily lift two and a half times its own weight in excess cargo, and therefore outperform our most efficient aircraft by about 300%.

In this article, a photograph of a wind tunnel experiment using non-toxic smoke trails (flowing by a live and flying dragonfly) shows the presence of tiny streamwise vortices forming a significant distance behind the dragonfly in its wake. The theory proposed by the researchers is that on its downstroke, the dragonfly twists its wings in a manner that forms vortices on the top surface of the wings. The researchers believe that forming vortices at such a location permits the vortices observed in the dragonfly's wake to operate according to Bernoulli's principle. This principle explains that because the air flowing above the curved upper surface of an asymmetric airfoil must travel a farther distance than the air flowing underneath the airfoil, the air above the airfoil flows at a faster rate and therefore experiences a decrease in pressure above the upper surface. This decrease in pressure creates an upward lifting force upon the airfoil. The researchers in this article thus believe that the vortices discovered in the wake of the dragonfly's wings must be formed above the upper surface of these wings in order to accelerate airflow there. This hypothesis, however, is incorrect because forming vortices along the upper surface of a wing does not produce the extraordinary performance levels of insect wings.

The concept of generating vortices on the upper surface of wings has been used for many years. It is usually done to reduce surface drag by adding kinetic energy into the boundary layer in order to decrease flow separation along the upper surface (flow separation occurs when the fluid passing along a surface "separates" from that surface and no longer flows in a smoothly attached manner along that surface). This process of using vortices to decrease separation is called passive boundary layer control. Although this technique helps to reduce drag and reduce separation, it has not been able to create the phenomenal performance levels observed in insects.

The lack of understanding in the field of unsteady aerodynamics is illustrated by the fact that the performance levels of winged and finned animals remain unexplainable to contemporary science. It has been said that one of the greatest engineering mysteries of this century is understanding why a bird's wings are able to work as well as they do. Also, the use of currently existing aerodynamic theories leads one to believe that a bumble bee should not be able to fly. No method is known as to how such tiny wings can lift such a comparatively large and heavy body off the ground, not to mention fly with extraordinary speed and acrobatic agility. Another example is the case of Gray's Paradox, which is discussed on p.100 of Jaques Cousteau's book *Jaques Cousteau: The Ocean World*, New York: H. N. Abrams, 1985. This paradox concludes that in order for a dolphin to swim at speeds of over 30 knots, its muscle tissue has to be either ten times more powerful (pound for pound) than that of humans, or else the dolphin is able to create pure laminar flow (where fluid flows smoothly over an object in a series of undisturbed layers). Because the possibility of unsteady fluid flow creation is not mentioned as an alternative explanation, it is evident that no method is known for creating and utilizing turbulence in a manner which produces unusually high levels of performance.

Rather than deriving power from turbulence, contemporary aviation designs and foil technologies consider turbulence to be a major problem. Turbulence is looked upon as a disadvantage because it depletes lift and creates drag on current foil type devices. In fluid flow situations where drag is unwanted, scientists find turbulence to be an inescapable pest which continuously prevents them from achieving what they believe is their ultimate goal: the creation of pure laminar flow.

One of the most burdensome forms of turbulence which plagues modern aircraft wings and foil-type devices, are the vortices produced near the outer tips of a foil. These vortices form as a result of the differences in pressure created between the opposing surfaces of a foil, as lift is created by the foil. In order to create lift, the air pressure below the lower surface of the wing must be relatively high, while the air pressure above the upper surface of the wing must be relatively low. Because areas of higher pressure move towards areas of lower pressure, the air below the wing's lower surface (high pressure surface) tends to escape sideways around the tip of the wing towards the upper surface (low pressure surface). As a result, a significant amount air near the wing tip moves outboard (towards the tip) below the lower surface, and inboard (away from the tip) above the upper surface. These spanwise directed flow conditions which occur above and below the wing tip are referred to as cross flow. These cross flow conditions form a swirling vortex above the wing's upper surface near the tip. The vortex spins in a circular path which flows in upward direction along its outboard portion, and a downward direction along its inboard portion.

These flow characteristics of a tip generated vortex significantly reduce performance on prior art foils. As the air below the wing's lower surface spills outward around the tip, the high pressure zone below the wing expands in a spanwise manner, and therefore experiences a loss in pressure. This reduces lift by decreasing the overall pressure difference existing between the wing's upper and lower surfaces. The centrifugal force created by the vortex's rotational speed creates a low pressure center or "eye" to form along the vortex's axis of rotation. Because the speed of rotation is extremely high, the pressure within this eye quickly becomes lower than the low pressure zone initially existing above the wing's upper surface. As a result, the high pressure zone below the lower surface accelerates around the tip towards this new low pressure center at an increased rate. This further decreases lift by further reducing fluid pressure below the wing.

Because this tip generated vortex flows in a downward direction along its inboard portion, it forces air down against the wing's upper surface (low pressure surface) and creates a situation known as downwash. As the downward flowing air impacts the low pressure surface of the wing, it increases the air pressure along this surface, thereby decreasing lift. The vortex also prevents air from flowing smoothly over a significant portion of the wing's low pressure surface near the tip. The disturbance created by the vortex reduces lift by decreasing the effective surface area of the foil, as well as its effective aspect ratio (aspect ratio can be defined by a foil's overall spanwise dimensions divided by the foil's overall front to back dimensions). For this reason, tip vortices cause low aspect wings to be highly inefficient in producing lift. In order to compensate for this loss in efficiency, a given foil has to have a significantly larger span than would be required if the tip vortex did not exist. This increases production costs from added materials and labor, and also increases fuel consumption from added surface drag and weight penalties. In addition, the disturbance in flow created by this vortex can cause the foil to stall prematurely. This significantly reduces the foil's ability to function effectively at higher angles of attack.

The most significant problem resulting from tip vortices is the occurrence of induced drag. The downwash produced by these vortices deflect the flow of air leaving the foil's trailing edge at an increased downward angle. Because the direction of lift on the wing is perpendicular to the direction of the flow, this downward deflected flow causes the direction of lift to tilt backwards. As a result, a significantly large component of the lifting force pulls backwards upon the wing in the opposite direction of its movement. This phenomenon is known as induced drag. In order to combat induced drag, an aircraft must increase the output of its propulsion system. This significantly increases fuel costs and increases engine wear.

The problems arising from tip vortices become increasingly severe as the foil's angle of attack becomes higher (high angles of attack are also referred to as high load, or high loading conditions). A foil's angle of attack can be defined as the variance existing between a foil's front to back planar alignment (or chordline), and its direction of movement relative to the surrounding fluid. This is called the foil's actual angle of attack. When a foil's alignment is not parallel to its direction of movement, the surface of the foil that impacts the oncoming flow is called the high pressure surface, or the attacking surface. The fluid flowing along the attacking surface becomes compressed and experiences an increase in pressure. The greater the foil's angle of attack, the greater the degree to which the attacking surface impacts against the oncoming air, and the greater the degree of compression to the fluid along the attacking surface. This increases the pressure difference occurring between the attacking surface and the low pressure surface (opposite surface). As a result, air flows at an increased rate around the foil's tip. This increases the destructive power of the tip vortex and its downwash.

A major problem caused by this downwash is that it reduces lift by decreasing the foil's effective angle of attack. The effective angle of attack is the collective combination of the actual angle of attack and the induced angle of attack. The induced angle of attack is the difference between the alignment of the oncoming flow and the alignment of the modified flow condition (downwash) created by the tip vortex. Since the downwash deflects the flow leaving the trailing edge at a downward angle (away from the direction of desired lift), the induced angle of attack has a negative value. Consequently, when the induced angle of attack is combined with the foil's actual angle of attack, its negative value decreases the foil's effective angle of attack.

This reduction in the foil's effective angle of attack decreases the foil's ability to create a difference in pressure between its opposing surfaces at a given actual angle of attack. In order to compensate for this reduction in efficiency and lift, the foil's actual angle of attack must be increased in order to make up for this loss. This increases the strength of the tip vortex and its downwash. It also increases separation and increases the foil's chance of stalling. By increasing the foil's actual angle of attack, the foil creates a larger disturbance in the surrounding fluid medium. This makes the foil less streamlined and causes increased levels of surface drag, separation, and transitional flow. Transitional flow is a high drag condition that occurs where an area of smooth flow is transformed into chaotic turbulence.

Because of these problems, prior attempts to increase lift focus on reducing overall tip vortex formation. This is most commonly done with a streamwise oriented plate like member or "winglet" which is mounted to the tip of a wing. The plate like member typically extends below the lower surface and, or above the upper surface of the wing. This method attempts to reduce vortex formation by blocking the circulatory flow of air around the wing tip. These devices are limited in effectiveness since they can only reduce the tip vortex by about 20–25%. Also, these winglets increase weight penalties upon the aircraft and create additional drag of their own.

A disadvantage with such prior designs is that the planar alignment of the plate like member is oriented parallel to the airfoil's direction of travel. As a result, the outboard cross flow existing beneath the wing tip strikes the inboard surface of the winglet that is extending below the wing's lower surface. As this happens, air pressure increases along the inboard surface of the lower surface winglet. This causes a significant increase in the pressure difference existing between the inboard and outboard surfaces of the lower winglet. Such a pressure difference causes a small induced drag type vortex to form near the tip of the winglet and along its outboard surface. Because the winglet is vertically oriented, this induced drag type vortex causes a sidewash condition (similar to downwash) to occur on its outboard surface. The sidewash deflects the flow leaving the lower winglet's trailing edge at an increased inboard angle, thereby causing induced drag to occur on the winglet. This combines with the drag from transitional flow which is created from flow separation along the lower winglet's outboard surface. These drag penalties created by the winglet greatly diminish the overall effectiveness of this solution. In addition, this new vortex spins in the same direction as the airfoil's tip vortex, and therefore they build strength from one another.

A similar problem occurs with a winglet that extends upward above the wings upper surface (low pressure surface). The inboard cross flow existing above the airfoil pushes against the outboard surface of this upper surface winglet. This forms a small induced drag type vortex near the tip of the upper winglet along its inboard surface. In this situation, the upper winglet's tip vortex causes a sidewash against the inboard surface. This deflects the flow leaving the trailing edge at an outboard angle, and therefore creates induced drag upon the upper winglet. The increased separation and drag created by this winglet increases drag penalties on the airfoil.

A problem that further inhibits the success of with all prior solutions is that induced drag type vortices vary significantly in strength with changes in velocity and angle of attack. As the vortex varies in strength, the cross flow conditions existing near the tip vary as well. No prior method has been employed which adequately adjusts to such variances in cross flow.

U.S. Pat. No. 1,063,805 (1913) to Krause uses a drooped outer edge on its wing. This drooped outer edge extends around the entire leading edge while maintaining uniform size and a substantially perpendicular orientation. The uniform continuation of this lip around the entire leading edge permits high amounts of drag to occur and also prevents the formation of beneficial vortices.

German patent 509,764 (1930) to Schul attaches a hollow half-cone to the outer side edge of an outwardly and rearwardly diverging wing tip. The design is intended to be used on a tail-less airplane. The cone is oriented with the hollow side down and the narrow point aiming forward. Translated from German into English, he states that "By giving it this form, this airplane is able to fly independently and be very stable. If the airplane has been brought from its normal horizontal flight path because of certain circumstances such as wind gusts, as considerable practical experiments have shown, the air somehow works in such a way on these hollow cones that they force the airplane to return into the normal flight position. Therefore it is possible to fly even in the most stormy weather and in fog. The security of the airplane is no longer dependent on the ability of the pilot."

Schul's statements display that he has not discovered the process that enables the cones to create this self-stabilizing effect upon the plane. As a result, he attributes this process to a series of unknown elements. These include an unknown process of self-stabilization, resulting from unknown forces, which are created in an unknown manner, by an unknown flow condition occurring between the air and the cones. He also feels that the unknown secret behind such a process does not need to be understood or manipulated since the pilot can just sit back and relinquish all control to this process. To the contrary, the safety of numerous lives and expensive property cannot be placed at the mercy of an unknown process. Even today this process remains unknown to science, and therefore its specific effects on flight cannot be accurately anticipated or controlled.

Schul is not only unaware of the process which causes his design to automatically stabilize itself, his statements show that he is also unaware that his cones do not operate in a conventional manner. Translated into English, he states "Also, these hollow cones have the ability to reduce the whirl effect at the edges, which results in increased lift and lowered resistance." He thus believes that the cones act similar to a conventional winglet, and therefore increase in lift and decrease drag in a predictable and obvious manner. He does not state that he is aware that his design is capable of creating high levels of lift which reach beyond the predictions of practiced aerodynamic theories. He is also unaware that his cones do not reduce tip vortex formation, but actually increase it to unusually high levels. In addition, neither Schul nor any other scientist is aware how increased tip vorticity can be used to increase a foil's performance beyond the expectations of traditional aerodynamics. The turbulent pattern existing around these tip mounted cones remains unacknowledged, unappreciated, uncontrolled, and unexploited. Its patterns, benefits, causes, functions, behaviors, effects on performance, potential power, possible forms, desirable locations, and potential uses, remain unknown as well.

Because Schul is not aware of the existence of a highly turbulent flow condition created by his cones, or its unusual effects on flight, his design cannot be operated in a safe and predictable manner. Without knowledge of this turbulence, small changes in trim (such as with a flap system) can cause highly unusual and unexpected flight behaviors. Even changes in air speed velocity, or angle of attack produce unconventional behaviors. Schul does not recognize this situation and does not offer a practical method for controlling it.

Translated into English, he merely states that "The steering flaps are best attached at the edges of the cone." He fails to specify which edges or portions, how such flaps should be oriented, how many should be used, what axis of pivoting is preferred, or what effects they should have upon the flow. In addition, he offers no method of controlling the plane's pitch (angle of attack) so that the plane can climb or dive.

Without the knowledge of the process by which these cones are able to operate, or a method for controlling this process, the same unknown factors which stabilize the plane can be lost as easily as they are formed. Because this process creates results that are not predicted by conventional aerodynamics, Schul's design is highly vulnerable to unexpected climbs, stalls, dives, spins, rolls, and crashes. Since the causes for these unusual behaviors are unknown, they cannot be adequately anticipated, controlled, or remedied. Such lack of predictability renders this airfoil design impractical.

French patent 768,392 (1934) to Kellner-Bechereau uses a winglet that projects both above and below the wing tip. The lower surface of the wing tip has a curved anhedral droop. The axis of curvature of this droop is parallel to the direction of travel. The upper surface of the wing tip has an outwardly and upwardly curved dihedral rise. The axis of curvature of this droop is also parallel to the direction of travel. The winglet extends rearwardly past the wing's trailing edge and forms a tapering point. The cross sectional shape of this winglet is asymmetrical with a slightly rounded outer surface to form a vertical airfoil shape relative to upward moving flow. This design does not successfully prevent induced drag vortex formation or encourage beneficial vortex formation.

U.S. Pat. No. 2,123,096 (1938) to Charpentier does not use a winglet device, but instead employs a curved, swept back, and tapering wing tip which has crescent shaped leading and trailing edges. This design is intended to decrease the size and power of the induced drag vortex by reducing the diameter of its core. Although this may decrease induced drag, downwash still occurs and no system is used to create lift enhancing vortices.

U.S. Pat. No. 2,576,981 (1951) to Vogt uses a winglet design consisting of two vertical blade-like members which are perpendicularly mounted to the wing tip and are arranged in an angled manner that attempts to gain forward thrust from the induced drag vortex. One blade extends from the upper surface with a twist along its length that places the blade's upper region at a aftward converging angle. In the same manner, another blade extends from the lower surface of the wing tip and has a twist along its length which places the blade's lower portion at a aftward diverging angle. This orientation attempts to gain forwardly directed aerodynamic lift from both the inboard cross flow conditions above the wing, and the outward cross flow conditions beneath the wing, which are created by the induced drag vortex.

In order to gain lift in this manner, the angles of attack have to be such that both the inboard side of the lower blade, and the outboard side of the upper blade, are the high pressure sides of the blades, respectively. In other words, both of these surfaces must be oriented at a positive angle of attack relative to the flow. This requires the angled orientation of the lower blade to be positioned at a less diverging angle than the actual alignment of the outboard and aftward directed cross flow occurring beneath the wing tip. Similarly, the angled orientation of the upper blade must be less converging than the inboard and aftward directed cross flow existing above the wing tip.

In order to efficiently gain aerodynamic lift, the pressure difference occurring between the inboard and outboard surfaces on each blade must be as high as possible. This pressure difference causes small induced drag type vortices to form along the inboard surface of the upper blade as well as outboard surface of the lower blade. These induced drag type vortices are created by the asymmetrical airfoil shape of each blade which increases the pressure difference existing between the opposing surfaces of each blade. These small vortices increase flow separation and drag. The direction of spin of these vortices compliment the larger induced drag vortex formed by the wing. Also, because these small induced drag vortices decrease each blade's effective angle of attack, the actual angle of attack of each blade must be increased in order to compensate for this loss in efficiency. This in turn further increases the separation around the tips of each blade. No method is disclosed for reducing the destructive effects of these small vortices.

Because Vogt aspires to gain forward thrust from the rotational speed of the induced drag vortex, his design is not used to significantly reduce the rotational speed of this vortex. This is because the creation of lift on his blades depends upon high speeds of rotation within the wing's tip vortex. The forward thrust created by these blades is extremely small compared with the major disadvantages of continued induced drag.

U.S. Pat. No. 2,846,165 (1958) to Axelson uses perpendicularly mounted airfoils which pivot around a vertical axis that is also perpendicular to the wing's surface. The airfoils are able to rotate in and out of alignment with the aircraft's direction of travel. These airfoils are mounted near the wing tip and extend above the upper surface and below the lower surface. The design is intended to offer horizontal control to supersonic airplanes by changing the pressure fields above and below the wings.

Axelson states that lift can be added to one wing by pivoting the aft portion of the lower airfoil in an inboard direction, and by pivoting the aft portion of the upper airfoil in an outboard direction. He believes that this setting produces an inboard directed flow beneath the wing, and an outboard directed flow above the wing. Axelson feels that this causes the air below the wing to compress, and the air above the wing to expand.

To the contrary, this setting actually increases drag and decreases lift. This is because the outboard surface of the divergently angled upper airfoil experiences an increase in pressure as it collides with the oncoming flow. This causes an inboard cross flow over the top of the upper airfoil which creates a high speed tip vortex to form along the inboard surface of this upper foil. This increases downwash on the wing's upper surface and increases induced drag. In the same manner, as the rearwardly converging lower airfoil collides with the oncoming flow, fluid pressure on its inboard surface is increased. This creates an outboard directed cross flow under the tip of the lower airfoil. This decreases air pressure beneath the wing and creates a high speed tip vortex along the outboard surface of this lower foil. The tip vortices formed by each of these airfoils increase the rate of outboard cross flow beneath the wing, and inboard cross flow above the wing. This reduces the pressure difference between the wing's upper and lower surfaces, and therefore decreases lift and increases induced drag. Because these tip vortices spin in the same direction as the main wing's induced drag vortex, the cores of all three vortices can easily merge together behind the wing to gain strength in the wake for increased downwash and induced drag. The greater the degree to which these airfoils are pivoted in this manner, the greater the resulting decrease in lift and increase in drag. No method is disclosed which explains how such devices may be used to create turbulence in a manner which increases lift beyond the expectations of conventional aerodynamics.

U.S. Pat. No. 3,369,775 (1968) to Rethorst attempts to eliminate induced drag by using angled ribs along the upper and lower surfaces of a wing. He orients the ribs along the upper surface at a rearwardly divergent angle, while orienting and the ribs along the lower surface at a rearwardly convergent angle. The ribs are intended to promote an outboard cross flow above the airfoil and an inboard cross flow below the airfoil in order to neutralize the cross flow conditions created by the tip vortex. He states that the purpose of his design is to restore smooth flow and achieve zero net vorticity in the wake.

Contrary to Rethorst's intentions, this design does not neutralize the cross flow conditions created by induced drag type vortices. Instead, the angled orientation of these ribs actually produce vortices which increase the cross flow conditions associated with induced drag. This is because the outboard side of the ribs on the wing's upper surface, and the inboard side of the ribs on the lower surface, are at a positive angle of attack with respect to the flow. This creates an increase in pressure along these sides of the ribs, while the opposite sides of the same ribs experience a decrease in pressure. This causes a vortex to form along the low pressure sides of the ribs (the inboard side of the wing's upper surface ribs, and the outboard side of the wing's lower surface ribs). The resulting vortices cause a cross flow pattern around each rib which compliments the cross flow created by the induced drag vortex formed over the tip of the wing.

U.S. Pat. No. 3,411,738 (1968) to Sargent uses an outwardly and downwardly drooped wing tip which attaches to the end of an airplane wing for reducing induced drag vortices. Although the outboard edge of the drooped wing tip diverges rearwardly and outwardly relative to its inboard end, the axis of curvature of this drooped wing tip is parallel with the direction of travel. This design does not significantly reduce induced drag and does not produce beneficial turbulence.

Sargent also states that because the outer portion of the wing tip is downwardly inclined from leading edge to trailing edge, the induced drag vortex is deflected downward. He improperly directs the inclination of the vortex because a downwardly deflected wake tilts the wing's lift vector backwards, and therefore increases drag upon the wing.

U.S. Pat. No. 3,596,854 (1971) to Haney uses a hollow and cylindrically shaped vortex generating chamber mounted on the wing tip. It has an elongated slot shaped opening along the inboard side of the generator beneath the wing. This slot is located along the lower portion of the generator and is intended to capture the outward moving flow occurring underneath the wing before it escapes outward around the tip. The slot is positioned so that the flow entering the chamber is directed at a tangent to the curved lower inside surface of the hollow cylinder so that this flow can achieve rotational motion. The limited flow space within the slot and cylinder creates excessive drag which restricts flow volume and rapidly depletes the flow velocity within the chamber to inefficient levels. The direction of rotation encouraged by the generator is the same as that created by an induced drag type vortex, and therefore does not significantly inhibit induced drag. This design does not generate beneficial turbulence and merely adds weight penalties and drag to the aircraft.

U.S. Pat. No. 3,904,151 (1975) to Rethorst attempts to achieve an upflow condition by creating a series of vortices beneath an airfoil which rotate around a spanwise axis. A jet engine is positioned below the lower surface of a supersonic wing so that the difference in flow velocity, between the exhaust stream and the boundary layer of the wing, causes spanwise vortices to form under the wing. These vortices are dependent upon engine power and lack the proper organization, strength, alignment, and positioning needed to overcome the comparatively large downwash effect of the induced drag vortex created at the wing's outer tip. Although the underside of the wing angles upwards towards the trailing edge, Rethorst states that this surface is always at a non-negative angle of attack.

U.S. Pat. No. 4,108,403 (1978) to Finch attempts to create laminar flow conditions and reduce induced drag vortex formation by using a downwardly drooped and aftwardly extended airfoil tip. As shown in his drawings of wind tunnel tests, this design only reduces induced drag vortex formation and does not completely eliminate the outwardly and upwardly rolling flow pattern occurring at the outer tip of the wing. The axis of curvature in which the droop occurs is parallel to the direction of travel. Moreover, his preferred embodiment orients the aftward alignment of the trailing tip so that it converges inboards. Because of the outboard cross flow occurring beneath the tip, this orientation further increases air pressure along the inboard surface of the droop. This increases separation as the outboard cross flow curves around the outer edge towards the outer surface of the droop. As this separation occurs, an induce drag type vortex is formed along the outboard surface of the droop. This vortex prevents smooth flow from occurring over this outer surface, and therefore the spanwise airfoil shape of this airfoil tip is highly inefficient at increasing lift. Although Finch employs a twist along the length of the trailing tip, this is an "anti vortex twist" which is intended to oppose the formation of a vortex near the tip.

U.S. Pat. No. 4,197,869 (1980) to Moncrieff-Yeates shows a vortex generator which creates a vortex within a semi-enclosed structure. The axis of rotation of this vortex is substantially perpendicular to the direction of the free stream which enters the generator. No method is disclosed which shows how a vortex flow pattern can be used to improve the performance of foil type devices.

U.S. Pat. No. 4,382,569 (1983) to Boppe et al. attempts reduce wing tip vortices by using an anhedrally drooped capture device mounted to the end of a wing. The axis of curvature for the capture device is parallel with the direction of travel. This design does not significantly reduce induce drag and does not form beneficial turbulence.

U.S. Pat. No. 4,444,367 (1984) to Spillman uses an elongated narrow strip projecting rearwardly from the trailing edge of a wing. Rather than creating a vortex, the strip merely modifies the vortex which has already been formed by the swept leading edge of a standard airfoil. Because no method is used to avoid the natural formation of an induced drag vortex, it is this type of vortex which the strip attempts to modify. This system does not adequately reduce induced drag vortices, nor is it used to create beneficial vortices.

Russian patent 1239032 A1 (1986) to Punson uses a series of hydrofoil blades located forward of a boat's propeller. These blades are twisted along their length to assume a counterpropelling shape that deflects the flow stream in a direction that is opposite to the direction of the propeller's rotation. This device acts similar to two conterrotating propellers, except the forward propeller blades are permanently fixed to the hull of the ship, and therefore do not rotate. No methods are disclosed on how turbulence can be created and used in a manner which increases performance beyond conventional expectations.

U.S. Pat. No. 4,705,240 (1987) to Dixon uses a forward swept wing which induces separation to occur along the leading edge of the wing's upper surface prior to stall conditions. The separation is organized into a vortex along the upper surface of the wing, which originates at the outboard portions of the leading edge, and extends toward the inboard portions of the trailing edge. Although this design attempts to gain lift from a vortex, the vortex is improperly formed and incorrectly positioned. Also, no method is used to reduce the occurrance of induced drag.

U.S. Pat. No. 4,975,022 to Perry (1990) uses a swept outboard tip edge of a helicopter rotor blade, which incorporates an anhedral blade droop to reduce pitching moments within the blade. The axis of curvature of this droop is parallel to the direction of travel, and therefore it does not adequately reduce induced drag, nor produce lift generating turbulence.

Patent EP482932-A (1992) shows a helicopter blade which produces vortices at the tip for the purpose of reducing noise levels during operation. Because extraordinary levels of lift are not mentioned as being observed in the use of this device, the vortices produced by this device are not used in a manner which significantly increase lift. No method is disclosed for using vorticical flow in a manner which generates unusually high levels of lift.

Some other prior methods of reducing induced drag include attempting to restore laminar flow by pumping air out of (or into) a vent located near the wing tip. This is done to counter the cross flow patterns which cause induced drag type vortices. Both the increased weight penalties of the systems and the energy expended by the pumping system increase fuel consumption. The quantity and complexity of this equipment also raise production costs. This method is designed to reduce or eliminate vorticical flow and is not intended to create vortices in a manner which benefits flight in an extraordinary manner. It is also difficult to match internal flow speeds (within the pumping systems) with external flow speeds. This is especially difficult when conditions are constantly changing, such as when the foil is traveling through turbulent flow conditions, or making adjustments in air speed, angle of attack, or heading.

Other prior solutions involve mounting a jet engine to each wing tip of an airplane which is capable of emitting a rotational flow pattern for combatting induced drag type vortices. The purpose of this design is to reduce or eliminate vortex flow at the tips so that the net result is laminar flow. This method of increasing lift consists of merely reducing overall tip vorticity, and therefore the jet engine is not used in a manner which increases lift beyond the expectations of conventional aerodynamic principles.

The use of a jet engine at this location is also highly impractical. This solution unjustifiably increases fuel consumption with the staggering weight penalties of additional engines, as well as from the necessary addition of extra structural reinforcement within the wings to support such engines. This cost combines with increased production costs to outweigh any benefit derived from reduced vorticity. If the engines are also used to provide forward propulsion, further modifications would be required to handle the increased torque exerted upon the wings by the increased distance between the engine and the fuselage. When a jet engine is located at the tip of a wing, the torque on the wing due to weight and thrust is at its maximum. In addition, the energy expended to impart rotational flow, creates a loss of rearward directed thrust, and therefore additional fuel must be expended to compensate for this loss. Because this solution has so many disadvantages, it is highly impractical.

Other methods of lift enhancement include the use of vortex generators merely for reducing separation through passive boundary layer control. Examples of these methods are seen in U.S. Pat. Nos. 3,776,363 to Kuethe (1973), 4,293,110 to Middleton et al. (1981), 4,323,209 to Thompson (1982), 4,776,535 to Paterson et al. (1988), and 5,058,837 to Wheeler (1991).

In U.S. Pat. No. 5,058,837, Wheeler states that his V-shaped vortex generator can extend above the boundary layer when used for decreasing spanwise flow or reducing tip vortices. When his device extends above the boundary layer for this purpose, the structure of his generator creates excessive levels of drag. Because the vortex generator is V-shaped with the apex pointing rearwardly, the generator acts like a wedge and forms a large pressure bubble at the forward facing portion of the apex. This pressure bubble expands vertically away from the foil's surface and reaches high into the free stream, thereby producing large amounts of drag. When this device is to be used to reduce severe cross flow conditions, Wheeler states that the sidewall height of his generators can be four to five times the depth of the local boundary layer. This greatly increases the size of the pressure bubble formed at the forward surface of the apex, and therefore drag is further increased. For this type of application, his preferred embodiment uses a rearwardly extended apex which makes the V-shaped generator become Y-shaped. He concedes that this extended apex produces additional drag and removes energy from the pair of generated vortices.

Another problem with Wheeler's vortex generator is that it discourages all forms of spanwise directed flow, and only encourages streamwise directed flow. The generated vortices are merely used as a "flow straightener" in an attempt to impede the formation of a tip generated vortex, and restore laminar type flow conditions. Although Wheelers method may reduce spanwise flow to some degree, it still permits downwash and induced drag to occur. Because his generator produces vortices for the purpose of suppressing larger scale vorticity, Wheeler is not aware of a method for utilizing the power of a large scale turbulent pattern in manner that increases performance beyond the expectations of conventional aerodynamics.

Another problem with previous airplane designs is that the control flaps cause unwanted drag in use. When a flap is deployed, the outside edges create small induced drag type vortices, and transitional flow. This is particularly a disadvantage during turns. For instance, when an aileron on the right wing is lowered to cause the plane to roll left (right wing rises) and enter into a left turn, the drag created by the aileron on the right wing causes the plane to yaw to the right. Because the direction of this yaw is opposite to direction of the intended maneuver, the plane's rudder must be pivoted towards the left in order to compensate for this tendency to yaw right. The intervention of the rudder creates further transitional flow and increases the difficulty of maneuvers. All of these factors increase fuel consumption and reduce maneuverability.

OBJECTS AND ADVANTAGES

Accordingly, several objects and advantages of the present invention are:

(a) to provide foil designs which overcome the disadvantages of the prior art;

(b) to provide a method for generating a vortex pattern around the tip region of a foil which allows the foil to reproduce the extraordinary performance characteristics observed in birds, aquatic animals, and insects;

(c) to provide a method of increasing a foil's performance by strategically rearranging the pressure fields near its tip in order to create a streamwise beneficial vortex behind the tip which spins in the opposite direction as an induced drag vortex so that the disadvantages of the prior art are not only eliminated, but reversed into positive advantages;

(d) to provide methods for opposing the outward expansion of the high pressure field existing along a foil's attacking surface by generating a beneficial tip vortex which creates and reinforces an inboard cross flow condition which flows towards the foil's attacking surface;

(e) to provide a method for increasing the intensity of the high pressure field along a foil's attacking surface by compressing it in a spanwise manner with an inboard cross flow directed towards this high pressure field;

(f) to provide a method for creating a lift enhancing upwash condition against the attacking surface of a foil;

(g) to provide a method for increasing a foil's effective angle of attack, preferably to the point where the foil's effective angle of attack is greater than the foil's actual angle of attack;

(h) to provide a method for generating lift from a portion of a foil's attacking surface that is at a negative actual angle of attack;

(i) to provide a method for using a substantially streamwise vortex pattern to deflect the flow leaving a foil's trailing edge at an upward angle;

(j) to provide a method of creating forward thrust upon a foil by generating a beneficial vortex near its tip;

(k) to provide a method for focussing the expansion of the high pressure field along a foil's attacking surface so that it escapes aftward in a significantly unidirectional manner before reaching the outer tip;

(l) to provide a method for decreasing drag created by winglet type devices which are used to reduce overall tip vortex formation;

(m) to provide foil designs which generate lift enhancing beneficial vortices with high levels of efficiency;

(n) to provide foil designs which take advantage of the many flow characteristics created by a lift enhancing tip vortex pattern;

(o) to provide methods for using a vortex pattern to increase the stability of a foil;

(p) to provide a methods for using a tip generated vortex pattern to dramatically increase an aircraft's lift, fuel efficiency, flight range, glide range, cargo capacity, stability, safety, smoothness of ride, and maneuverability;

(q) to provide a method for using a vortex pattern to increase the effective surface area, and effective aspect ratio so that significantly smaller and, or lower aspect ratio foils can be used for a given application;

(r) to provide a method for eliminating induced drag by displacing the induced drag vortex sufficiently inboard from the tip of a foil so that it creates an upwash condition that neutralizes the effects of downwash;

(s) to provide a method for increasing lift by accelerating the rate of flow above an upper surface portion of the tip region of a foil in an attached manner;

(t) to provide a method for preventing a foil from stalling at extremely high angles of attack;

(u) to provide adjustable flap systems which can be used to control the cross flow conditions surrounding the tip region of a foil;

(v) to provide adjustable flap systems which can control the formation of a beneficial vortex in order to adapt to changing flow conditions, and to execute changes in direction relative to a fluid medium;

(w) to provide am improved method for controlling the direction of airplanes, or other devices which move through, or relative to a fluid like medium, by utilizing tip generated vortices to execute maneuvers;

(x) to provide a method for increasing, and decreasing the amount of twist across the span of a segmented foil in a continuously variable manner;

(y) to provide a method for regaining a level flight path for an airplane which has lost control;

(z) to provide a method for achieving ultra-high levels of lift at significantly slow speeds;

Further objects and advantages will become evident from a consideration of the ensuing description and drawings.

DRAWING FIGURES

In the drawings, closely related figures have the same number but different alphabetic suffixes.

FIG. 3 shows a top view of an airfoil tip attached to the outboard end of an airfoil.

FIG. 4 shows the same airfoil tip viewed from its inboard end.

FIG. 5 shows a perspective view of the same airfoil tip connected to the outboard end of an airfoil while displaying the three dimensional positioning of cross sections a, b, c, d, and e, taken at a—a, b—b, c—c, d—d, and e—e in FIG. 4, respectively.

FIG. 6 shows a two dimensional layout of cross sections a, b, c, d, and e, taken at a—a, b—b, c—c, d—d, and e—e in FIG. 4, respectively.

FIG. 7 shows a rear view of the same airfoil tip attached to the outboard end of an airfoil.

FIG. 8 shows a front view of the same airfoil attached to the outboard end of an airfoil.

FIG. 9 shows a bottom view of an airfoil with a movable vortex flap which pivots along a divergent axis while attached to the outboard end of a foil.

FIGS. 10a to 10e show a front view of the same airfoil inclined at a positive angle of attack with the same movable vortex flap oriented in various positions.

FIG. 11 shows a top view of streamlines labeled f to p flowing underneath the lower surface of an outboard portion of a similar airfoil which has a similar vortex flap oriented at a negative angle of attack.

Figure 21A:
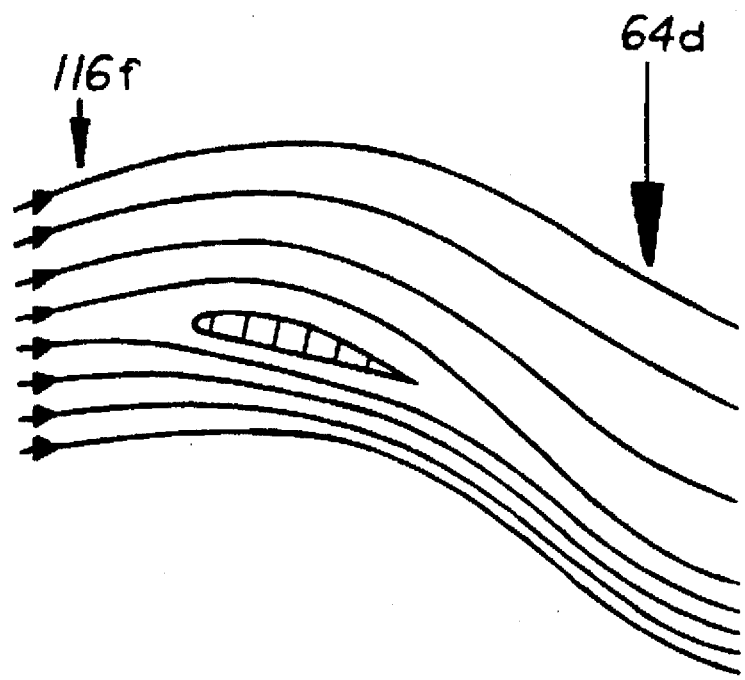
Figure 21B:
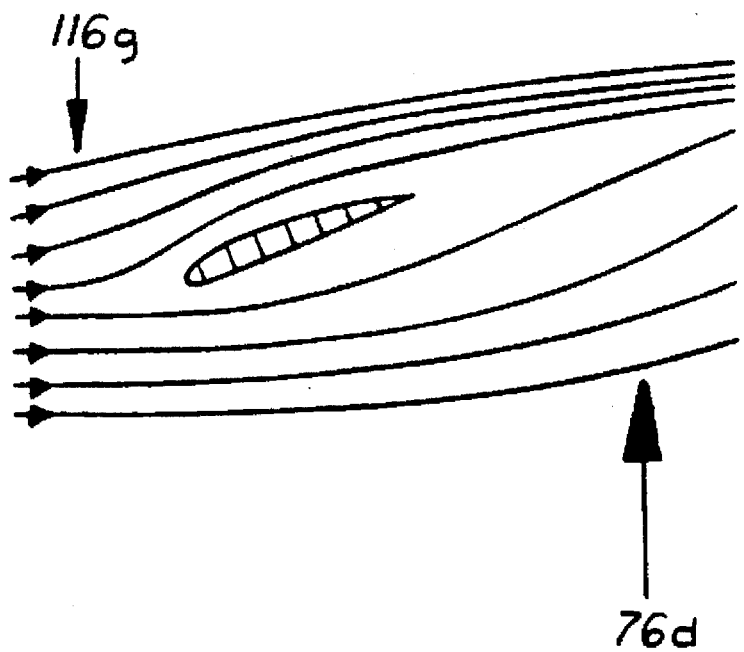

FIG. 21a and 21b each show a cross sectional view of an outboard tip portion of an airfoil with streamlines passing over and under it, however, FIG. 21a shows the flow characteristics surrounding a prior art airfoil tip, while FIG. 21b shows the flow characteristics surrounding an airfoil tip which is oriented at a negative angle of attack.

Figure 22:
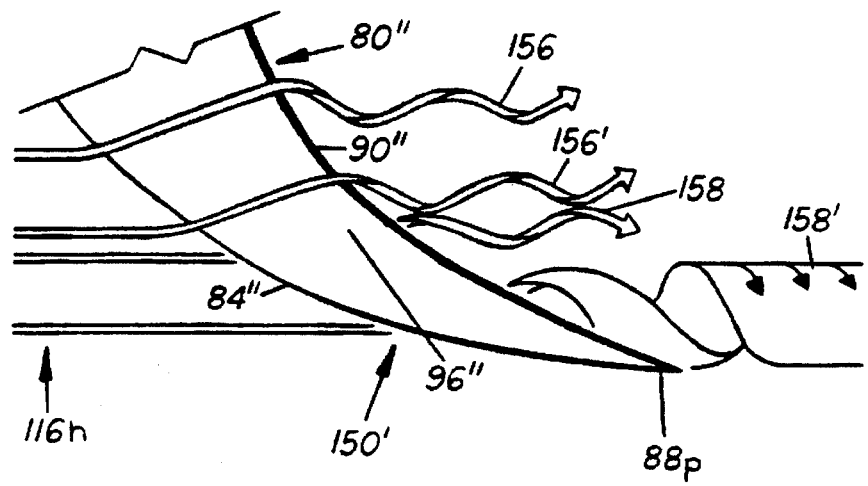

FIG. 22 shows a close up perspective view of streamlines flowing through the boundary layers above and below the outboard portion of an airfoil tip that is similar to the embodiment shown in FIGS. 19 and 20.

Figure 23A:
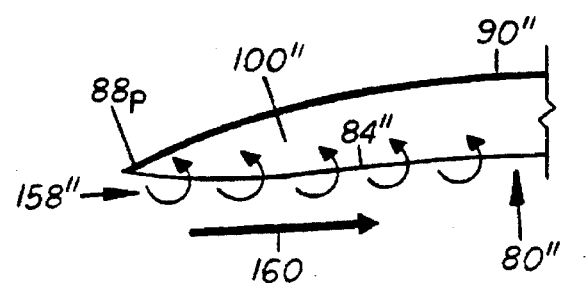
Figure 23B:
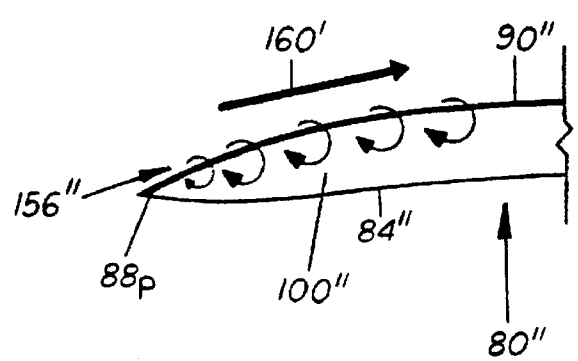

FIGS. 23a and 23b both show a rear view of the same airfoil tip.

Figure 24A:
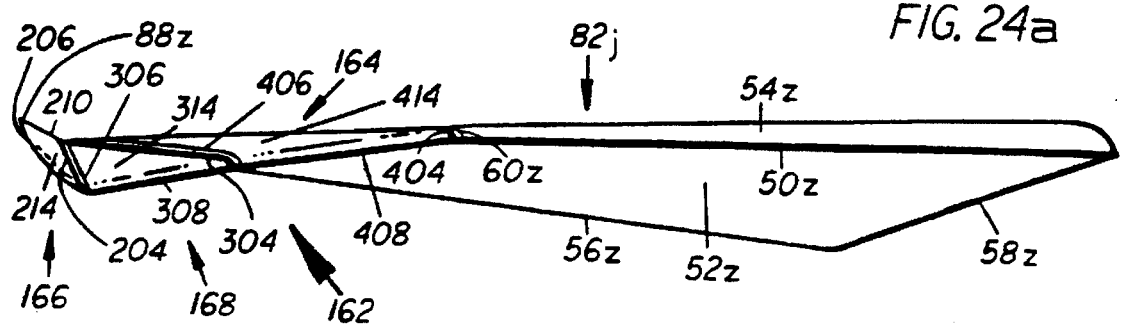
Figure 24B:
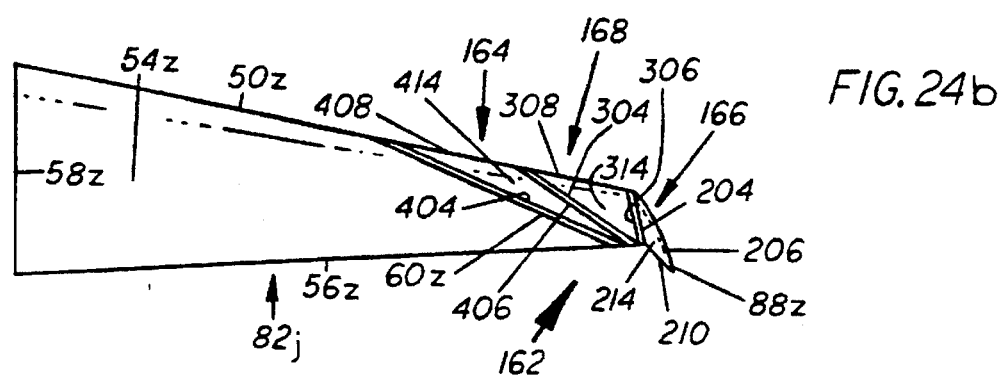

FIGS. 24a and 24b show a perspective view and a top view, respectively, of an airfoil which has a vortex flap network connected to its outboard end.

Figure 25A:
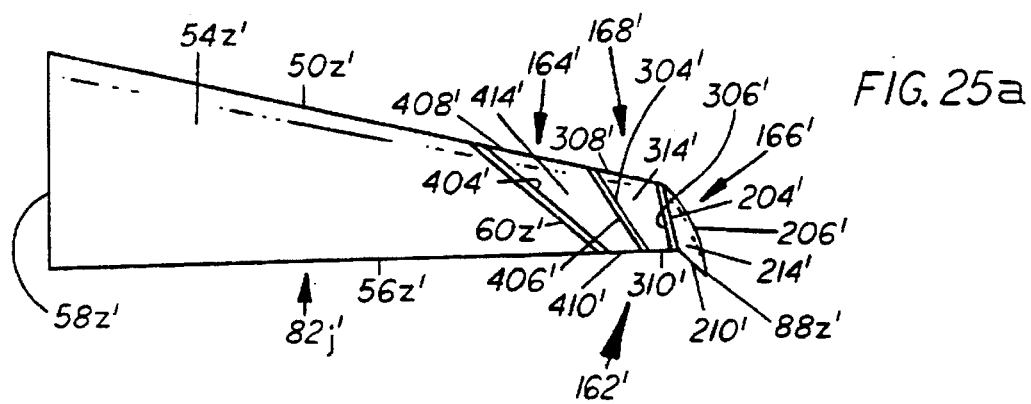
Figure 25B:
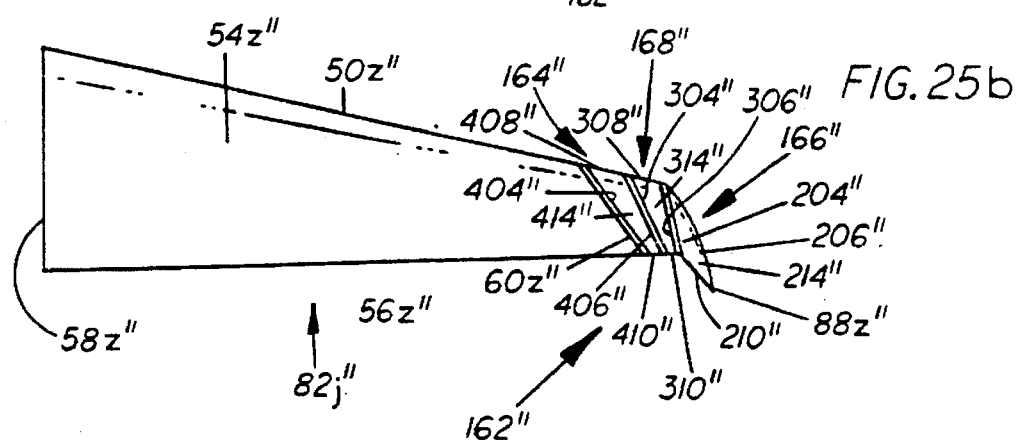

FIGS. 25a and 25b show top views of two alternate embodiments of the vortex flap network shown in FIG. 24.

REFERENCE NUMERALS IN DRAWINGS

In the reference numerals, closely related parts in different embodiments may have the same number but different superscripts and, or alphabetical suffixes.

Figure 1:
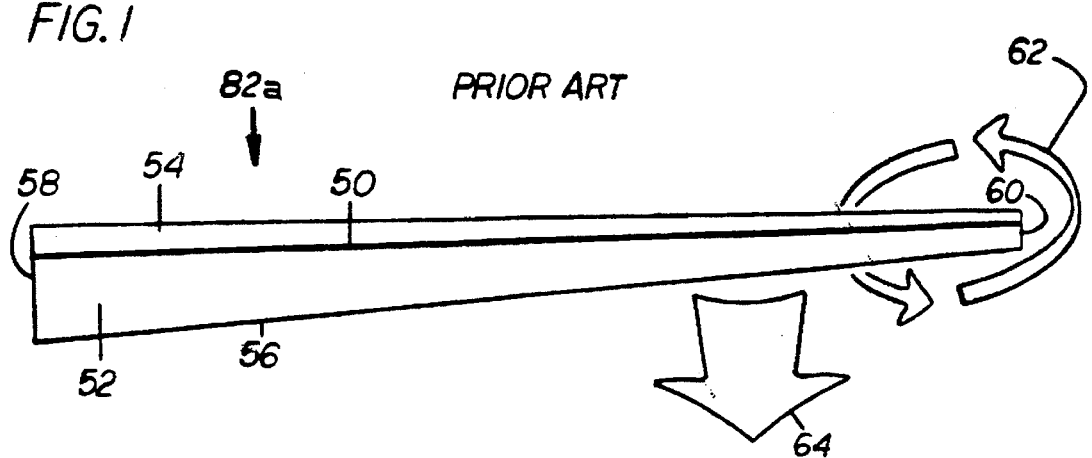
FIG. 1 shows a front perspective view a prior art airfoil which is inclined at a positive angle of attack.
Figure 2:
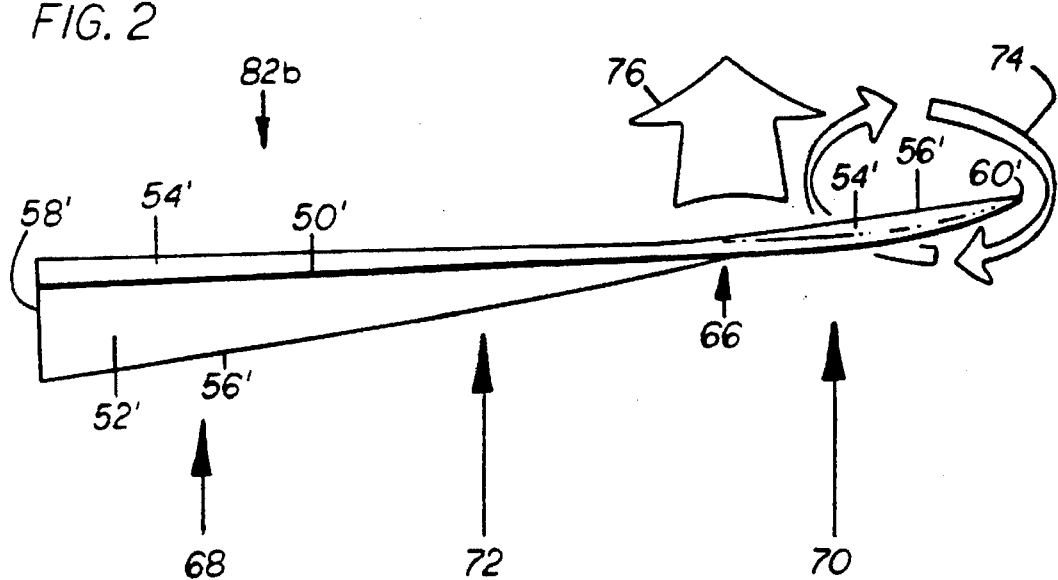
FIG. 2 shows the same view of a different airfoil which is inclined to a similar positive angle of attack near its root, but has a twist along its span which causes an outboard portion of the airfoil to be at a negative angle of attack.

(FIG. 1)
    82a prior art airfoil
    50 leading edge
    52 lower surface
    54 upper surface
    56 trailing edge
    58 root
    60 outboard end
    62 induced drag vortex
    64 downwash field (FIG. 2)
    82b airfoil
    50' leading edge
    52' lower surface 54' upper surface
56' trailing edge
58' root
60' outboard end
66 twist
68 positive angle of attack
70 negative angle of attack
72 reduced positive angle of attack
74 beneficial vortex
76 upwash field
(FIGS. 3 to 8)
82c airfoil
50" leading edge
52" lower surface
54" upper surface
56" trailing edge
60" outboard end
84 airfoil tip's outboard end
86 divergent axis of droop curvature
88 trailing tip
90 airfoil tip's trailing edge
92 airfoil tip's leading edge
94 airfoil tip's upper surface
96 outboard droop surface
98 airfoil tip's lower surface
100 inboard droop surface
a cross section
b cross section
c cross section
d cross section
e cross section
(FIGS. 9 and 10)
82d airfoil
50'" leading edge
52'" lower surface
56'" trailing edge
60'" outboard end
88' trailing tip
102 movable vortex flap
104 vortex flap's inboard end
106 vortex flap's outboard end
108 vortex flap's leading edge
110 vortex flap's trailing edge
112 vortex flap's lower surface
114 vortex flap's upper surface
(FIGS. 11 and 12)
82e airfoil
50a leading edge
54a upper surface
56a trailing edge
60a outboard end
88" trailing tip
102' vortex flap
104' vortex flap's inboard end
106' vortex flap's outboard end
110' vortex flap's trailing edge
114' vortex flap's upper surface
74' beneficial vortex
116a oncoming flow
118 lift vector
120 vertical component
122 horizontal component
f streamline
g streamline
h streamline
i streamline
j streamline
k streamline
l streamline
m streamline
n streamline
o streamline
p streamline
(FIG. 13)
62' induced drag vortex
64" downwash field
116b oncoming flow
118' lift vector
120' vertical component
122' horizontal component
(FIG. 14)
82f airfoil
50b leading edge
54b upper surface
56b trailing edge
58b root
60b outboard end
62'" induced drag vortex
74" beneficial vortex
76" upwash field
88c trailing tip
102" vortex flap
104" vortex flap's inboard end
106" vortex flap's outboard end
110" vortex flap's trailing edge
114" vortex flap's upper surface
116c oncoming flow
(FIG. 15)
52b lower surface
118" lift vector
120" vertical component
122" horizontal component
124 double vortex pattern
126 inward flowing portion
127 bifurcating portion
(FIG. 16)
62a induced drag vortex
64a downwash field
(FIG. 17)
82g airfoil
54c upper surface
56c trailing edge
74a beneficial vortex
76a upwash field
88d trailing tip
102a vortex flap
106a vortex flap's outboard end
112a vortex flap's lower surface
132 flow separation
(FIG. 18)
82h airfoil
54d upper surface
56d trailing edge
62b induced drag vortex
64b downwash field
74b beneficial vortex
76b upwash field
124' double vortex pattern
134 cone shaped vortex generator
136 cone's trailing edge
138 cone's leading edge
140 cone's lower surface
142 cone's outboard end
144 cone's inboard end (FIG. 19)
  82i airfoil
  50o leading edge
  52o lower surface
  54o upper surface
  56o trailing edge
  58o root
  60o outboard end
  80' airfoil tip
  84' airfoil tip's outboard end
  88o trailing tip
  90' airfoil tip's trailing edge
  92' airfoil tip's leading edge
  94' airfoil tip's upper surface
  96' outboard droop surface
  98' airfoil tip's lower surface
  100' inboard droop surface
  116d oncoming flow
  146 curved outboard droop
  148 leading edge droop
  150 outboard edge droop
  152 forward droop surface
  154 rearward droop surface
(FIG. 20)
  62c induced drag vortex
  74c beneficial vortex
  76c upwash field
  116e oncoming flow
  124" double vortex pattern
(FIG. 21)
  64d downwash field
  76d upwash field
  116f oncoming flow
  116g oncoming flow
(FIG. 22)
  80" airfoil tip
  84" airfoil tip's outboard end
  88p trailing tip
  90" airfoil tip's trailing edge
  92" airfoil tip's leading edge
  96" outboard droop surface
  116h oncoming flow
  150' outboard edge droop
  156 miniature induced drag vortex
  156' miniature induced drag vortex
  158 miniature beneficial vortex
  158' miniature beneficial vortex
(FIG. 23)
  100" inboard droop surface
  156" group of induced drag vortices
  158" group of beneficial vortices
  160 inboard directed cross flow
  160' inboard directed cross flow
(FIG. 24)
  82j airfoil
  50z leading edge
  52z lower surface
  54z upper surface
  56z trailing edge
  58z root
  60z outboard end
  162 vortex flap network
  164 inboard flap
  166 outboard flap
  168 intermediate flap
  204 inboard end
  206 outboard end
  210 trailing edge
  214 upper surface
  304 inboard end
  306 outboard end
  308 leading edge
  314 upper surface
  404 inboard end
  406 outboard end
  408 leading edge
  414 upper surface
(FIG. 25a)
  82j' airfoil
  50z' leading edge
  54z' upper surface
  56z' trailing edge
  58z' root
  60z' outboard end
  162' vortex flap network
  164' inboard flap
  166' outboard flap
  168' intermediate flap
  204' inboard end
  206' outboard end
  210' trailing edge
  214' upper surface
  304' inboard end
  306' outboard end
  308' leading edge
  310' trailing edge
  314' upper surface
  404' inboard end
  406' outboard end
  408' leading edge
  410' trailing edge
  414' upper surface
(FIG. 25b)
  82j" airfoil
  50z" leading edge
  54z" upper surface
  56z" trailing edge
  58z" root
  60z" outboard end
  162" vortex flap network
  164" inboard flap
  166" outboard flap
  168" intermediate flap
  204" inboard end
  206" outboard end
  210" trailing edge
  214" upper surface
  304" inboard end
  306" outboard end
  308" leading edge
  310" trailing edge
  314" upper surface
  404" inboard end
  406" outboard end
  408" leading edge
  410" trailing edge
  414" upper surface Description—FIGS. 1 and 2

For purposes of differentiating between vortices which spin in opposite directions, the following description refers to streamwise flowing vortices as either being an induced drag vortex, or a beneficial vortex. Relative to the alignment of a given airfoil, a vortex which spins in an inboard direction along its upper portion, and in an outboard direction along its lower portion, is referred to as an induced drag vortex. Similarly, a vortex which spins in an outboard direction along its upper portion, and in a inboard direction along its lower portion, is referred to as a beneficial vortex. It should be understood that these two terms are used strictly for purposes of identification, and the effects of either type of vortex on a given foil shall become evident through an understanding of the ensuing description, and not by the literal meaning of these two terms.

In the following description, a foil (or portion of a foil) is often described as being inclined at either a positive angle of attack, or a negative angle of attack. When a horizontally aligned foil is described as being at a positive angle of attack, it should be understood that the foil's lower surface is the attacking surface, and the foil's upper surface is the low pressure surface. This means that the lower surface is at a positive angle of attack relative to the oncoming flow, and the upper surface is at a negative angle of attack relative to the oncoming flow. When a vertically aligned portion of a foil is stated as being at a positive angle of attack, its inboard surface is the attacking surface, and the outboard surface is the low pressure surface. This causes the inboard surface to be at a positive angle of attack relative to the oncoming flow, while the outboard surface is at a negative angle of attack relative to the oncoming flow. To simplify the description, such orientated foils are simply described as being at a positive angle of attack.

Similarly, when a horizontally inclined foil is described as being at a negative angle of attack, it should be understood that the foil's upper surface is the attacking surface, and the foil's lower surface is the low pressure surface. This means that the foil's lower surface is at a negative angle of attack relative to the oncoming flow, and the foil's upper surface is at a positive angle of attack relative to the oncoming flow. When a vertically aligned portion of a foil is stated as being at a negative angle of attack, its inboard surface is the low pressure surface while its outboard surface is the attacking surface. This means that the inboard surface is at a negative angle of attack relative to the oncoming flow, while the outboard surface is at a positive angle of attack relative to the oncoming flow. Again, for the purpose of simplifying the description, such orientated foils (and portions of foils) are simply described as being at a negative angle of attack.

Also, in the following description a number of theories are presented concerning the fluid flow characteristics utilized by the present invention. While I believe these theories to be true, I do not wish to be bound by them.

FIG. 1 shows a front perspective view of a prior art airfoil 82a which is inclined at a positive angle of attack. Airfoil 82a is moving towards the viewer. A leading edge 50 is nearest to the viewer. A lower surface 52 is located below leading edge 50. A small portion of an upper surface 54 is seen above leading edge 50 because upper surface 54 is convexly curved for generating aerodynamic lift. A trailing edge 56 is farthest from the viewer. A root 58 can be mounted to any desirable object while an outboard end 60 remains free. During use, outboard end 60 creates an induced drag vortex 62 which rotates in a counter clockwise direction from this view. The rotational flow surrounding induced drag vortex 62, creates a downwash field 64 in the wake behind trailing edge 56.

FIG. 2 shows a similar view of an airfoil 82b which is twisted in a manner which permits it to employ the flow control methods of the present invention. Airfoil 82b is moving towards the viewer. A leading edge 50' is nearest to the viewer while a trailing edge 56' is farthest from the viewer. Along the span of airfoil 82b is a twist 66 which gradually changes the airfoil's actual angle of attack from a positive angle of attack 68 near a root 58', to a negative angle of attack 70 near an outboard end 60'. Between positive angle of attack 68 and negative angle of attack 70, is a portion of airfoil 82b which is at a reduced angle of attack 72.

A small portion of an upper surface 54' is seen above leading edge 50' near root 58'. This is because upper surface 54' is convexly curved for generating aerodynamic lift. Upper surface 54' becomes more is visible near an outboard end 60' because this portion of airfoil 82b is at negative angle of attack 70. A lower surface 52' is seen below leading edge 50' between twist 66 and root 58'. From this view, lower surface 52' is not visible between outboard end 60' and twist 66 because this portion of airfoil 82b is at negative angle of attack 70.

Outboard end 60' creates a beneficial vortex 74 which rotates in a clockwise direction from this view. The rotational direction of beneficial vortex 74 creates an upwash field 76 in the wake behind trailing edge 56'.

Operation—FIGS. 1 and 2

FIGS. 1 and 2 offer an opportunity to compare how the disadvantages associated with tip vortices of the prior art are not only overcome by the methods of the present invention, but are actually converted into positive advantages.

In FIG. 1, induced drag vortex 62 forms because the air pressure is relatively high below lower surface 52 while the air pressure is relatively low above upper surface 54. As a result, air flows in an outboard direction beneath outboard end 60, and spills upward towards upper surface 54. This significantly depletes the high pressure zone existing below the entire span of lower surface 52. In addition, downwash field 64 is created by induced drag vortex 62. This increases the air pressure above upper surface 54 and decreases lift. Downwash field 64 also deflects the flow passing behind trailing edge 56 at an increased downward angle. This downward deflected flow reduces the effective angle of attack of airfoil 82a and causes induced drag to occur.

In FIG. 2, however, quite the opposite occurs. Airfoil 82b incorporates the flow control methods of the present invention, where the pressure fields surrounding outboard end 60' are strategically manipulated in order to form beneficial vortex 74. Because airfoil 82b is oriented at negative angle of attack 70 near outboard end 60', upper surface 54' near outboard end 60' is an attacking surface. At the same time lower surface 52' near outboard end 60' is out of view and protected from the oncoming flow. Such an orientation causes a relative increase in pressure to occur above upper surface 54' near outboard end 60', and also causes a relative decrease in air pressure to occur below lower surface 52' near outboard 60'.

Conventional aerodynamic theories would initially consider this angle of negative angle of attack 70 near outboard end 60' to be counter productive to performance. This is because Bernoulli's principle teaches that such an orientation creates a downward directed force upon the outboard portion of airfoil 82b, thereby creating a net reduction in lift across the entire airfoil. However, extensive experiments show that a dramatic net increase in lift can be obtained by reversing the pressure fields near the outboard end 60' in this manner. Wind tunnel experiments show that the source responsible for this unexpected increase in lift is the rotational action of beneficial vortex 74. This finding departs significantly from traditional fluid dynamic principles which hold that turbulence and vorticity are sources of energy loss.

When closely analyzed, the rotational action of beneficial vortex 74 demonstrates uncommon flow characteristics which offer unprecedented advantages. Because the air pressure above upper surface 54' near outboard end 60' is higher that the air pressure below lower surface 52' near outboard end 60', air flows in an inboard direction beneath outboard end 60'. This inboard cross flow provides a powerful oppositional force which prevents the high pressure zone beneath airfoil 82b from expanding in a spanwise direction, and therefore prevents this high pressure field from losing pressure. In addition, the presence of this net inboard cross flow condition demonstrates that the high pressure field existing beneath airfoil 82b is being compressed in a spanwise direction. This dramatically increases the air pressure beneath airfoil 82b and therefore increases lift. The greater the momentum of the inboard cross flow, the greater the degree of compression.

After the air flows inboard from outboard end 60', it then curls upward to create upwash field 76 which impacts against lower surface 52'. This further increases the air pressure beneath lower surface 52' as well as the net difference in pressure existing across airfoil 82b. Also, upwash field 76 serves to increase the effective angle of attack of airfoil 82b by modifying the flow conditions around airfoil 82b. This improves the pressure difference existing between lower surface 52' and upper surface 54' for a given actual angle of attack. This increase in the effective angle of attack permits the actual angle of attack to be decreased to compensate for this added lift. This makes airfoil 82b significantly more efficient and streamlined.

The lift created by the inboard cross flow and upwash field 76 is extraordinarily high. Experiments with flying models show that the methods of the present invention enable such models to carry much heavier cargo loads than models using prior art methods of lift enhancement. The models are able to easily lift exceptionally large cargos even at significantly low speeds. At higher speeds, the cargo capacity increases to much higher levels. Cargo capacity can be increased to many times that of the prior art. In addition to carrying heavier loads, these models fly with much greater stability, balance, and control. In all cases, the present methods permit foil type devices to outperform the prior art by such unusual margins that the present invention completely antiquates the prior art.

Another benefit is that upwash field 76 causes the flow passing behind trailing edge 56' to become deflected at an upward angle from the direction of movement of airfoil 82b (the direction of movement is towards the viewer). Because lift is perpendicular to the direction of flow, this upward deflection causes the direction of lift to tilt forward. Consequently, a significant portion of the lifting force pulls forward on airfoil 82b in the direction of its movement. Not only is the backward force of induced drag eliminated by beneficial vortex 74, but a forward force is introduced upon airfoil 82b. I call this force induced thrust because it is directed forward, and it is induced by beneficial vortex 74.

Since induced drag is replaced by induced thrust, high levels of efficiency can be achieved with low aspect ratio foils. The increased chordwise dimensions of low aspect foils increases the overall surface area of the foil. This increases the size of the pressure fields that can be generated along the opposing surfaces of the foil. Because higher levels of compression can be created along the attacking surface without increasing induced drag, low aspect ratio foils can produce exceptionally high levels of power. As a result, extremely low aspect ratio foils can be used to generate high levels of lift and low levels of drag. This is a major improvement over the prior art in which low aspect ratio foils produce low levels of lift and high levels of drag.

The twisted form of the embodiment shown in FIG. 2 permits airfoil 82b to take excellent advantage of the flow conditions created by beneficial vortex 74. Because the airfoil changes from positive angle of attack 68 near root 58', to reduced positive angle of attack 72 near twist 66, the air flowing beneath lower surface 52' is pushed in a spanwise direction from root 58' toward twist 66. As this outboard flow impacts the inboard cross flow existing beneath airfoil 82b near outboard end 60', compression occurs which further increases the air pressure below airfoil 82b. Because the inboard cross flow prevents the compressed air from escaping around outboard end 60', the compressed air is forced to escape aftward and upward behind trailing edge 56'. This improves the power of upwash field 76.

The twisted form of this embodiment also takes advantage of the strong upwash field occurring near twist 66. Because the effective angle of attack of airfoil 82b is increased a significant amount near twist 66, the twisted form of airfoil 82b lowers the actual angle of attack of airfoil 82b near twist 66. This decreases separation along upper surface 54' near twist 66, and increases attached flow above this surface. As a result, lift is increased and drag is decreased.

The increase in the effective angle of attack of airfoil 82b provided by upwash field 76, can actually cause a significant portion of airfoil 82b which is at negative attack 70 to be at a slightly positive angle of attack relative to the slope of upwash field 76. This lowers fluid pressure above a significant portion of upper surface 54' that is located near outboard end 60', thereby increasing lift and decreasing drag. Because upwash field 76 can generate lift in this manner even when the actual angle of attack is negative, a significantly large portion of the span of airfoil 82b can be oriented at a negative actual angle of attack. This permits twist 66 to exist significantly closer to root 58' in alternate embodiments.

The overall degree of spanwise twisting between root 58' and outboard end 60', depends on the actual angle of attack of attack at root 58'. Because the portion of airfoil 82b existing outboard of twist 66 is intended to be at negative angle of attack 70, as the positive angle of attack near root 58' is increased, the degree of spanwise twisting existing across airfoil 82b must also be increased. Similarly, the lower the positive angle of attack at root 58', the lower the degree of spanwise twisting. Although the spanwise twisting occurs fairly evenly across the span of this embodiment, other embodiments can twist in an uneven, exaggerated, accelerated, or abrupt manner at any location, or series of locations along airfoil 82b.

One of the fundamental principles of fluid behavior behind the present invention, is that a foil which has a difference in pressure between its opposing surfaces always generates a vortex adjacent to its low pressure surface near the tip. The strength and size of this vortex is substantially determined by the difference in pressure existing between the foil's opposing surfaces near the tip. Sometimes this vortex begins to form directly along the low pressure surface, and other times this vortex begins to form farther back in the wake. In either situation the vortex has a major impact on the foil's performance since it deflects the direction of flow leaving the foil's trailing edge.

Where traditional aerodynamic principles consider the deflection of flow created by a tip vortex to be a disadvantage, the methods of the present invention disclose how this behavior can be controlled and exploited to improve a foil's performance. In order to fully understand how a tip generated vortex can be used to enhance performance, the mechanics behind its formation must first be understood.

Before the fluid along a foil's high pressure surface can escape around the tip towards the low pressure surface, it must first flow in an outboard direction towards the tip. As this happens, it gains speed and momentum in this direction. After it reaches the tip, the outboard moving flow encounters a force towards the low pressure surface in a direction that is substantially perpendicular to the span of a foil. Because this force is perpendicular to the flow's outboard directed momentum, the flow enters into a curved path towards the low pressure surface. By the time the curved flow crosses beyond the plane of the low pressure surface, it is outboard of the tip and has gained significant momentum in a direction that is substantially perpendicular to the foil's span. At this point, the low pressure surface is inboard of this portion of the curved flow path, and therefore an inboard directed force is applied to this portion of the flow. Because this force is perpendicular to the flow's movement, the flow begins to curve in an inboard direction.

As the flow continues along its curved path, an outward force is applied to the flow which pushes fluid away from the flow's axis of curvature. This outward directed force (centrifugal force) causes a low pressure zone to form along the axis of curvature. Because areas of high pressure flow towards areas of low pressure, an inward force (centripetal force) causes the flow to spiral in towards the low pressure center existing at this axis. As this happens, the flow enters into orbital motion around the low pressure center. This orbital motion causes the flow, which is now moving inboard from the tip, to curve towards the low pressure surface, and then impact against it. After this happens, the flow moves in an outboard direction along the low pressure surface towards the tip, and then curves back away from the low pressure surface to rotate through another circular shaped orbital cycle.

The entire time the fluid is moving along the curved path, its orbital speed (angular velocity) is constantly increasing due to the interaction of centrifugal and centripetal forces within the rotating fluid. As the fluid spirals in towards the low pressure center (also called the vortex core), the fluid's rotational momentum (angular momentum) is converted into kinetic energy in the form of increased angular velocity. This is the same phenomenon that cause spinning figure skaters to spin faster as they bring their outstretched arms in closer towards their bodies. In the case of a vortex, the increase in rotational speed creates an increase in centrifugal force. This increase in centrifugal force causes a further decrease in fluid pressure within the vortex core. This in turn creates a further increase in centripetal force, which once again pushes the fluid at the outer orbital paths into an even lower orbit. As this happens, angular momentum is again converted into further increased angular velocity, and the cycle repeats itself. This complimentary relationship between centrifugal force and centripetal force quickly generates a significantly strong low pressure center at the vortex core, and high levels of rotational energy within the vortex.

The low pressure center created within the vortex core offers many benefits to the fluid flow conditions around a foil. As the flow curls around the tip towards the low pressure surface, the low pressure zone created at the vortex core acts similar to a sling shot and significantly increases the force of upwash field 76. Because areas of high pressure move towards areas of low pressure, this low pressure center provides a streamwise directed tunnel shaped escape route for the high pressure field existing below the foil. Thus, the vortex core encourages this high pressure field to flow in a substantially aftward, or streamwise direction through this tunnel shaped core before reaching the foil's tip.

Focussing the foil's high pressure field in this manner substantially improves the efficiency of the foil. The streamwise directed flow within a vortex is directed perpendicular to the plane of rotation, and is called translational flow. In a tornado type vortex, translational flow is greatest at the vortex core. Because the fluid pressure within the vortex core is significantly lower than the pressure of the surrounding fluid, the high pressure fluid along the foil's attacking surface can be accelerated to high rates of speed through this core. This permits beneficial vortex 74 to efficiently control, organize, focus, and accelerate the expansion of the high pressure field beneath the foil in a substantially unidirectional manner. Because the high pressure zone is focussed aftward, its energy is efficiently converted into increased forward thrust. This greatly improves performance under high load conditions where the fluid pressure beneath a foil can become significantly high.

As the foil's high pressure zone is accelerated through the low pressure core of beneficial vortex 74, the rotational velocity of beneficial vortex 74 is further increased. This is because increased fluid movement along the length of the core (translational flow) feeds the vortex and increases its power.

This factor is best understood by comparing vortical flow to rotational flow. In situations where rotational flow exists without translational flow, a low pressure center is initially formed at the axis of rotation from centrifugal force. However, as centripetal force causes the outer regions of the orbiting flow to spiral in towards the axis of rotation, the inward moving fluid causes an increase in pressure to occur at the axis of rotation. This is because the inward moving flow has nowhere to go to and soon becomes backed up as it approaches the axis of rotation. As pressure is increased near the axis of rotation, the difference in fluid pressure occurring between the outer orbital paths and the axis of rotation is decreased. This reduces centripetal force within the rotating fluid, and therefore the rate at which the outer orbitals accelerate towards the center axis is decreased. Consequently, angular momentum is not efficiently converted into angular velocity, and rotational velocity is decreased. This decrease in rotational velocity creates a decrease in centrifugal force which in turn creates a further increase in pressure within the axis of rotation. This once again decreases centripetal force and the cycle repeats itself. This is why strict rotational motion within a fluid is not self maintaining and quickly slows to a stop (this is often observed after stirring a cup of liquid).

In a vortex, however, rotational speed does not decrease because translational flow within the vortex core carries the inward spiraling fluid away from the original plane of rotation. This prevents the inward spiraling flow from backing up within the vortex core at the original plane of rotation. Because the inward spiraling flow can now move downstream (perpendicular to the plane of rotation), the low pressure center along the vortex core is maintained at a given plane of rotation. This permits high speeds of rotation to be reached and maintained.

For these reasons, an increase in translational flow through the vortex increases the efficiency of the vortex by increasing the downstream movement of the inward spiraling fluid. This further increases the rate at which the rotating fluid can accelerate towards the vortex core without causing an increase in pressure to occur within the core. Thus an increase in translational flow increases both the vortex's rotational speed as well as its capacity to accelerate fluid movement. Furthermore, the resulting increase in rotational velocity creates an additional drop in pressure within the vortex core which further increases the vortex's ability to transport fluid through its core. Consequently, a vortex pattern can provide a highly stable and efficient system for accelerating fluid flow. By properly planning the direction of this accelerated fluid relative to the tip region of a foil, extraordinary levels of performance can be achieved.

Description—FIGS. 3 to 8

FIG. 3 shows a top view of another embodiment of the present invention in which an inboard end 78 of an airfoil tip 80 is connected to an outboard end 60" of an airfoil 82c. An airfoil tip's outboard end 84 droops anhedrally at a outward and downward angle around a divergent axis of droop curvature 86. Outboard end 84 diverges rearwardly and outwardly from inboard end 78 which, for purposes of comparison in this example, is parallel to the direction of travel. In this embodiment, airfoil tip 80 has a trailing tip 88 which projects rearwardly behind a trailing edge 56" of airfoil 82c. In between tip 88 and trailing edge 56" is an airfoil tip's trailing edge 90 which is crescent shaped in this example. Between outboard end 84 and a leading edge 50" of airfoil 82c, is an airfoil tip's leading edge 92 which is also crescent shaped. In between inboard end 78 and an outboard end 84" of airfoil 82c, an airfoil tip's upper surface 94 curves in an outward and downward direction to form an outboard droop surface 96. Between leading edge 50" and trailing edge 56" is an upper surface 54".

FIG. 4 shows an end view of the same airfoil tip 80 from its inboard end 78. The contour of inboard end 78 is intended to substantially match the contour of outboard end 60" of airfoil 82c, and can be attached in any suitable manner. From this view, it can be seen that an airfoil tip's lower surface 98 droops in a downward direction near outboard end 84 to form an inboard droop surface 100. This anhedral droop causes outboard end 84 to be below the plane of lower surface 98. Spanwise cross sections are taken across airfoil tip 80 at a—a, b—b, c—c, d—d, and e—e.

FIG. 5 shows a perspective side view of the same airfoil tip 80 connected to outboard end 60" of airfoil 82c. This view shows the three dimensional locations of cross sections a, b, c, d, and e taken from a—a, b—b, c—c, d—d, and e—e in FIG. 4, respectively. By looking at these sections in FIG. 5, it can be seen that airfoil tip 80 has an airfoil shaped contour in both spanwise and chordwise directions. A lower surface 52" of airfoil 82c exists along the lower portion of outboard end 60".

FIG. 6 shows a two dimensional layout of the cross sections a, b, c, d, and e which are displayed three dimensionally in FIG. 5. Inboard end 78 of sections a, b, and c, are aligned vertically so that axis of droop curvature 86 an illustrate the divergent alignment of the anhedral tip droop. In this particular embodiment, upper surface 94 and lower surface 98 both curve in an outward and downward direction to form outboard droop surface 96 and inboard droop surface 100, respectively. When comparing the relative alignments of section d and section e, it can be seen that section e is slightly more vertically inclined than section d. This is because a slight vortex inducing twist exists between these two sections in the aftward trailing portion of airfoil tip 80 between these two sections.

FIG. 7 shows a rear view of the same airfoil tip 80 connected to airfoil 82c. Trailing edge 56" and trailing edge 90 are nearest the viewer.

FIG. 8 shows a front view of the same airfoil tip 80 connected to airfoil 82c. Leading edge 50" and leading edge 92 are nearest the viewer.

Many variations can be made to the shape of airfoil tip 80. For instance, the cross sectional shape of outboard end 84 can be sharply pointed, asymmetrically curved, square, thin, thick, or any variety of shapes. The curvature of the droop along inboard droop surface 100 and outboard droop surface 96 can be varied to any desirable degree. The curvature of either surface can be changed without respect to the other. The height of outboard droop surface 96, and inboard droop surface 100 can vary between cross sections a through e to produce increases or decreases in droop height over the lengthwise alignment of outboard end 84. Diverging axis of droop curvature 86 does not have to be straight, it can also be curved so that the droop becomes either increasingly or decreasingly divergent from leading edge 92 to trailing edge 90. The vortex enhancing twist near tip 88 can be decreased, increased, or eliminated entirely. Trailing tip 88 can extend aftward to any desirable length, or can be eliminated if desired.

Operation—FIGS. 3 to 8

The embodiment shown in FIGS. 3 to 8 can be used for two different methods of tip vortex control. The first method uses this design to decrease overall tip vortex generation near the tip of a foil by reducing the intensity of the undesirable cross flow conditions existing beneath the tip. The first purpose attempts to achieve smoother, and less turbulent flow conditions near the tip of the foil. Although this is not the preferred use of this embodiment, this method of use creates significantly less drag than the prior art while reducing undesirable cross flow conditions and induced drag.

In FIG. 3, axis of droop curvature 86 is seen to be oriented at a divergent angle to inboard end 78 of airfoil tip 80. Because the alignment of inboard end 78 is stated as being parallel to the direction of travel, axis of droop curvature 86 is divergent to the direction of oncoming flow (not shown). When this design is used to reduce the undesirable cross flow conditions which cause induced drag vortex formation, the degree of divergence in axis of droop curvature 86 should be slightly less divergent than the alignment of the outboard and aftward directed cross flow condition existing beneath airfoil tip 80 at a given target angle of attack and, or flow speed. This places the tip droop at a significantly reduced positive angle of attack relative to the direction of the cross flow.

In this method of use, it is intended that the positive angle of attack of the droop is reduced so that the pressure difference existing between inboard droop surface 100 and outboard droop surface 96 is substantially reduced. This decreases the tendency for air to flow in an outboard direction beneath outboard end 84, from inboard droop surface 100, towards outboard droop surface 96. This in turn substantially decreases the size and strength of the small induced drag type vortex (not shown) which forms along outboard droop surface 96 near outboard end 84 during use. Because this small vortex is reduced, the sidewash (similar to downwash on a horizontal foil) that the vortex creates against outboard droop surface 96 is also reduced. This decreases the induced drag created by the droop. Drag from transitional flow is also lower because less separation occurs along outboard droop surface 96. As a result, airfoil tip 80 incurs significantly less drag on airfoil 82c than previous winglet type devices. The reduction of this small vortex also increases the effective angle of attack of the droop surfaces relative to outboard cross flow occurring beneath outboard end 84.

Because this design decreases vortex formation along outboard droop surface 96, it is more effective at reducing undesirable cross flow conditions beneath outboard end 84. By decreasing the kinetic energy of this vortex along outboard droop surface 96, this design decreases the size and intensity of the low pressure center existing within the vortex core. Because this vortex core is less powerful, the core is less able to draw air in an outboard direction under outboard end 84. As a result, the high pressure field existing below lower surface 98 and lower surface 52 is better maintained and exhibits less spanwise expansion. This decreases the power of the larger induced drag type vortex (not shown) which is formed farther back in the wake, and therefore downwash upon upper surface 94 and upper surface 54 is significantly reduced. Also, since separation along outboard droop surface 96 is reduced, the upward moving air along this surface flows in more attached manner, and therefore the spanwise airfoil shape of the droop is more efficient at generating lift.

Many modifications of this design are possible. The droop surfaces can have higher aspect ratios to further decrease vortex formation near outboard end 84. This can be done by increasing the height of the droop surfaces and decreasing their front to back dimensions. This increases the winglet's effective surface area.

Another embodiment can be the inverse of this design. For instance, instead of having a divergent anhedral tip droop, an alternate embodiment can have a convergent dihedral tip rise near outboard end 84. In this situation, airfoil tip 80 bends dihedrally (upward) near outboard end 84 to form an upper surface winglet. This rise can occur sharply at an abrupt angle, or gradually in a curved manner. The front to back alignment of this winglet converges in an inboard and aftward manner. The degree of this convergence can be slightly less than the inboard and aftward directed cross flow existing above airfoil tip 80 at a given target angle of attack and flow speed. This reduces the impact of the inboard cross flow against the outboard surface of this winglet. Ideally, this positive angle of attack of this winglet is sufficiently decreased to substantially reduce separation as well as the formation of an induced drag vortex along the inboard surface of this upper winglet, near outboard end 84.

Although this embodiment can be used as an improved winglet to reduce the formation of all vortices near the tip of an airfoil, the preferred method of use offers far greater benefits by generating a beneficial vortex near the tip and using it as a positive benefit to performance. When this embodiment is used in this manner, it is intended that axis of droop curvature 86 is more divergent than the outboard cross flow conditions existing below airfoil tip 80 at a given target angle of attack and, or flow speed. This orientation places the tip droop at a negative angle of attack relative to the flow so that outboard droop surface 96 is now the attacking surface. As the surrounding flow impacts outboard droop surface 96, an increase in air pressure occurs along this surface. This higher pressure air spills in an inboard direction below outboard end 84 towards inboard droop surface 100 to form an inboard and upward rolling beneficial vortex (not shown) in the wake behind airfoil tip 80.

A major benefit to this design is that a small beneficial vortex (not shown) can easily be formed along inboard droop surface 100. This can be achieved by aligning axis of droop curvature 86 at a sufficiently divergent angle to the oncoming flow (not shown) to permit the inboard cross flow below outboard end 84 to separate from inboard droop surface 100. This separation can also be achieved by increasing the height and, or anhedral inclination of inboard droop surface 100. After the inboard cross flow separates from inboard droop surface 100 it curves upward towards lower surface 98 and then flows in an outboard direction towards an upper portion of inboard droop surface 100, and finally flows in a downward direction along inboard droop surface 100 towards outboard end 84 to rejoin the inboard cross flow below outboard end 84. For purposes of maximizing lift, it is intended that this small beneficial vortex circulates along a substantially streamwise axis so that its direction of spin compliments and strengthens the larger beneficial vortex (not shown) which develops farther back in the wake.

This smaller vortex offers many benefits which dramatically improve a foil's performance. The low pressure zone created at the core of this small vortex draws the inboard cross flow under outboard end 84 at an accelerated rate. This vortex also adds kinetic energy into the boundary layer existing along inboard droop surface 100 and the outboard portion of lower surface 98. This decreases drag by reducing the thickness of the boundary layer and by increasing its rate of flow. The rotational motion of this small vortex can also function like a wheel on a conveyer belt which drives and stabilizes the inboard cross flow. Because a vortex tends to quickly reach high speeds of rotation, this small vortex permits the inboard cross flow to increase in both speed and volume. This increases the momentum of the inboard cross flow below outboard end 84, as well as the force with which the upwash field (not shown) impacts against lower surface 98 and lower surface 52". This in turn increases compression to the high pressure field existing below airfoil 82c and airfoil tip 80, and also increases the upward deflection of the wake.

The high rotational velocity of this small beneficial vortex formed along inboard droop surface 100 has many other benefits as well. Because this vortex is formed beneath airfoil tip 80 and inboard of inboard droop surface 100, it can be trapped between lower surface 98 and inboard droop surface 100. As this vortex spins, centrifugal force is applied against lower surface 98 and inboard droop surface 100. This force compresses the air existing between the vortex core and these surfaces. This compressed air pushes upwards against lower surface 98 to increase lift. I call this phenomenon centrifugal lift. The greater the rate of spin, the greater the degree of centrifugal lift. The compressed air existing between the vortex core and airfoil tip 80 also pushes back upon the vortex core so that the core hovers at a constant distance from lower surface 98 and inboard droop surface 100, for a given rate of spin. The position of the vortex core remains highly stable because the vortex's rapid rotation creates significant levels of gyroscopic inertia which resists changes in position. This resistance permits the fluid within the tubular shaped vortex to behave as if it is more rigid than substantially linear flow, or laminar flow.

If a situation occurs where airfoil tip 80 begins to apply a greater downward force against the trapped vortex, the vortex's resistance to change in motion causes the air between lower surface 98 and the vortex core to become more compressed. The resulting increase in air pressure pushes back against lower surface 98 to oppose the downward movement of airfoil tip 80. The gyroscopic inertia provided by this vortex offers a more resistive fluid structure to "push off" from (such as when maneuvering, accelerating, impelling, or propelling). This greatly improves a foil's efficiency and power. Because the vortex is tubular in form and well contained by lower surface 98 and inboard droop surface 100, the vortex is highly stable and efficiently transfers significant amounts of gyroscopic inertia and centrifugal lift to airfoil tip 80.

This small beneficial vortex's ability to increase fluid pressure in this manner is improved by the presence of inboard droop surface 100. This is because the anhedral orientation of inboard droop surface 100 contains this vortex in a spanwise direction and prevents it from being pushed outboard beyond outboard end 84 by a sudden large increase in air pressure below airfoil 82c and airfoil tip 80. This greatly increases the vortex's stability and improves its ability to generate high levels of compression below airfoil 82c and airfoil tip 80. Also, the anhedral orientation of inboard droop surface 100 causes the air below outboard end 84, to immediately begin flowing in a less downward, and more inboard manner. This further improves compression below airfoil 82c and airfoil tip 80.

In the case of an airplane wing (as well as many other foil type devices), the gyroscopic inertia created by the small beneficial vortex created below airfoil tip 80, significantly improves many aspects of performance including stability. Because a beneficial vortex is formed under each of the plane's wing tips, the plane actually rides on top of two side by side vortices (one under the left wing tip, and one under the right wing tip) in a manner that is similar to a train which rides on top of two side by side tracks. The gyroscopic inertia of each vortex offers a supportive force under each airfoil tip 80 which permits a plane to fly with unprecedented smoothness and stability. In addition, the compressed air located between the vortex core and airfoil tip 80 acts like a shock absorber, and cushions abrupt changes in movement. Because the vortices are located near the outboard portions of each wing, the plane is extremely stable and strongly opposes vertical fluctuations within the flight path. This significantly reduces a plane's tendency to bounce up and down, or to roll and sway from side to side. Since this small beneficial vortex also pushes sideways against inboard droop surface 100 (with centrifugal force), its gyroscopic inertia opposes sideways fluctuations within the flight path as well. The creation of the vortex under each wing permits the foils to "grip" the air and maintain a steady flight path (this also occurs with any foil type device within any fluid medium). This ability to grip the air also greatly improves the efficiency and smoothness of maneuvers. In addition, the strongest portions of the upwash field created by these vortices create a concentrated peak high pressure zone under an outboard portion of each wing which also acts like a supportive track on which the plane can ride. Because these peak high pressure zones are significantly spaced apart on opposite sides of the plane, they function similarly to two vertical supports which are holding up the opposite ends of a horizontal beam. Experiments with model planes employing these techniques of vortex induced stabilization demonstrate such smooth and stable flight characteristics that they give the visual impression that they are traveling on an invisible track system within the air.

This stabilizing effect also improves performance when the flow conditions surrounding a foil are highly turbulent. Because the beneficial vortex spins rapidly and has substantial momentum and power, it is highly stable and difficult to destroy. This allows the beneficial vortex to dominate over surrounding turbulent conditions which are not as strong as this vortex. As a result, the advantageous flow conditions created by the beneficial vortex dominate even in extremely turbulent flow conditions. This permits lift, induced thrust, stability, and control to be maintained. The strong low pressure center existing at the vortex core is also able to draw gusts into the vortex and dissipate their adverse effects. This can actually increase the power of the vortex and increase lift on the foil by feeding the vortex core and increasing upwash. Both the vortex's gyroscopic inertia and the shock absorbing effect of the compressed air existing between the vortex core and airfoil tip 80 function to significantly reduce the sudden impact of surrounding turbulence. This reduces shock forces to the foil and increases riding comfort to passengers riding aboard an airplane (or other modes of transportation which travel either through or upon fluid mediums). If by chance a strong gust or zone of turbulence momentarily destroys the beneficial vortex, the difference in pressure existing between outboard droop surface 96 and inboard droop surface 100 quickly recreates the beneficial vortex. This in turn quickly restores beneficial flow conditions surrounding the foil, and stable flight is quickly restored.

The tendency for fluid to enter into turbulent flow under the slightest provocation, allows the beneficial vortex to form in conditions where smooth linear flow cannot be achieved. As a result, the methods of the present invention permit foil type devices to perform exceptionally well even in highly turbulent flow conditions. This represents a major improvement over prior foil designs which perform poorly in highly turbulent conditions because of their dependence on smooth linear flow for achieving control and generating lift.

A design feature which increases the strength and stability of a beneficial vortex is the aftward extension of airfoil tip 80 towards tip 88. This improves beneficial vortex production by decreasing the droop's aspect ratio, and increasing the droop's surface area. The decrease in aspect ratio encourages vortex formation by decreasing resistance to circulatory flow. The increase in surface area increases the size of the pressure fields created along outboard droop surface 96 and inboard droop surface 100. Because the length of outboard end 84 is increased along with this increase in the size of these pressure fields, the total volume of air which flows in an inboard direction below outboard end 84 is increased. This improves the strength, power, and stability of the beneficial vortex. In some applications, tip 88 can extend aftward many times the chordwise dimension of airfoil 82c.

By comparing the relative alignments of cross sections d and e in FIGS. 5 and 6, it can be seen that a slight twist occurs along the length of the aftward extended portion of airfoil tip 80. This twist makes section e more vertically inclined than section d. Because airfoil tip 80 produces an inboard directed cross flow beneath outboard end 84, the steeper inclination of section e causes increased flow separation to occur along inboard droop surface 100 near tip 88. This separated flow circulates smoothly around the small beneficial vortex existing along inboard droop surface 100 near tip 88. This increases the size, speed, strength, and stability of this beneficial vortex and greatly increases the foil's performance. Because of this, the twist occurring between section d and section e, is a vortex inducing twist.

Although the amount of twist near tip 88 is small, it can vary for different embodiments. This twist can be used to change the anhedral inclination of the droop along its length. For instance, the inclination of outboard droop surface 96 and inboard droop surface 100 can be more horizontally oriented near leading edge 92, and more vertically oriented near tip 88 (or vise versa). The twist can be abrupt, gradual, slightly pronounced, highly pronounced, or exponential in form. The twist can also be used to create an anhedral droop near tip 88, where either little or no droop is used forward of this position. In this case, the aftward extended portion of airfoil tip 80 originates in a horizontal orientation just aft of trailing edge 56", and then twists into an anhedral orientation near tip 88. This produces a beneficial vortex in the wake behind airfoil tip 80 with minimal drag. This arrangement is highly effective in high speed and, or low load applications.

All of the various parameters of airfoil tip 80 can be changed according to desire without departing from the fundamental methodology of the present invention. This is because the shape and contour of airfoil tip 80 determines the specific flow characteristics which are created around airfoil tip 80 during beneficial vortex production. Inboard droop surface 100 can be less concavely curved (or even be made convexly curved) so that the inboard flow bending around inboard droop surface 100 flows more smoothly. This can cause the beneficial vortex to form farther back in the wake and be less powerful along inboard droop surface 100. This same surface can also be made more concavely curved to encourage the inboard cross flow to separate more rapidly from inboard droop surface 100. This increases the power and size of the beneficial vortex formed along this surface. The concave shape of inboard droop surface 100 can be made sufficiently curved to form, and partially contain a beneficial vortex of desired size, strength, and flow characteristics.

Another variable that can be manipulated is the degree to which axis of droop curvature 86 actually diverges from the direction of flow surrounding outboard end 84. As axis of droop curvature 86 becomes increasingly more divergent than the inboard and aftward cross flow conditions below airfoil tip 80, the air pressure created along outboard droop surface 96 becomes greater. This is because outboard droop surface 96 impacts the oncoming flow in a more broad sided manner. This increases the size and intensity of the high pressure field existing along outboard droop surface 96, and therefore causes an increase in the size and strength of the vortex (or circulating separation) formed along inboard droop surface 100. This circulating separation along inboard droop surface 100 circulates around an axis that is substantially parallel to the alignment of axis of droop curvature 86. Because of this, as the alignment of axis of droop curvature 86 becomes increasingly divergent, this circulating separation existing along inboard droop surface 100 rotates around more of a spanwise axis, and less of a streamwise axis. As this happens, the vortex along inboard droop surface 100 becomes less aligned with the streamwise beneficial vortex existing in the wake behind airfoil tip 80. This decreases the degree to which the circulatory separation along inboard droop surface 100 is able to assist with the formation of the larger streamwise beneficial vortex formed farther back in the wake. Consequently, as divergent axis of curvature becomes increasingly divergent, the separation along inboard droop surface 100 creates more drag from transitional flow.

If it is desired to have axis of droop curvature be more divergent, but low levels of drag from transitional flow are also desired, the degree of anhedral tip droop can be decreased. This reduces the quantity of separation along inboard droop surface 100. As long as outboard droop surface 96 remains the relative high pressure surface of the droop, and inboard droop surface 100 remains the relative low pressure surface of the droop, a streamwise beneficial vortex still forms in the wake.

Another way to decrease drag is to decrease the degree to which axis of droop curvature diverges from the oncoming flow. This permits the vortex formed along inboard droop surface 100 to rotate around a more streamwise axis so that it is more aligned with the larger beneficial vortex formed in the wake behind airfoil tip 80. By coordinating the alignment of the circulating separation with the alignment of the larger beneficial vortex in the wake, the circulating separation assists more towards increasing lift, and creates less drag. As axis of droop curvature 86 becomes less divergent, the effective surface area of outboard droop surface 96 decreases (relative to the oncoming flow). If it is desired to increase this effective surface area while minimizing the divergence of axis of droop curvature 86, the angle existing between upper surface 94 and outboard droop surface 96 can be increased. As this angle approaches 270 degrees (an angle of 180 degrees causes upper surface 94 and outboard droop surface 96 to be parallel), the negative angle of attack of the tip droop increases. This increases the pressure difference between outboard droop surface 96 and inboard droop surface 100, and therefore increases the size and strength of the vortex existing along inboard droop surface 100.

To permit axis of droop curvature to be continuously adjustable, an alternate embodiment can entail mounting airfoil tip 80 to airfoil 82c in a manner which permits airfoil tip 80 to pivot around an axis that is substantially perpendicular to either lower surface 52" or upper surface 54" of airfoil 82c. Such a pivoting axis can allow airfoil tip 80 to swing forward and aftward relative to airfoil 82c. This permits the alignment of axis of curvature to be continuously adjustable. As a result, airfoil tip 80 can be adjusted to compensate for changes in cross flow conditions, as well as create changes in cross flow conditions. This also permits variable control over the beneficial vortex.

It is preferred that the beneficial vortex formed by airfoil tip 80 is sufficiently strong enough to permit its flow characteristics to dominate over those of an induced drag vortex. However, an alternate use of airfoil tip 80 is to generate a beneficial vortex which does not dominate over an induced drag vortex, but instead significantly reduces the strength of an induced drag vortex. One way of doing this is to substantially decrease the height of inboard droop surface 100 and, or outboard droop surface 96. The height of these surfaces can be lowered near, or even below the height of the boundary layer existing below lower surface 98. This lowers the depth of the inboard cross flow created by the beneficial vortex adjacent to inboard droop surface 100. If the volume of this inboard cross flow is small enough, the high pressure field existing below airfoil 82c and airfoil tip 80 can escape below this inboard cross flow and begin forming an outboard cross flow beneath the inboard cross flow. The expanding outboard cross flow then forms a dominating induced drag vortex in the wake behind airfoil tip 80. Even though the induced drag vortex is permitted to dominate, the inboard cross flow created by the small beneficial vortex dramatically reduces the strength of the outboard cross flow condition. This permits large reductions in separation, downwash, and induced drag. Wind tunnel tests with models using this method show significant reduction in the formation of induced drag type vortices. This allows higher angles of attack to be used with decreased vorticity. Stall conditions are significantly delayed and performance is increased without the added weight and drag penalties created by large winglets. The inboard cross flow created by the small anhedral droop provides significant opposition to outboard cross flow conditions beneath airfoil tip 80 and airfoil 82c. Even when only a small portion of outboard end 84 is bent anhedrally in this manner, significant results are achieved. Many such tests show that the beneficial vortex can still exist in the wake behind airfoil tip 80, but its rotational speed is small and the core of this small beneficial vortex is often pushed substantially outboard of tip 88 by the dominating induced drag vortex. Although this method of induced drag reduction offers less parasitic drag and greater efficiency than prior methods of tip vortex reduction, the greatest levels of performance are created by forming a beneficial vortex which dominates the flow conditions existing at the outer tip region of a foil.

Another embodiment can be an inverse of the design shown in FIGS. 3 to 8. A dihedral rise can occur near outboard end 84, instead of an anhedral droop. This dihedral rise causes outboard end 84 to exist above the plane of upper surface 94. Rather than having divergent axis of droop curvature 86, this alternate embodiment can have a converging axis of dihedral rise. This causes the plane of the dihedral rise to be aligned in a rearwardly convergent direction. In order to produce a beneficial vortex, the plane of this dihedral rise is made more convergent than the alignment of any inboard cross flow conditions existing above airfoil tip 80 (such cross flow conditions occur when an induced drag vortex dominates a foil's tip). By orienting the plane of the dihedral rise at a sufficiently convergent angle, the inboard surface of the dihedral rise is able to become the attacking surface. The resulting increase in pressure along this inboard surface creates an outboard directed cross flow above outboard end 84. This creates a beneficial vortex adjacent to the outboard surface of the dihedral rise. This forms a large beneficial vortex which dominates the wake behind airfoil 82c and airfoil tip 80. This beneficial vortex produces an outboard cross flow above outboard end 84, an inboard cross flow below airfoil tip 80, and an upwash field behind airfoil tip 80 and airfoil 82c. It is preferred that the beneficial vortex formed by any embodiment of airfoil tip 80 is sufficiently strong enough to permit it to dominate the outer tip region of a foil.

Description—FIGS. 9 and 10

FIG. 9 shows a bottom view of a movable vortex flap 102 attached to an airfoil 82d. This bottom view orients a lower surface 52''' of airfoil 82d towards the viewer. An outboard end 60''' of airfoil 82d diverges rearwardly. A vortex flap's inboard end 104 is connected to outboard end 60''' in any suitable manner which permits the alignment of flap 102 to move relative to the alignment of airfoil 82d. For instance, hydraulic or cable controls mechanisms can be used either with or without hinge-like mechanisms. In this embodiment, flap 102 is intended to pivot along a divergent axis that is substantially parallel to the lengthwise alignments of outboard end 60''' and inboard end 104. Other embodiments can place flap 102 at any location on airfoil 82d as long as it is substantially near outboard end 60''', and is able to pivot along a substantially divergent axis. Although the pivotal axis in this embodiment is highly divergent, the degree of divergence can vary for different purposes and situations. Any device that can cause a beneficial vortex to form can also be used instead of this device, or in combination with it.

The shape of 102 can take many forms. A vortex flap's outboard end 106 is curved in this embodiment, but can also be straight, angled, or sinuous across its length. A trailing tip 88' can extend behind a trailing edge 56''' of airfoil 82d to any desirable length. In this embodiment, a vortex flap's leading edge 108 is convexly curved, but it may be of any desirable shape. Leading edge 108 can even be eliminated completely by having outboard end 106 meet inboard end 104 at a sharp angle near a leading edge 50''' of airfoil 82d. A vortex flap's trailing edge 110 is straight, but it can also be curved in either a convex or concave manner. Although the alignment of trailing edge 110 is seen as being parallel with inboard end 104, it can also be made to be either more or less divergent than inboard end 104, parallel to the direction of travel, or even converge inboard relative to the direction of travel. Trailing edge 110 can also extend parallel to the alignment of trailing edge 56''' of airfoil 82 so that trailing tip 88 is eliminated. The distance between inboard end 104 and outboard end 106 can vary according to the aspect ratio that is desired. The overall size of flap 102 can be made smaller so that it extends over only a small portion of outboard end 60'''. For example: rather than extending across the entire length of outboard end 60''', flap 102 can be located near a leading portion, a trailing portion, or an intermediate portion of outboard end 60'''. Also, instead if being attached to outboard end 60''', flap 102 can be located along an outboard portion of leading edge 50''', trailing edge 56''', lower surface 52''', or a portion of the upper surface (not shown) of airfoil 82d. A vortex flap's lower surface 112 is shown as being flat, but can be convexly or concavely curved, cone shaped, twisted along its length, or pre-shaped with an anhedral droop of desired divergence.

FIGS. 10a through 10e show front perspective views of the same airfoil 82d and flap 102 shown in FIG. 9. In FIGS. 10a to 10e, airfoil 82d is always inclined at the same positive angle of attack while flap 102 is deployed at a variety of attack angles relative to the oncoming flow. Leading edge 50''' of airfoil 82d is nearest the viewer and trailing edge 56'' is farthest from the viewer. Airfoil 82d and flap 102 are moving towards the viewer, and therefore the direction of the oncoming flow originates from the viewer's perspective.

FIG. 10a shows flap 102 at a positive angle of attack. Lower surface 112 is substantially parallel to lower surface 52'' of airfoil 82d. FIG. 10b shows flap 102 at a reduced positive angle of attack which forms an anhedral droop. FIG. 10c shows flap 102 at a zero angle of attack, and only outboard end 106 is visible to the viewer. FIG. 10d shows flap 102 deployed at a negative angle of attack. As a result, a vortex flap's upper surface 114 is now visible to the viewer. Outboard end 106 is seen below upper surface 114, while inboard end 104 is seen above upper surface 114. In this illustration, upper surface 114 is flat, but it can also be made curved, angled, or any variety of contours. FIG. 10e shows flap 102 at an increased negative angle of attack. This orientation displays more surface area of upper surface 114.

Operation—FIGS. 9 to 10

By adjusting flap 102 to various angles of attack, the cross flow conditions occurring beneath flap 102 can be modified and controlled. This permits flap 102 to control the flow characteristics of the tip vortex formed in the wake behind flap 102 and airfoil 82d. FIGS. 10a to 10e show flap 102 oriented at various angles of attack relative to the oncoming flow, while airfoil 82d remains at a constant angle of attack. This embodiment functions similarly to the embodiment shown in FIGS. 3 to 8, except that this design shown in FIGS. 9 to 10 permits the angle of attack of the tip droop to be adjusted.

In FIG. 10a, lower surface 112 is parallel to lower surface 52''', and therefore flap 102 is at the same positive angle of attack as airfoil 82d. Because this makes lower surface 112 the attacking surface, an increase in pressure occurs below flap 102, and a strong induced drag vortex (not shown) results in the wake.

FIG. 10b shows flap 102 oriented to form an anhedral tip droop. The angle between lower surface 52''' and lower surface 112 is decreased and less surface area of lower surface 112 is visible to the viewer. This places flap 102 at a reduced positive angle of attack. Although this orientation still produces an induced drag vortex in the wake, the size and strength of this vortex is significantly decreased. In FIG. 10c, flap 102 is at a zero angle of attack relative to the oncoming flow. This orientation also decreases the size and intensity of the induced drag vortex. FIG. 10d shows flap 102 inclined at a slightly negative angle of attack which makes upper surface 114 the attacking surface. This orientation produces a beneficial vortex (not shown) in the wake. FIG. 10e shows flap 102 in an increased negative angle of attack. This orientation also produces a beneficial vortex in the wake, however, because flap 102 pivots on a highly divergent axis increased separation occurs beneath flap 102 which increases transitional flow. This can be useful in situations where high amounts of lift are desired during low speed conditions, such as while an airplane is taking off or landing. On a landing approach, a highly negative orientation of flap 102 on each wing can assist in slowing air speed while generating high levels of lift.

A major benefit of this embodiment is that the trim (or inclination) of flap 102 can be adjusted as the angle of attack of airfoil 82*d* is changed. In many situations, it is desirable for flap 102 to be in a slightly negative angle of attack in order to produce a beneficial vortex with minimal drag. The adjustable nature of flap 102 permits it to remain at this orientation while airfoil 82*d* varies its angle of attack. The desired inclination of flap 102 can be adjusted and maintained by either manual or automated controls. Automated control systems may employ any suitable form of mechanical system (such as gears, hydraulics, cables, pulleys, etc) which automatically adjust flap 102 to its optimum position for a given angle of attack and, or air speed. More sophisticated systems can be interfaced to a computer which is equipped with suitable programs for controlling the position of flap 102 through a wide range of conditions such as take off, landing, climbing, maneuvering, gliding, cruising, changing speed, descending, and diving. Adjustments can also be made for various wind conditions such as turbulence, wind shear, cross winds, etc.

Another embodiment can be the inverse of this design. Rather than pivoting on a divergent axis, flap 102 can pivot on a convergent axis. With this angle of rotation, flap 102 can be deployed in a dihedral orientation to airfoil 82*d* in order to be at a reduced positive, or negative angle of attack relative to the oncoming flow. A negative attack angle causes upper surface 114 to be the attacking surface. The resulting increase in pressure along this surface creates an outboard directed cross flow near outboard end 106. This creates a beneficial vortex adjacent to lower surface 112 near outboard end 106, and therefore produces an upwash field behind trailing edge 56''', as well as behind trailing edge 110.

Figure 12:
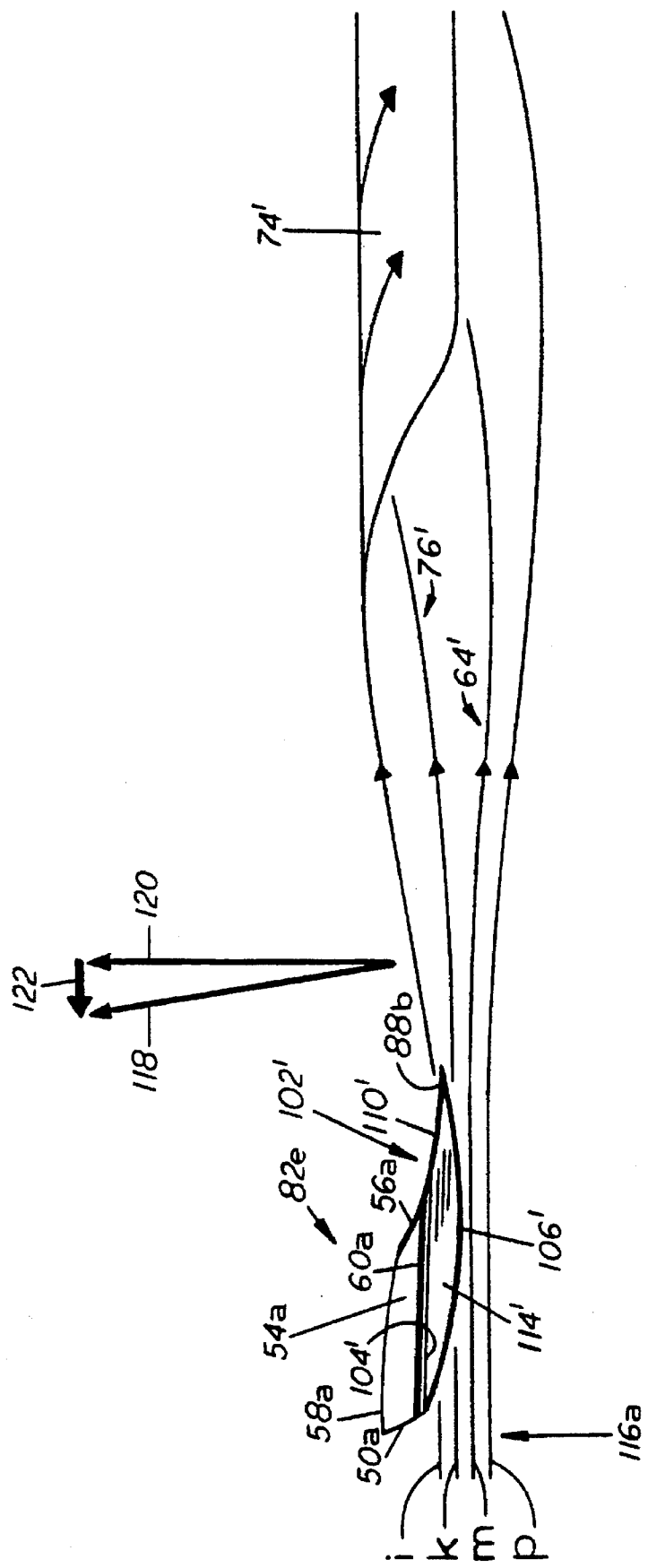
FIG. 12 shows a perspective side view of the same airfoil with streamlines i, k, m, and p from FIG. 11 passing under its lower surface.
Figure 13:
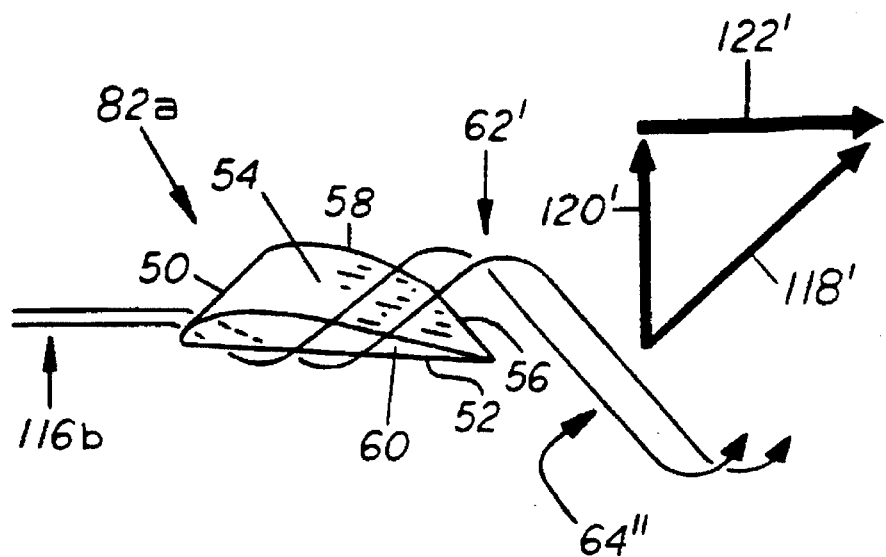
FIG. 13 shows a comparative perspective side view of a prior art airfoil which has two streamlines passing under its outboard end.

Description—FIGS. 11 to 13

FIG. 11 shows a top view of an airfoil 82*e* with a vortex flap 102' during a wind tunnel test. Airfoil 82*e* is at a positive angle of attack and flap 102' is at a negative angle of attack relative to an oncoming flow 116*a*. In this example, a trailing edge 56*a* and a leading edge 50*a* of airfoil 82*e* are swept back and curved. A vortex flap's inboard end 104' is attached to an outboard end 60*a* of airfoil 82*e* in any suitable manner which permits flap 102' to move relative to airfoil 82*e*. The top view orients both an upper surface 54*a* of airfoil 83*e*, and a vortex flap's upper surface 114' towards the viewer. A vortex flap's trailing edge 110' is curved and more divergent than inboard end 104'. A vortex flap's outboard end 106' is also curved so that a trailing tip 88" is crescent shaped.

This embodiment functions in the same manner as the embodiment shown in FIGS. 9 and 10. In FIG. 11, the slight changes in shape of airfoil 82*e* and flap 102' are shown to display one of the many possible forms that the present invention can embody.

Oncoming flow 116*a* is represented by a series of streamlines passing beneath airfoil 82*e* and flap 102'. The streamlines are labeled f to p. Streamline f is the most inboard of the streamlines and streamline p is the most outboard. It can be seen that streamlines f to p converge in an inboard direction as they pass by airfoil 82*e* and flap 102'. The streamlines form a beneficial vortex 74' in the wake behind airfoil 82*e* and flap 102'. Streamlines f to j are seen within beneficial vortex 74'.

FIG. 12 shows a perspective side view of the same airfoil 82*e* and flap 102' shown in FIG. 11. The same oncoming flow 116*a* is shown except that only streamlines i, k, m, and p from FIG. 11 are shown in FIG. 12 in order to clearly illustrate of the flow characteristics from this view in an uncluttered manner. Beneficial vortex 74' is shown forming in the wake behind airfoil 82*e* and flap 102'. Beneficial vortex 74' creates an upwash field 76' which is displayed by the upwardly deflected streamlines i and k. Beneficial vortex 74' also creates a downwash field 64' which is displayed by the downwardly deflected streamlines m and p.

The three arrows shown above the streamlines represent the addition of force vectors. A lift vector 118 is perpendicular to the upwardly angled streamline i in the wake. Because of this vector 118 is tilted forward. A vertical component 120 of lift vector 118 is directed upward, and a horizontal component 122 of lift vector 118 is directed forward.

FIG. 13 offers a prior art comparison to FIG. 12 by showing a similar perspective side view of the same prior art airfoil 82*a* which is shown in FIG. 1. In FIG. 13, an oncoming flow 116*b* is made up of two streamlines passing beneath airfoil 82*a* near outboard end 60. These two streamlines flow outboard along lower surface 52, upward around outboard end 60, inboard along upper surface 54, and then downward passed trailing edge 56. This swirling motion displayed by the two streamlines forms an induced drag vortex 62'. The two streamlines are deflected downward passed trailing edge 56 to display a downwash field 64". A lift vector 118' is perpendicular to the inclination of the downward deflected streamlines. A vertical component 120' of lift vector 118' is directed upward, and a horizontal component 122' of lift vector 118' is directed backward.

Operation—FIGS. 11 to 13

FIG. 11 shows beneficial vortex 74' forming in the wake behind airfoil 82*e* and flap 102'. Streamlines f to 1 pass beneath airfoil 82*e* and flap 102', while streamlines m to p pass flap 102' outboard of tip 88". In front of airfoil 82*e* and flap 102', streamlines f to p are all oriented in a substantially horizontal plane which is located below both airfoil 82*e* and flap 102'. However, soon after these streamlines pass below airfoil 82*e* and flap 102', they begin to converge in an inboard direction. These streamlines continue to converge until they enter into vortical motion in a smooth manner. As this happens, the streamlines substantially maintain their parallel orientation with each other. This is seen while observing the paths of streamlines f to j as they flow into beneficial vortex 74'.

This smooth formation of beneficial vortex 74' shows that the turbulence produced is highly ordered and non-chaotic in nature. Because the streamlines are not intermixed in a chaotic manner, the process which creates beneficial vortex 74' is highly efficient. This also shows that the structure of beneficial vortex 74' is highly stable. This allows beneficial vortex 74' to be controllable, predictable, and dependable.

As the streamlines flow beneath airfoil 82*e* and flap 102', they flow in an inboard direction to form an inboard cross flow condition below the plane of airfoil 82*e*. This inboard cross flow displays the present invention's ability to contain the high pressure field existing below airfoil 82*e*. The rotation of beneficial vortex 74' forces the flow to move inboard below flap 102' The inboard cross flow compresses the high pressure field below airfoil 82*e* in a spanwise manner. The substantial volume of this inboard cross flow demonstrates that considerable inboard momentum exists. This momentum permits high levels of compression to occur, and stabilizes the integrity of beneficial vortex 74'.

Even the streamlines m to p, which are located substantially outboard of tip 88", are drawn inboard into beneficial vortex 74' farther back in the wake.

FIG. 12 shows a perspective side view of the same airfoil 82e and flap 102' producing beneficial vortex 74'. Streamlines i, k, m, and p, are all located below the plane of airfoil 82e and flap 102'. These streamlines lie within a plane that is substantially parallel to the spanwise alignment of airfoil 82e. Just as shown in FIG. 11, the streamlines m and p shown in FIG. 12 are located outboard of tip 88", and the streamlines i and k are located inboard of tip 88".

In FIG. 12, the streamlines m and p are deflected downward past tip 88" to display downwash field 64'. Streamline p is deflected further downward than streamline m. Downwash field 64' has no adverse effects on performance because it exists outboard of tip 88'. Instead, it benefits performance by increasing the volume of the inboard cross flow occurring below the plane of airfoil 82e. This is because downwash field 64' curls in an inboard direction below the plane of airfoil 82e.

While this occurs, streamlines i and k are deflected upward behind airfoil 82e and flap 102' to display upwash field 76'. The more inboard streamline i is deflected at a greater upward angle than streamline k. Because both of these streamlines are flowing inboard at the same time that they are flowing upward, a significant portion of upwash field 76' exists behind airfoil 82e.

One of the most significant benefits of upwash field 76' is the creation of induced thrust. Because lift vector 118 is tilted forward from vertical component 120 by the upward deflection of streamline i, horizontal component 122 is directed forward. This displays that a forward directed force of induced thrust is exerted upon airfoil 82e by the action of beneficial vortex 74'. This forward force of induced thrust substantially counteracts the overall drag incurred by airfoil 82e and flap 102'. As a result, a significant portion of the aftward directed drag forces created by surface drag and transitional flow can be off set by the presence of this forward directed force of induced thrust.

The presence of induced thrust creates many new behaviors on foil type devices. In numerous experiments, flying models that are launched on a significantly horizontal glide path quickly accelerate in a forward direction to significantly higher speeds than the initial velocity given at the launch. Velocity continues to increase until the drag from surface area and transitional flow increases from the increased speed. When these drag forces equal the force of induced thrust, a terminal glide velocity is reached and maintained along the glide path. When the models are given heavier cargo loads and then launched along the same glide path, they accelerate to a significantly higher terminal glide velocity. When these gliding models are launched with an initial velocity that is slightly higher than its specific terminal glide velocity, the models begin to fly horizontally. At higher initial velocities, the models enter into a climb. By decreasing the negative inclination of flap 102', this climbing tendency is reduced, and a higher terminal glide velocity can be achieved. Because the models are able to achieve significantly low rates of descent while maintaining a given terminal glide velocity, only minimal propulsion is needed to achieve a completely horizontal flight path. This can increase velocity just enough to create a zero rate of descent. Such a velocity can be called the horizontal maintenance velocity. If propulsion is further increased to accelerate the model to speeds greater than its given horizontal maintenance velocity, the model enters into a climb. This horizontal maintenance velocity is easily adjusted by varying the trim setting of the anhedral tip droop. Because induced thrust can be used to minimize the need for propulsion, airplanes creating induced thrust can significantly reduce fuel consumption to unprecedented levels.

Another fascinating behavior created by induced thrust is the ability for a foil to penetrate through an fluid medium that is moving in the opposite direction of the foil. In airplane applications, this quality greatly increases the plane's ability to penetrate a headwind. Extensive experiments show that gliding models designed to create induced thrust can actually enter into flight and accelerate in a forward direction into a headwind even if the model is given no initial launch velocity relative to the ground. This behavior occurs when the velocity of the approaching headwind is substantially close to the horizontal maintenance velocity of the model. When the trim setting of the anhedral tip droop is adjusted so that the horizontal maintenance velocity is equal to the velocity of the headwind, the model is able to hover in a stationary position within the air. In this stationary position, the model can maintain a constant altitude above a specific ground position for sustained periods of time. By making slight adjustments in the trim setting of the anhedral tip droop, the model is able to move either forward or backward (as well as vary its altitude) relative to the ground while hovering within this headwind. These flight maneuvers can be observed in seagulls (as well as many other seabirds) as they hover within a headwind in one position, or move relative to this position without flapping their wings (only fine tune adjustments in the trim of their wings are made).

In addition to generating induced thrust, upwash field 76' shown in FIG. 12 is seen to increase the effective angle of attack of airfoil 82e. The upward deflection of streamlines i and k within upwash field 76' increase the ability of airfoil 82e to create a substantial difference in pressure between its opposing surfaces for a given angle of attack. Consequently, the actual angle of attack of airfoil 82e can be reduced in order to compensate for this net increase in lift. Such a reduction in the actual angle of attack creates less of a disturbance in the surrounding flow and lowers the aftward forces of surface drag and transitional flow. By minimizing these drag forces the net effect of induced thrust is increased. Unprecedented levels of efficiency can be achieved by creating and utilizing beneficial vortex 74' to create induced thrust. This is a major advantage over the prior art in which the total drag on a foil created by surface drag and transitional flow is increased by the further addition of induced drag.

FIG. 13 shows side view of prior art airfoil 82a which illustrates the undesirable flow characteristics inherent to the prior art. The two streamlines of oncoming flow 116b flow outboard below lower surface 52 near outboard end 60. This displays that spanwise expansion is occurring within the high pressure field existing below lower surface 52. This spanwise expansion decreases the intensity of the high pressure field, and therefore significantly decreases lift across airfoil 82a. After flowing outward, the two streamlines flow upward around outboard end 60 to begin forming induced drag vortex 62'. This upward flowing portion of induced drag vortex 62' serves no useful purpose because it occurs outboard of airfoil 82a. As the two streamlines flow inboard above upper surface 54, compression occurs to the low pressure field above this surface. This lowers lift by further decreasing the pressure difference between upper surface 54 and lower surface 52. After flowing in an inboard direction above upper surface 54, the two streamlines flow downward behind trailing edge 56 and display downwash field 64". Because lift is perpendicular to the direction of flow, downwash field 64" causes lift vector 118' to tilt backwards. Consequently, horizontal component 122' of lift vector 118' is directed aftward, thereby displaying the presence of induced drag. The downward deflection of the two streamlines also displays the decrease in the effective angle of attack created by induced drag vortex 62'. As a result, efficiency is low and overall drag is high.

Figure 14:
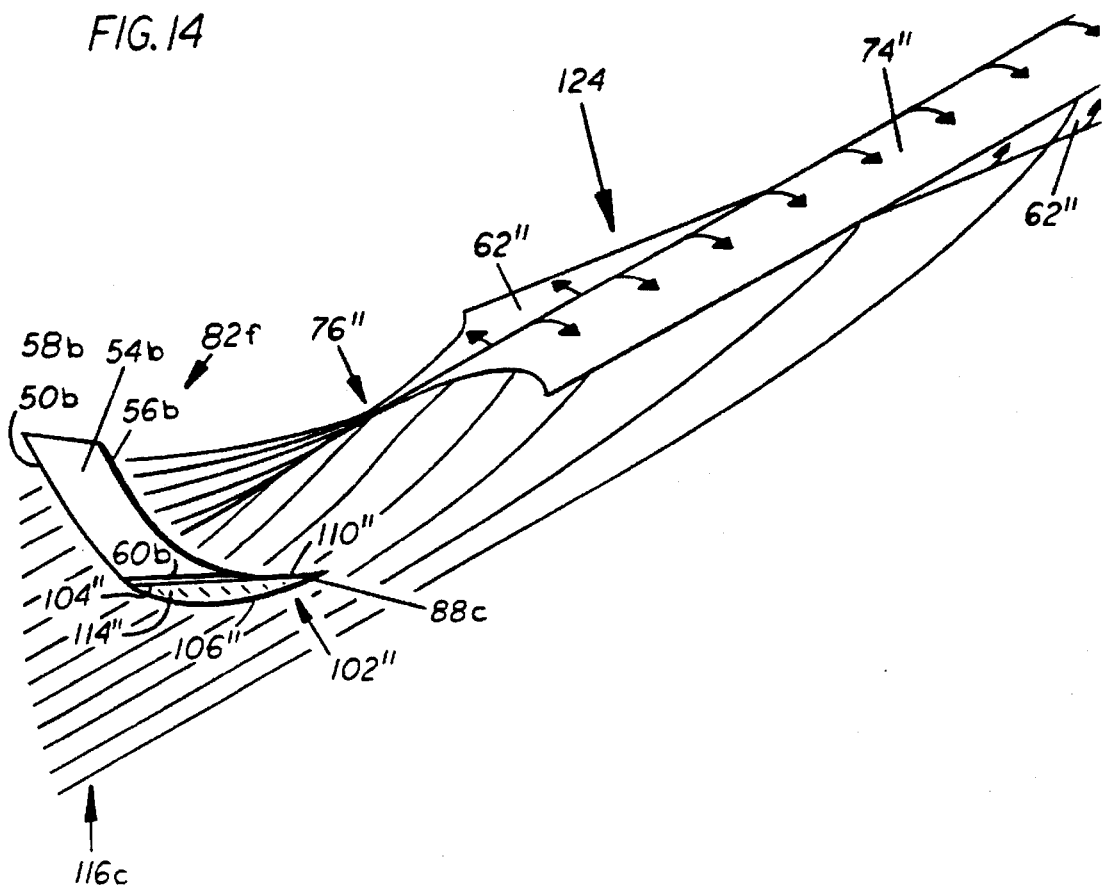
FIG. 14 shows an upper perspective view of a double vortex pattern created by streamlines passing under both an airfoil which is inclined at a positive angle of attack, and a vortex flap which is inclined at a negative angle of attack.
Figure 15:
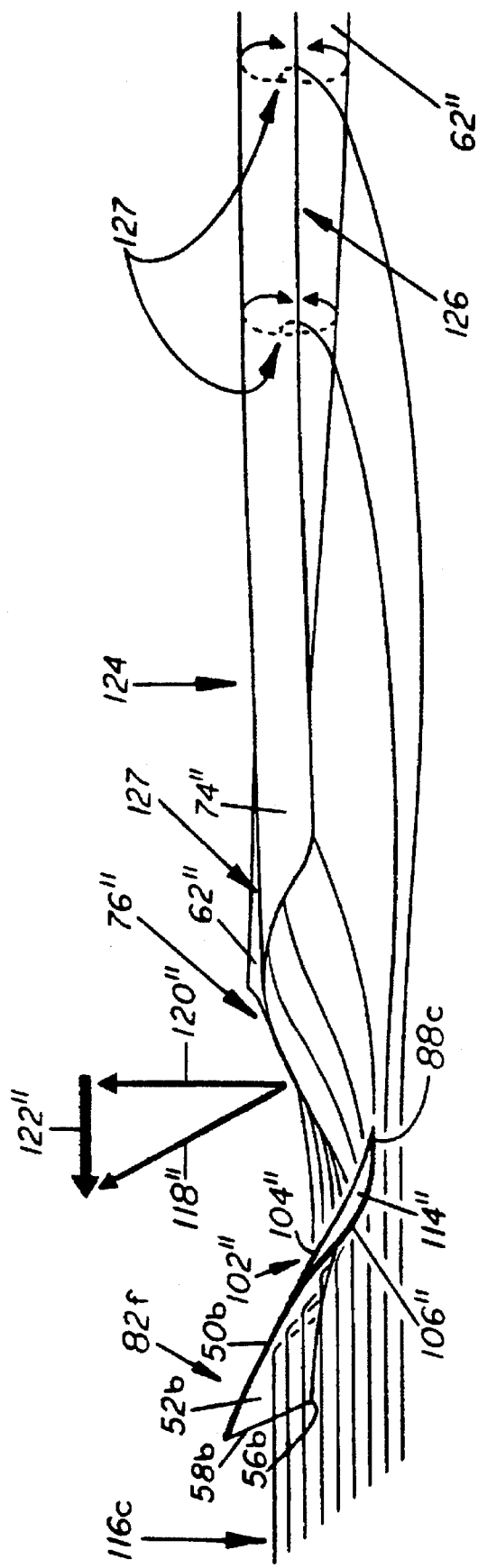
FIG. 15 shows a perspective side view the same double vortex pattern created by streamlines passing under the lower surface of the same airfoil and vortex flap.

Description—FIGS. 14 and 15

FIGS. 14 and 15 show two different views of an airfoil 82f and a vortex flap 102" which are similar to the embodiments shown in FIGS. 9 to 12. The shape of the embodiment shown in both FIGS. 14 and 15 is slightly different than the embodiments shown in FIGS. 9 to 12. This is done to show another example of the many possible forms that the present invention may embody. In FIGS. 14 and 15, an airfoil 82f becomes increasingly swept along its span from a root 58b towards a trailing tip 88c. Although, some slight changes in shape exist in comparison to the embodiments shown in FIGS. 9 to 12, the system in FIGS. 14 and 15 function in the same manner.

FIG. 14 shows a perspective view from above airfoil 82f and flap 102", in which an oncoming flow 116c is seen passing below airfoil 82f and flap 102" to form a double vortex pattern 124 in the wake. Airfoil 82f is at a high positive angle of attack, and flap 102" is deployed at a negative angle of attack. Just prior to the formation of double vortex 124, an upwash field 76" rises behind a trailing edge 56b of airfoil 82f. An upper surface 54b is seen between trailing edge 56b and a leading edge 50b. A vortex flap's inboard end 104" is attached to outboard end 60b of airfoil 82f in any suitable manner which permits flap 102" to pivot relative to airfoil 82f. A vortex flap's outboard end 106" is curved, and decreases in divergence towards tip 88c. A vortex flap's upper surface 114" is seen between outboard end 106" and inboard end 104". A vortex flap's trailing edge 110" extends rearwardly towards tip 88c.

Double vortex 124 is made up of a beneficial vortex 74" and an induced drag vortex 62". The arrows on each vortex indicates the direction of spin. At the beginning of the formation of double vortex 124, induced drag vortex 62" is inboard of beneficial vortex 74", in a side by side orientation. Farther back in the wake, however, double vortex 124 shifts into a vertical orientation where beneficial vortex 74" is located above induced drag vortex 62".

FIG. 15 shows a perspective side view of the same double vortex 124 shown in FIG. 14. In FIG. 15, airfoil 82f is at a significantly high positive angle of attack, and flap 102" is at a negative angle of attack. A lower surface 52b of airfoil 82f is visible from this view. Again, beneficial vortex 74" is located outboard of induced drag vortex 62" at the forward portion of double vortex 124 (near upwash field 76"), and then beneficial vortex 74" is located above induced drag vortex 62" farther back in the wake.

The two streamlines that are outboard of flap 102" are deflected downward after they pass tip 88c, and then flow in an inboard and upward direction towards double vortex 124. These two streamlines are drawn into an inward flowing portion 126 of double vortex 124 farther back in the wake where beneficial vortex 74" is located above induced drag vortex 62" in a substantially vertical position. In this example, portion 126 is located on the outboard side of double vortex 124, and is seen as the line existing between beneficial vortex 74" and induced drag vortex 62". This line which represents portion 126 is initially located along the lower portion of double vortex 124 near upwash field 76", and is therefore out of view. As beneficial vortex 74" and induced drag vortex 62" become vertically oriented farther back in the wake, portion 126 becomes visible as its position shifts from existing along the lower portion of double vortex 124, to existing along the outboard side of double vortex 124.

As the two streamlines are seen entering double vortex 124 through portion 126 farther back in the wake, the dotted lines show the path of these two streamlines while they are within double vortex 124. As they reach the opposite side of double vortex 124 (which in this example is the inboard side), each streamline reaches a bifurcating portion 127 of double vortex 124. Portion 127 exists along the entire length of double vortex 124. Near upwash field 76", portion 127 is located along the upper portion of double vortex 124. As double vortex 124 shifts into a vertical orientation farther back in the wake, portion 127 moves out of view as it occupies the inboard portion of double vortex 124. When the two streamlines reach portion 127, the dotted lines show that these streamlines bifurcate (or divide in two) in a vertical manner into both beneficial vortex 74" and induced drag vortex 62". The dotted lines convert back into solid lines as the bifurcated streamlines reappear on the outboard portion of double vortex 124. The arrows show the direction of spin within each vortex as each bifurcated streamline begins to spiral in towards the core of its respective vortex. The core of each vortex exists substantially along the center axis of each vortex.

The paths taken by these two streamlines within double vortex 124 outline the general cross sectional shape of double vortex 124. This cross section shape is substantially C-shaped with portion 126 existing at the center of the open portion of the C-shape. Portion 127 exists at the center of the closed back wall of the C-shape. The two open ends of the C-shape then loop back in upon themselves to form two separate counterrotating vortices within double vortex 124. This C-shape is oriented with its open portion facing down near upwash field 76", an then twists into a substantially vertical orientation farther back in the wake.

The upward flowing streamlines, which display upwash field 76", form a wedge shaped peak in the wake behind trailing edge 110" and trailing edge 56b. A lift vector 118", which is taken at the peak of upwash field 76", is tilted forward. A vertical component 120" of lift vector 118" is directed upward, and a horizontal component 122" of lift vector 118" is directed forward.

Many variations of this flow pattern are possible without departing from the basic methodology of the present invention. Although this illustration shows beneficial vortex 74" and induced drag vortex 62" of double vortex 124 changing from a side by side orientation to a vertical orientation farther back in the wake, many different types vortex generators can be used to produce double vortex 124 in which beneficial vortex 74" and induced drag vortex 62" remain in a side by side orientation farther back in the wake. In these situations, portion 126 remains along the lower portion of double vortex 124, and portion 127 remains along the upper portion of double vortex 124. As a result, the streamlines passing outboard of tip 88c enter through portion 126 from underneath double vortex 124. After reaching portion 127, these streamlines bifurcate horizontally along the upper portion of double vortex 124 into beneficial vortex 74" and induced drag vortex 62". With some vortex generators, double vortex 124 may assume an angled orientation farther back in the wake, or may have a pattern of additional vortices surrounding double vortex 124 in a wide variety of orientations. Many orientations of multi-vortex patterns arise when vortices generated from other sources on the foil, or surrounding surfaces, interact with double vortex 124. Such additional vortices can be used in a constructive manner to further increase performance and overall efficiency.

Operation—FIGS. 14 and 15

FIG. 14 shows the formation of double vortex 124 behind airfoil 82f and flap 102". This pattern results as induced drag vortex 64" forms inboard of beneficial vortex 74". When airfoil 82f is inclined at extremely low angles of attack, induced drag vortex 62" can either be nonexistent, or very weak. At higher angles of attack, induced drag vortex 62" increases in strength, and can become as strong, or even stronger than beneficial vortex 74" (depending on the trim setting of flap 102"). Because beneficial vortex 74" within double vortex 124 forms in substantially the same position behind flap 102" as shown in the previous embodiments, double vortex 124 shares the same advantages discussed in the previous embodiments.

As double vortex 124 is formed by flap 102", beneficial vortex 74" dominates the wake behind flap 102" and the outer region of airfoil 82f. Consequently, induced drag vortex 62" is forced to occupy a position inboard of beneficial vortex 74". This moves induced drag vortex 62" to a position behind airfoil 82f that is sufficiently inboard of outboard end 60b and prevents induced drag vortex 62" from inhibiting performance. This inboard movement of induced drag vortex 62" is due to the favorable cross flow conditions created by flap 102".

Because induced drag vortex 62" occupies this new position, its effect on airfoil 82f is far different than that experienced by the prior art. Turning back to FIG. 13, the upward flowing portion of induced drag vortex 62' exists outboard of outboard end 60, and therefore the energy existing within this upward flowing portion is wasted. Looking now at FIG. 14, however, the upward flowing portion of induced drag vortex 62" exists inboard of flap 102". As a result, this upward flowing portion of induced drag vortex 62" pushes up against lower surface 52b to increase pressure there. This upward flowing portion also adds energy to upwash field 76". The beneficial effect of this increase in energy within upwash field 76" overcomes any negative effect of the downwash created near the inboard side (downward flowing potion) of induced drag vortex 62". This is because the upward flowing portion of induced drag vortex 62" deflects the flow upward to create induced thrust. This induced thrust efficiently neutralizes any induced drag created by the downward flowing portion of induced drag vortex 62".

In addition to eliminating induced drag, the new location occupied by induced drag vortex 62" also offers many other advantages. Since the upward flowing portions of induced drag vortex 62" and beneficial vortex 74" are adjacent to each other, the total volume and power of upwash field 76" is increased. This increases the force with which upwash field 76" impacts against lower surface 52b, and also increases the total height and slope of upwash field 76". The side by side orientation of double vortex 124 permits any increase to the strength of induced drag vortex 62" to cause a complimentary increase in the strength of beneficial vortex 74".

Also, the lower portion of induced drag vortex 62" creates a powerful outboard directed cross flow beneath lower surface 52b. This outboard cross flow impacts against the inboard cross flow created under outboard end 60b and flap 102" by beneficial vortex 74". As these two cross flows collide, high levels of compression are created below lower surface 54b. This substantially increases pressure within the high pressure field existing beneath airfoil 82c, thereby increasing lift. As this fluid compresses, it begins to curl upward into a large wedge shaped upwash field 76". The zone of maximum pressure expands upward to form a sharp peak at the center of upwash field 76". The added compression created by the action of induced vortex 62" greatly enhances the height, power, and steepness of this sharp peak within upwash field 76". This improves lift, induced thrust, and stability. At the highest point of this peak, upwash field 76" divides in a horizontal manner (relative to the plane of airfoil 82f) into induced drag vortex 62" and beneficial vortex 74", respectively. This transition into double vortex 124 occurs in a smooth and highly ordered manner which does not disturb the parallel relationship of the streamlines. Because of this, double vortex 124 is stable and predictable.

FIG. 15 shows a perspective side view of the same double vortex 124 created behind airfoil 82f and flap 102". From this view it can be seen that the angle of attack of airfoil 82f is significantly high, and upwash field 76" is substantially strong and steep. Because lift vector 118" is tilted forward from vertical component 120", horizontal component 122" is directed forward, thereby displaying the presence of induced thrust. While the greatest amount of induced thrust occurs at the sharp peak in upwash field 76", significant levels of induced thrust also results from the upward deflection displayed by many of the streamlines surrounding this peak.

This side view illustrates the substantial increase in the effective angle of attack induced by double vortex 124. As stated previously, the effective angle of attack is the combination of the actual angle of attack and the induced angle of attack. In this situation, the actual angle of attack is the angle existing between the chordwise alignment, or inclination of airfoil 82f, and the alignment of oncoming flow 116c. The induced angle of attack is the angle existing between the alignment of upwash field 76" and oncoming flow 116c. The induced angle of attack at the peak portion of upwash field 76" is also equal to the angle existing between lift vector 118" and vertical component 120". Because upwash field 76" is defected upward (in the direction of desired lift) from the plane of oncoming flow 116c, the induced angle of attack has a positive value. Consequently, this positive value is added to the actual angle of attack of airfoil 82f to produce a significant increase in the effective angle of attack. As a result, the effective angle of attack is greater than the actual angle of attack of airfoil 82f. Such an increase in the effective angle of attack greatly increases efficiency and lift. This is a significant achievement because on finite foils of the prior art, the effective angle of attack is lower than the foil's actual angle of attack.

While providing these advantageous flow conditions, it can be seen that double vortex 124 is a highly ordered and efficient flow pattern. The streamlines which pass outboard of tip 88c display a slight downward deflection and are then drawn upward and inboard into double vortex 124 through portion 126. As these streamlines bifurcate at portion 127 in a smooth manner into beneficial vortex 62" and induced drag vortex 74", it can be seen that double vortex 124 draws in a significant volume of the surrounding fluid medium without causing chaotic disruption of the fluid. As a result, the formation of double vortex 124 does not incur significant drag upon airfoil 82f.

Because various inclinations of flap 102" create variations within the cross flow conditions beneath it, flap 102" can be used to control the flow characteristics of beneficial vortex 74", as well as double vortex 124. This permits flap 102" to be used to control the size and inclination of upwash field 76". As a result, the direction of lift on airfoil 82f can be varied according to desire. In the case of an airplane, the direction of lift can be manipulated relative to the plane's center of gravity in order to create vertical changes in the plane's angle of attack. This can allow the plane to enter into either a climb or dive maneuver. This can also permit the plane to correct for changes in its center of gravity which occur when cargo and, or passengers are loaded. The ability to compensate for these changes can enable the plane to fly with further improved fuel efficiency, control, and stability. Also, the direction of lift can be changed independently on each wing in order to create numerous maneuvers such as turns and rolls.

Figure 16:
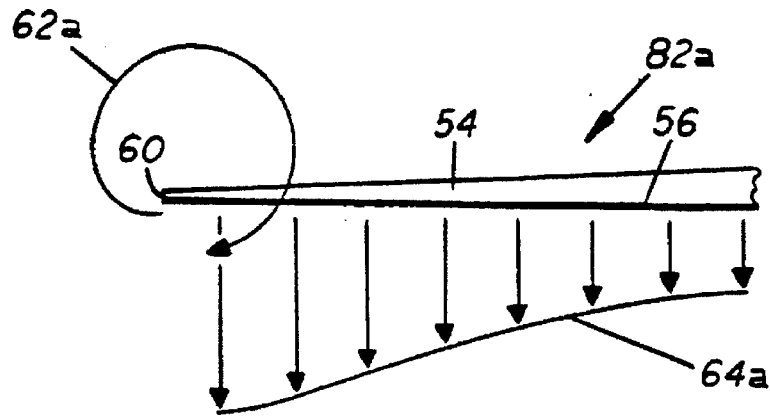
FIG. 16 shows a rear view of an induced drag vortex produced by a prior art airfoil.
Figure 17:
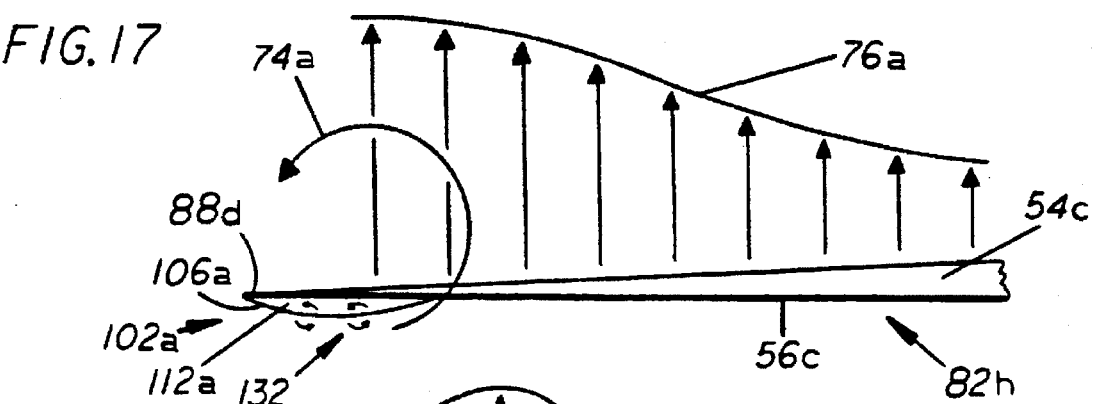
FIG. 17 shows the same view of a beneficial tip vortex produced by an airfoil which has a vortex flap that is inclined at a negative angle of attack.
Figure 18:
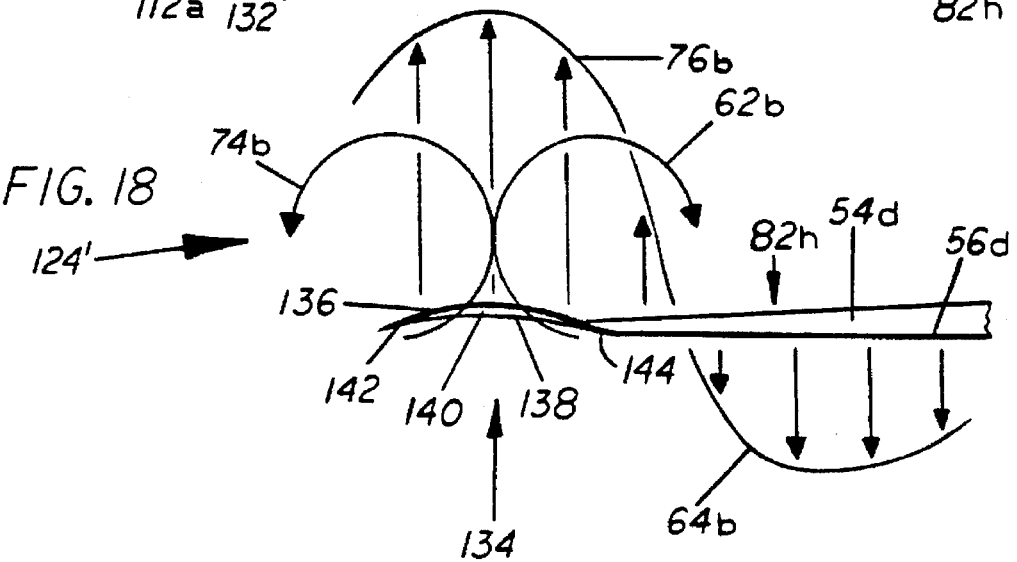
FIG. 18 shows the same view of a double vortex pattern produced by an airfoil having a cone shaped vortex generator.

Description—FIGS. 16 to 18

FIG. 16 shows a rear view of the same prior art airfoil 82a which is shown in FIGS. 1 and 13. In FIG. 16, airfoil 82a is at a positive angle of attack. Trailing edge 56 is nearest the viewer and upper surface 54 is seen above trailing edge 56. An induced drag vortex 62a is formed near outboard end 60, and creates a downwash field 64a to form in the wake behind trailing edge 56.

FIG. 17 shows the same rear view of an airfoil 82g which is at the same positive angle of attack, but has a vortex flap 102a deployed at a negative angle of attack. A trailing edge 56c of airfoil 82g is closest to the viewer, and an upper surface 54c is seen above trailing edge 56c. Flap 102a functions in the same manner as the embodiments shown in FIGS. 9, 10, 11, 12, 14, and 15. In FIG. 17, flap 102a is mounted to airfoil 82g in any suitable manner which permits it to pivot relative to airfoil 82g in an anhedral manner along a substantially divergent axis. From this rear view, a vortex flap's lower surface 112a is visible since flap 102a is inclined at a negative angle of attack. A vortex flap's outboard end 106a is seen at the lower portion of Flap 102a. A trailing tip 88d exists at the outer portion of flap 102a. A flow separation 132 (represented by swirling arrows) forms along lower surface 112a near outboard end 106a, as the fluid curls in an inboard direction below outboard end 106a. A beneficial vortex 74a is formed by flap 102". Beneficial vortex 74a creates an upwash field 76a in the wake behind trailing edge 56c.

FIG. 18 shows the same rear view of an airfoil 82h which is also at a positive angle of attack. A trailing edge 56d of airfoil 82h is closest to the viewer, and an upper surface 54d is seen above trailing edge 56d. Airfoil 82h has a cone shaped vortex generator 134 located at the outer portion of airfoil 82h. In this example, cone 134 is a partial section of a hollow cone that is oriented hollow side down with the narrower end aimed forward. The spanwise alignment of cone 134 is substantially parallel to the spanwise alignment of airfoil 82h.

In alternate embodiments, cone 134 can be oriented so that its spanwise is at an anhedral, or dihedral angle relative to the spanwise alignment of airfoil 82h. Experiments with these alternate orientations demonstrate significant performance characteristics even when cone 134 is mounted so that its spanwise alignment is at a 90 degree angle to the spanwise alignment of airfoil 82h. In these situations, cone 134 can be mounted to the outer portion of airfoil 82h as an upper surface winglet with its hollow side (lower surface 140) oriented at a negative angle of attack and aiming in an outboard direction. The alignment of the axis of curvature of this outboard facing surface can be downwardly inclined to increase the power of beneficial vortex 74b. Cone 134 can also be mounted to the outer portion of airfoil 82h as a lower surface winglet with its hollow side (lower surface 140) oriented at a negative angle of attack and aiming in an inboard direction. In this situation, the alignment of the axis of curvature of this inboard facing surface can be inclined at an upward angle to increase the power of beneficial vortex 74b.

A cone's trailing edge 136 is nearest the viewer, while a cone's leading edge 138 is farthest from the viewer. Both trailing edge 136, and a cone's lower surface 140 are arched in a concave down manner. The radius of curvature of lower surface 140 decreases from trailing edge 136 to leading edge 138. Lower surface 140 is at a negative angle of attack relative to the oncoming flow. A cone's outboard end 142 is divergent to the oncoming flow, and therefore creates an inboard cross flow beneath it. This inboard cross flow also occurs because lower surface 140 is at a negative angle of attack. The inboard cross flow occurring below outboard end 142 then curves upward to form a beneficial vortex 74b behind trailing edge 136. A cone's inboard end 144 creates an outboard cross flow which curves upward to form an induced drag vortex 62b.

As a result, cone 134 causes a double vortex pattern 124' to form in wake behind trailing edge 136 and trailing edge 56. Double vortex 124' causes an upwash field 76b to form in wake behind cone 134. A majority of upwash field 76b is formed substantially inboard of outboard end 142 in the wake behind cone 134. The downward flowing portion of beneficial vortex 74b exists substantially outboard of outboard end 142, and therefore does not reduce performance. Induced drag vortex 62b is located inboard of beneficial vortex 74b in the wake behind trailing edge 136, and trailing edge 56d. The outboard portion of induced drag vortex 62b contributes towards the formation of upwash field 76b. The inboard portion of induced drag vortex 62b causes a downwash field 64b to form in the wake behind trailing edge 56d.

Double vortex 124' is similar to that shown in FIGS. 14 and 15, where airfoil 82f is at a highly positive angle of attack and flap 102" is at a negative angle of attack. In FIG. 18, cone 134 is able to create an extremely strong double vortex 124' while airfoil 82h is at a significantly low angle of attack. A wide variety of vortex generating devices and mounting orientations can be used to create double vortex 124'. Any such device which can be used to create either beneficial vortex 74, or double vortex 124, may be used.

In this example, cone 134 is symmetrically arched and its axis of curvature is substantially parallel to the direction of travel. In other embodiments, cone 134 can be asymmetrically arched and the alignment of its axis of curvature can be varied according to desire (such as convergent or divergent relative to the direction of travel). The radius of curvature can also be varied along the span and, or length of cone 134 to create a wide variety of shapes.

Operation—FIGS. 16 to 18

FIGS. 16 to 18 compare rear views of the downwash fields and upwash fields created by three different types of tip vortex patterns. FIG. 17 shows flap 102a deployed at a negative angle of attack in order to produce beneficial vortex 74a, which in turn creates upwash field 76a. When comparing upwash field 76a shown in FIG. 17 to downwash 64a in FIG. 16, it can be seen that the embodiment in FIG. 17 overcomes the problems of the prior art and uses tip vortex formation as a benefit. The upwash field 76a in FIG. 17 is responsible for creating induced thrust on airfoil 82g. As flap 102a is inclined to an increasingly negative angle of attack, the size of separation 132 is increased. The size and strength of separation 132 can be varied by adjusting the inclination of flap 102a according to desire.

FIG. 18 shows double vortex 124 created by cone 134 while airfoil 82h is at a low positive angle of attack. It can be seen that the outboard portion of induced drag vortex 62b forms the inboard portion of upwash field 76b. It is this portion of upwash field 76b which off sets the effects of downwash field 64b created by the inboard portion of induced drag vortex 62b behind trailing edge 56d. The creation of induced thrust neutralizes any induced drag on airfoil 82h. Because the outboard portion of portion of upwash field 76b, which is created by beneficial vortex 74b, is not counteracted by corresponding downwash field of its own existing inboard of outboard end 142, a net upward deflection occurs behind cone 134 and airfoil 82h. Consequently, the total volume of upwash field 76b is greater than the total volume of downwash field 64b. This neutralizes induced drag across the entire foil, and creates a net gain in induced thrust. The net gain in upwash also increases the effective angle of attack of airfoil 82h, and cone 134. When, comparing these results to those of the prior art shown in FIG. 16, it can be seen that the embodiment in FIG. 18 creates and utilizes vorticity in a manner which overcomes the problems associated with prior art tip vortices without reducing overall tip vortex production.

The flow pattern shown in FIG. 18 is the same type of flow pattern which can occur to the embodiment shown in FIG. 17 if airfoil 82b is oriented at a high positive angle of attack while flap 102b is at a negative angle of attack (such as shown in FIGS. 14 and 15). In FIG. 18, it is intended that the specific shape and contour of cone 134 is chosen to create desired flow characteristics for a given target angle of attack and, or target flow speed.

Adjustment mechanisms can be added to cone 134 in order to control the intensity and slope of upwash field 76b. For instance, an aileron type flap can be used along a portion of trailing edge 136 so that the aileron can deflect the slope of upwash field 76b in order to create variations in lift, as well as induced trust. Also, a divergently aligned flap can be used along outboard end 142 in order to vary the intensity of beneficial vortex 74b.

Description—FIG. 19

Figure 19A:
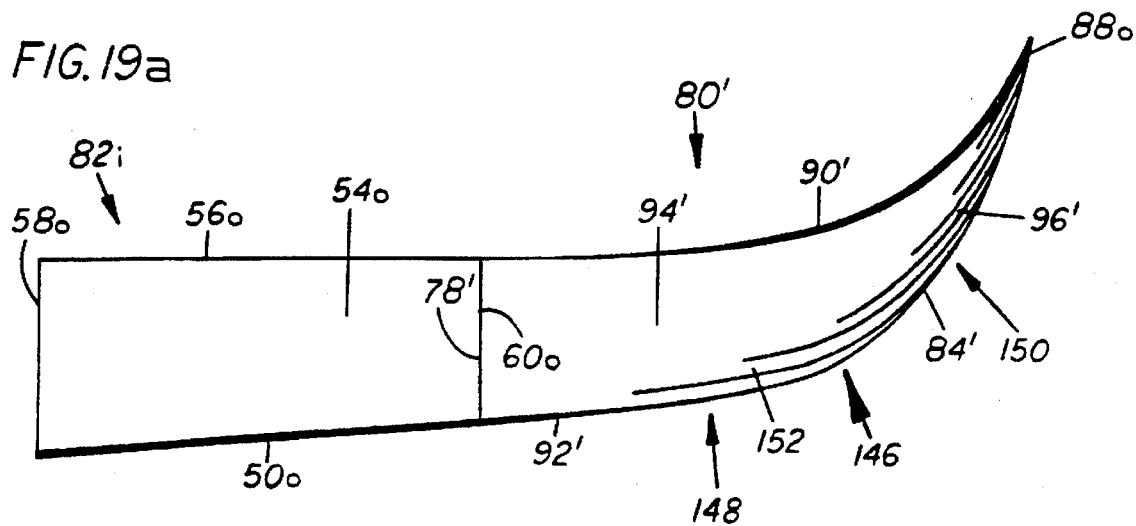
FIGS. 19a to 19d show four different views of an another embodiment of an airfoil tip which has a curved droop, and is attached to the outboard end of an airfoil.

FIG. 19a to 19d show various views of an airfoil tip 80' connected to an outboard end 60o of an airfoil 82i. Airfoil tip 80' has a curved outboard droop 146 which is displayed by parallel shading lines. This curved droop 146 bends down in an anhedral manner. FIG. 19a shows a top view of this embodiment. From this view, both an upper surface 54o of airfoil 82i, and an airfoil tip's upper surface 94' face the viewer. Upper surface 54o terminates at a leading edge 50o, a trailing edge 56o, a root 58o, and outboard end 60o. An airfoil tip's inboard end 78' attaches to outboard end 60o of airfoil 82i in any suitable manner.

Both airfoil 82i and airfoil tip 80' twist along their spans to produce a smooth change in the relative angle of attack existing between root 58o and a trailing tip 88o. Airfoil 82i is at a positive angle of attack, and therefore leading edge 50o of airfoil 82i is nearer to the viewer, and trailing edge 56o of airfoil 82i is farther from the viewer. The twist in airfoil 82i places outboard end 60o at a lower positive angle of attack than that existing at root 58o. The angle of attack of inboard end 78' substantially matches that of outboard end 60o. Airfoil tip 80' then twists along its span from a positive angle of attack at inboard end 78', into a negative angle of attack towards tip 88o. Consequently, the outboard portions of an airfoil tip's trailing edge 90' are nearer to the viewer, while the more outboard portions of an airfoil tip's leading edge 92', and an airfoil tip's outboard end 84' are farther from the viewer.

Variations of this design can have no twist along the span of airfoil 82i and, or airfoil tip 80'. If no twist is used along either airfoil 82i or airfoil tip 80', only curved droop 146 (displayed by parallel shade lines) exists outside the plane of airfoil 82i. Also, the span and aspect ratio of airfoil 82i and, or airfoil tip 80', can vary widely on alternate embodiments in order to suit different purposes and applications.

A major feature of the embodiment shown in FIG. 19a is that airfoil tip 80' has curved droop 146. Curved droop 146 incorporates a leading edge droop 148 which gradually transforms into an outboard edge droop 150 between leading edge 92' and outboard edge 84'. Leading edge droop 148 is more divergent than outboard edge droop 150. As leading edge droop 148 curves forward and downward toward leading edge 92', upper surface 94' forms a forward droop surface 152 near leading edge 92'. Similarly, as outboard edge droop 150 curves in an outboard and downward toward outboard end 84', upper surface 94' forms an outboard droop surface 96' near outboard end 84'.

Many variations of this design can be used. The decrease in divergence from leading edge droop 148 to outboard edge droop 150 is shown to occur in a smoothly curved manner. This curve can be substantially even or exponential in form. The degree of curvature can be significantly high, moderate, or barely noticeable. This curvature can also occur in a series of substantially straight segments. The alignment of outboard edge droop 150 can level off to a predetermined angle of divergence as it approaches tip 88o. It can also continue to decrease in divergence until it becomes aligned with either the direction of travel or the direction of cross flow occurring beneath tip 88o. The alignment of outboard edge droop 150 near 88o can also be made to converge at an inboard angle. Any desired combination of changes in divergence can be used for various applications. Another variation includes having the most inboard portion of curved droop 146 form behind leading edge 92' so that curved droop 146 exists solely along outboard edge 84' and not along leading edge 92'. Curved droop 146 can also exist solely behind trailing edge 56o. Although in this embodiment, tip 88o is tapered and crescent shaped, it can be shaped in any desirable manner. Tip 88o can extend rearwardly at any desirable angle or length, and can also be eliminated entirely.

Both airfoil 82i and airfoil tip 80' are shown to be rearwardly swept relative to the alignment of root 58o, however, many variations in sweep can be used as well. The degree of rearward sweep can be increased substantially, especially for high speed, supersonic, or hypersonic embodiments. In such situations airfoil 82i and airfoil tip 80' together can form a delta shaped wing of significantly low aspect ratio. Also, airfoil tip 80' can be more swept than airfoil 82i. Other embodiments can include a forward swept airfoil 82i and a rearward swept airfoil tip 80', as well as a forward swept airfoil 82i and a forward swept airfoil tip 80'. Any combination and degree of sweep can be used to suit various needs and situations.

Figure 19B:
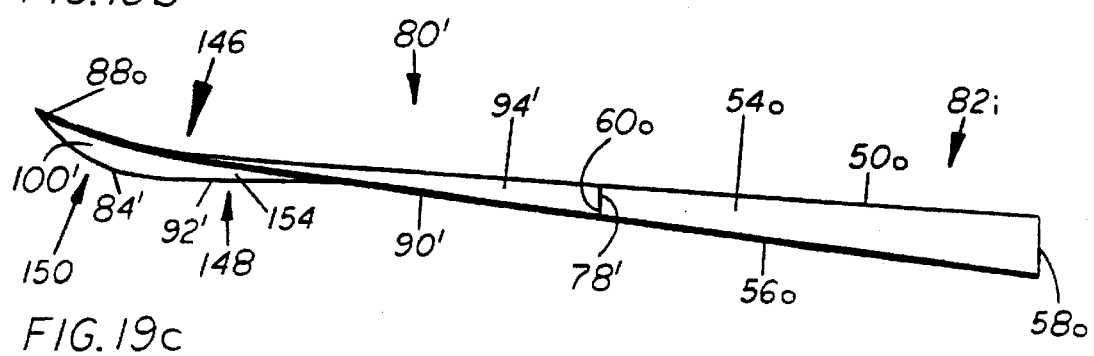

FIG. 19b shows a rear view of the same airfoil tip 80' and airfoil 82'. In this view, airfoil 82i is moving directly away from the viewer. It can be seen that airfoil 82i twists smoothly along its span from a positive angle of attack at root 58o, to a reduced positive angle of attack at outboard end 60o. Airfoil tip 80' also twists smoothly from a reduced positive angle of attack at inboard end 78', to a negative angle of attack near outboard end 84'. From this view, trailing edge 90' and trailing edge 56o are nearest the viewer. Leading edge droop 148 creates a rearward droop surface 154 near leading edge 92'. Similarly, outboard edge droop 150 creates an inboard droop surface 100 near outboard edge 84'.

A dihedral rise is seen across the span of both airfoil 82i and airfoil tip 80' between root 58o and tip 88o. This dihedral rise is relative to the particular object (not shown) to which root 58o is to be mounted. The dihedral rise increases near tip 88o as airfoil tip 80' twists into a negative angle of attack. Although this dihedral orientation offers numerous benefits, any combination of dihedral or anhedral spanwise orientations can be used for airfoil 82i and airfoil tip 80'. Some of the possible combinations and variations include having a dihedrally oriented airfoil 82i, while airfoil tip 80' is anhedrally oriented relative to airfoil 82i, or vice versa. Changes in dihedral or anhedral relationships can occur in the form of smooth curves or abrupt angles. Such changes in alignment can occur separately across the individual spans of airfoil 82i and airfoil tip 80'. This embodiment can also have no dihedral or anhedral changes in alignment across its span so that the entire foil lies within a substantially horizontal plane (except for curved droop 146).

Figure 19C:
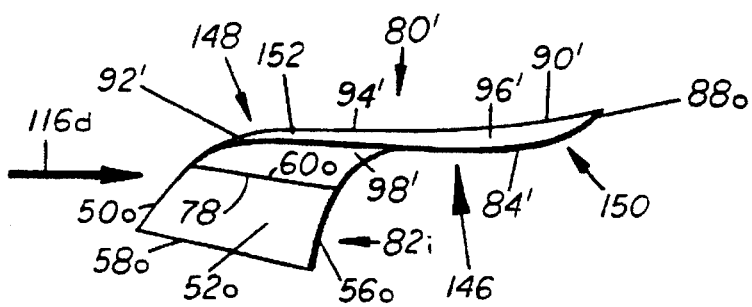

FIG. 19c shows a perspective side view of the same airfoil 82i and airfoil tip 80'. Both a Lower surface 52o of airfoil 82i, and an airfoil tip's lower surface 98' are visible from this view. An oncoming flow 116d is shown to illustrate the relative changes within the actual angle of attack between root 58o and tip 88o. The positive angle of attack of airfoil 82i decreases from root 58o towards outboard end 60o. From this view, airfoil tip 80' is seen to twist smoothly from a reduced positive angle of attack at inboard end 78', to an increasingly negative angle of attack towards tip 88o.

The degree of twisting across the span of airfoil 82i and airfoil tip 80' can vary widely to suit different applications, conditions, and desires. Because a significant portion of airfoil tip 80' is intended to be at a negative angle of attack relative to oncoming flow 116d (for the purpose of generating a beneficial vortex), the degree of twisting across the span of airfoil 82i and, or airfoil tip 80' is increased as the angle of attack existing near root 58o becomes greater. If the positive angle of attack of root 58o is reduced, the degree of twisting across the span of airfoil 82i and, or airfoil tip 80' can be decreased. When the negative angle of attack of airfoil tip 80' is minimized, separation below airfoil tip 80' is also minimized. Such reduction in separation is especially useful in low load and, or high speed applications.

The gradual transition from leading edge droop 148 to outboard edge droop 150 can be seen from this side view. In this example, the degree of anhedral tip droop increases from leading edge 92' towards outboard end 84'. However, the amount of tip droop at any portion of curved droop 146 can be varied according to desire.

Figure 19D:
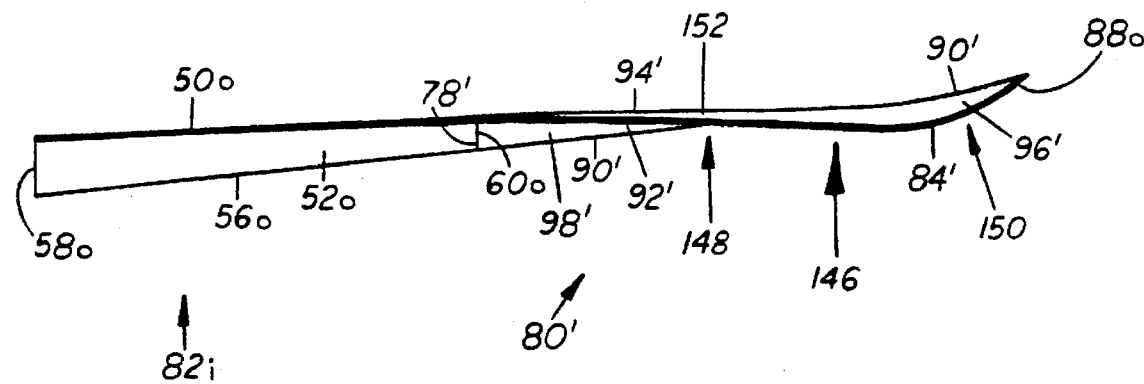

FIG. 19d shows a front view of the same airfoil 82i and airfoil tip 80'. Airfoil 82i is moving directly towards the viewer so that the direction of oncoming flow originates from the viewer's perspective. In this particular example, curved droop 146 begins to form a substantial distance inboard from tip 88o. This distance can be increased or decreased for different purposes and applications.

Operation—FIG. 19

The embodiment shown in FIGS. 19a to 19d is similar to a combination of the embodiments shown in FIG. 2, and FIGS. 3 to 8. In FIGS. 19a to 19d curved droop 146 provides a gradual transition from leading edge droop 148 to outboard edge droop 150. Leading edge droop 148 acts similarly to a leading edge flap on an airplane wing. Such flaps are deployed at higher angles of attack to promote smoother flow along the upper surface of a wing. Leading edge droop 148 functions substantially in this manner to better accommodate the increased effective angle of attack induced by a beneficial vortex (not shown). As the flow behind airfoil tip 80' is deflected upward, leading edge droop 148 improves the level of attached flow over upper surface 94". In addition, the downwardly and forwardly curved shape of leading edge droop 148 provides an improved airfoil shape which permits greater lift to be gained from the upward deflected flow induced by a beneficial vortex. The degree to which leading edge droop 148 curves downward depends on the flow conditions and the specific results that are desired. Under high load and, or low speed applications, leading edge droop 148 can be more pronounced. During low load and, or high speed applications, leading edge droop 148 can be decreased or even eliminated entirely if desired.

From the front view shown in FIG. 19d, leading edge 92' appears to curve in an outboard and downward manner (compared to the alignment of leading edge 50o) as leading edge droop 148 gradually transforms into outboard edge droop 150. This causes leading edge droop 148 to be less pronounced near inboard end 78', and more pronounced near outboard edge droop 150. In this example, the outboard and downward curved shape of leading edge 92' begins substantially at inboard end 78'. The rate at which leading edge droop 148 begins forming in this manner can be reduced under high speed and, or low load conditions, and increased under low speed and, or high load conditions.

The dihedral rise along the span of airfoil 82i and airfoil tip 80' can be used to increase both lift and stability. This dihedral orientation increases outboard flow below lower surface 52o in a direction from root 58o towards outboard end 60o. As this outboard flow impacts against the inboard cross flow created below outboard end 84' by a beneficial vortex (not shown), the resulting compression increases the intensity of the high pressure field existing below airfoil 82i and airfoil tip 80'. This dihedral orientation substantially improves flight stability in airplane wing applications which employ the fundamental methods of the present invention (this orientation is also beneficial in a wide variety of other applications). An alternate embodiment can orient airfoil tip 80' at an anhedral angle to airfoil 82i. This orientation can be observed in many species of seabirds. Such an orientation can be used to create an increase in the inboard cross flow below airfoil tip 80'. This further increases compression of the high pressure field below airfoil 82i.

The appearance of an increase in dihedral rise near tip 88o exists because airfoil tip 80' twists to an increased negative angle of attack near tip 88o. This twisting causes the aftward extended portions of airfoil tip 80' near tip 88 to pivot above the plane of upper surface 94'. This upward rotation of tip 88o is increased by the continuous twist in span across airfoil 82i and airfoil tip 80'. The greater this twist, the greater the degree of upward rotation of tip 88o. The twist within airfoil tip 80' causes tip 88o to be at a more negative angle of attack than the rest of airfoil tip 80'. As a result, oncoming flow 116d (shown in FIG. 19c) impacts the portions of outboard droop surface 96' which are near tip 88o with increased intensity. This increases beneficial vortex production.

Under low speed and, or high load conditions the degree of dihedral rise near tip 88o can be increased in order to increase the size of the beneficial vortex formed in the wake. Under high speed and, or low load conditions this dihedral rise near tip 88o can be reduced, or eliminated entirely. The increase in dihedral rise near tip 88o can also occur closer to tip 88o in order to focus its effects farther outboard along the span of airfoil 80'. It is intended that the trim characteristics of airfoil tip 80' are to be set according to the flow characteristics existing, or desired at a given target angle of attack and, or flow speed.

When the increased negative angle of attack near tip 88o is observed from the side view shown in FIG. 19c, it can be seen that the aftward portion of outboard end 84' (near tip 88o) is inclined at an upward and aftward angle relative to the direction of oncoming flow 116d. This upward inclination deflects the beneficial vortex at an upward angle, and therefore increases the strength of the upwash field formed behind airfoil tip 80', and airfoil 82i. In this example, outboard end 84' has a curved profile as it becomes upwardly inclined. In other embodiments, outboard end 84 can be substantially straight while inclined at an upward and aftward inclination.

Figure 20:
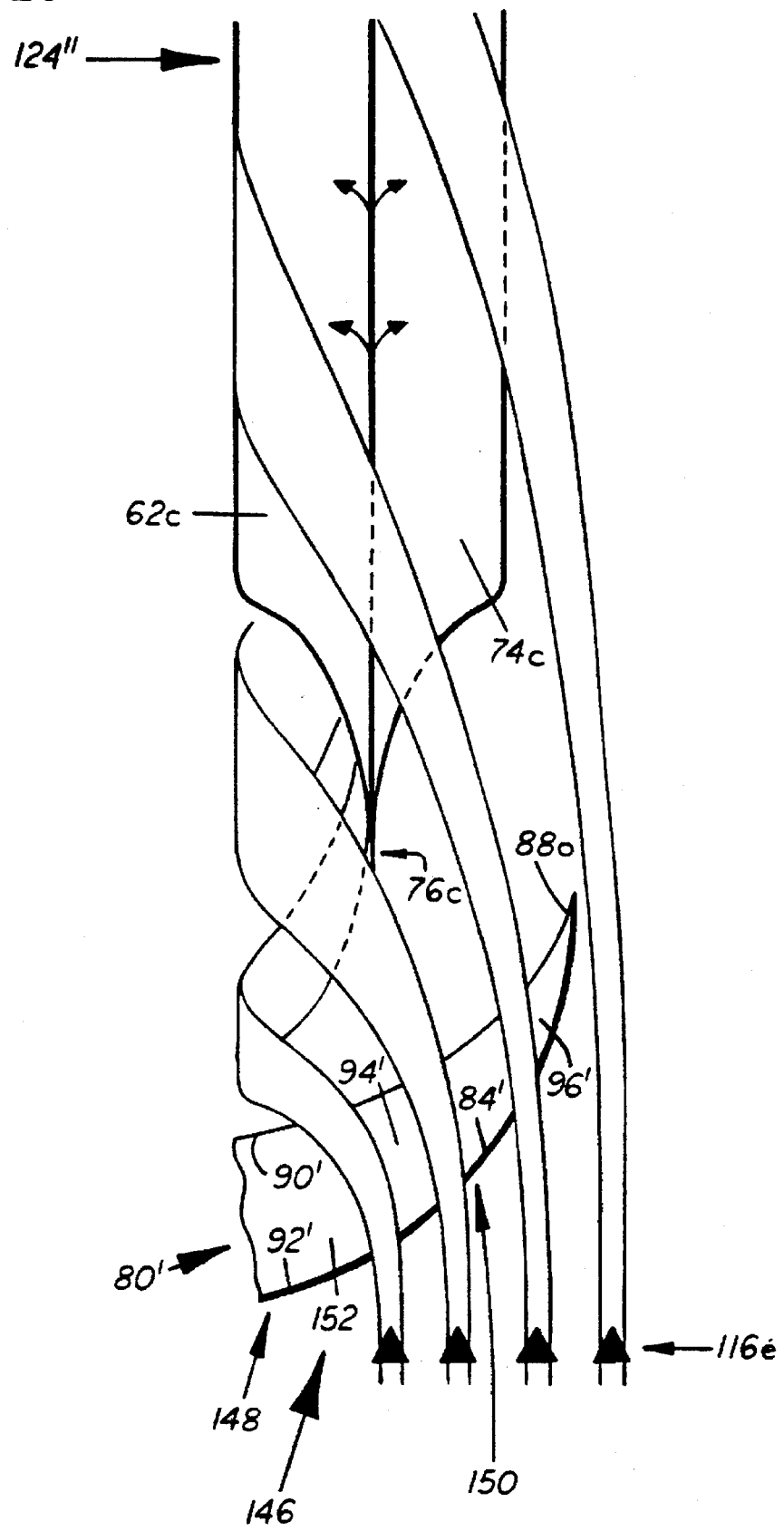
FIG. 20 shows a top view of the same airfoil tip with ribbon shaped streamlines passing above its upper surface.

Description—FIG. 20

FIG. 20 shows a top view of an outboard portion of the same airfoil tip 80' shown in FIG. 19. In FIG. 20, the outboard portion of airfoil tip 80' is seen in a wind tunnel test. The outboard portion of airfoil tip 80' is at a negative angle of attack relative to an oncoming flow 116e, which is represented by ribbon shaped streamlines which are flowing above airfoil tip 80'. These streamlines flow smoothly in an attached manner above airfoil tip 80' and then begin to flow in an inboard direction.

In the wake behind airfoil tip 80', a double vortex pattern 124", and an upwash field 76c are shown beneath the ribbon shaped streamlines to establish a frame of reference while observing the ribbon shaped streamlines above airfoil tip 80'. Double vortex 124" is similar to that which is shown in FIGS. 15 and 16, and is formed from air passing underneath airfoil tip 80'. Double vortex 124" is made up of a beneficial vortex 74c, and an induced drag vortex 62c.

In FIG. 20, the ribbon shaped streamlines flow in an inboard and aftward direction above upwash field 76c, beneficial vortex 74c, and induced drag vortex 62c after passing over airfoil tip 80'. The streamlines then curl downward along the inboard side of induced drag vortex 62c, and spiral into induced drag vortex 62c.

Operation—FIG. 20

The purpose of this view is to show how induced drag vortex 62c is put to use in a manner which improves performance. This represents a significant advantage over the prior art in which such a vortex causes only a decrease in performance. Because double vortex 124" creates a wedge shaped upwash field 76c (similar to that shown in FIGS. 14 and 15), the ribbon shaped streamlines shown in FIG. 20 must flow upward behind airfoil tip 80' in order to remain above upwash field 76c. As a result, an upflow condition exists both above and below airfoil tip 80'.

This upflow condition can increase the effective angle of attack of airfoil tip 80' to a degree which permits airfoil tip 80' to be at a suitable angle of attack relative to upwash field 76c for generating lift even though it is at a negative angle of attack relative to oncoming flow 116e. Because the streamlines flow smoothly in an attached manner (no separation) above airfoil tip 80', high levels of lift can be generated efficiently. In addition, this well attached flow prevents airfoil tip 80' from stalling while the more inboard portions of the foil (not shown) are at extremely high angles of attack. As a result, airfoil tip 80' can prevent the entire foil from stalling at high angles of attack. Even if the more inboard portions of the foil are in a stall condition, the efficient flow characteristics surrounding airfoil tip 80' can allow the entire foil to maintain high levels of efficiency, control, stability, and lift.

As the ribbon shaped streamlines flow upward above upwash field 76c, their rate of flow is accelerated. By flowing upward, the fluid must travel over an increased distance as it flows downstream. This increased distance forces the fluid to flow at a faster rate in order to keep pace with the streamwise flow speed of the surrounding fluid. This increase in flow speed lowers fluid pressure above airfoil tip 80' and increases lift.

As the streamlines pass above airfoil tip 80' and begin to curve in an inboard direction toward the inboard portion of induced drag vortex 62c, the flow speeds of these streamlines are further increased. The inboard directed curved path of these streamlines causes the fluid to travel over a further increased distance. In order to keep pace with the streamwise directed flow speed of the surrounding fluid medium, the fluid that is curving in an inboard direction toward the inboard side of induced drag vortex 62c must flow at a faster rate in order to compensate for this increase in distance. This further decreases the fluid pressure above airfoil tip 80' and therefore increases lift. Also, as the fluid above airfoil tip 80' is drawn inboard towards induced drag vortex 62c, it is accelerating towards the low pressure core of this vortex. This further increases both flow speed and lift.

Unlike the prior art, the present methods permit an inboard cross flow condition to occur above the outer regions of a foil without creating significant separation above these regions. Because beneficial vortex 74c (formed beneath airfoil tip 80') contains the high pressure field existing below the foil, the inboard cross flow existing above airfoil tip 80' does not drain this high pressure field. Because the high pressure field is not able to spill around outboard end 84', separation does not occur within the inboard cross flow existing above airfoil tip 80'. This increases the effective aspect ratio and the effective surface area of airfoil tip 80'. As a result, airfoil tip 80' can be used to encourage and exploit an inboard cross flow above airfoil tip 80' to improve performance.

The smoothly curved transition between forward droop surface 152, outboard droop surface 96', and upper surface 94', permits the inboard cross flow above airfoil tip 80' to flow with improved efficiency. These smooth and convexly curved surfaces create a chordwise and spanwise airfoil shape which further increase the overall distance that the inboard and aftward directed cross flow must travel as it flows above airfoil tip 80'. This further increases flow speed and decreases pressure above a significant portion of airfoil tip 80', thereby further increasing lift. This is particularly an advantage while the more inboard portions of the foil are at significantly high angles of attack. Under such high load conditions, induced drag vortex 62c of double vortex 124" has increased power, and therefore induced drag vortex 62c can draw air over airfoil tip 80' at an increased rate.

Since the inboard cross flow above airfoil tip 80' flows in a smooth and well attached manner, the transition of this flow into induced drag vortex 62c is smooth, stable, and non-chaotic. Because the streamlines are not intermixed haphazardly within the wake, the flow patterns created by airfoil tip 80' do not incur significant drag.

Description—FIG. 21

FIG. 21a and 21b each show a cross sectional view of an airfoil and its surrounding flow field. Each of the cross sections are taken near the tip of the airfoil to illustrate the modified flow conditions induced upon the foil by a tip vortex. FIG. 21a shows the flow characteristics created by an induced drag vortex (not shown) near the tip of a conventional airfoil. FIG. 21b shows the flow characteristics created by a beneficial vortex (not shown) near the tip of an airfoil which employs the basic flow control methods of the present invention.

FIG. 21a shows an oncoming flow 116f as a series of streamlines flowing above and below an outboard tip portion of a prior art airfoil which is at a positive angle of attack. After the streamlines pass behind the trailing edge in this example, they are deflected at a downward angle. This downward deflection creates a downwash field 64d, which is formed by the presence of an induced drag vortex near the airfoil's tip.

In FIG. 21b, the airfoil section is inclined at a negative angle of attack. Although the root portions of this airfoil are not shown, it should be known that such a root portion (or at least an intermediate portion of the airfoil) is inclined at a positive angle of attack. An oncoming flow 116g is shown as streamlines flowing above and below the airfoil. As the streamlines pass over and under the airfoil, they are deflected upward to display an upwash field 76d. This upward deflection is caused by the presence of a beneficial vortex around the outboard portion of the airfoil.

Although this illustration in FIG. 21b shows the airfoil as having a convexly curved upper surface and a flat lower surface, the cross sectional shape can vary widely. For instance, the airfoil can be either straight or convexly curved on both surfaces. One or both surfaces can be concavely curved or sinuous in form. The upper surface can also be less convexly curved, straight, or even concavely curved, while the lower surface is convexly curved.

Operation—FIG. 21

FIG. 21a, displays how downwash field 64d decreases the effective angle of attack "seen" by the airfoil section. The downward deflection of the streamlines both above and below the airfoil section reduces the efficiency of the foil's positive angle of attack and asymmetric airfoil shape. Downwash field 64d also creates induced drag.

In FIG. 21b, upwash field 76d increases the effective angle of attack of the airfoil section. The upward deflection of flow occurring both above and below the airfoil section permits lift to be generated by the foil's asymmetrical airfoil shape. If the slope of upwash field 76d is increased (by increasing the size of the beneficial vortex), the increase in the foil's effective angle of attack causes the airfoil section to be at a positive angle of attack relative to upwash field 76d. Such a situation can permit the airfoil section to generate lift even if is not asymmetrically shaped. This illustration displays how the influence of a beneficial vortex near the tip of a foil changes expected fluid behavior around the tip region of a foil.

Description—FIG. 22 and 23

FIGS. 22 and 23 show two different views of the outboard region of an airfoil tip 80" which is similar in form to the embodiment shown in FIGS. 19 and 20. In FIGS. 22 and 23, airfoil tip 80" functions in the same manner, but is more slender than the embodiment shown in FIGS. 19 and 20. This slight change in shape is shown to illustrate one of the many ways that the shape of the present invention can be varied. The main purpose of this drawing is to illustrate the flow conditions created as fluid passes through the boundary layer surrounding airfoil tip 80" (similar results occur with the embodiment shown in FIGS. 19 and 20).

FIG. 22 shows a close up perspective view of the outboard region of airfoil tip 80". From this view, an airfoil tip's outboard end 84" is closer to the viewer than an airfoil tip's trailing edge 90". Both outboard end 84" and trailing edge 90" terminate at a trailing tip 88p. Because this view shows the outboard portion of airfoil tip 80", an outboard edge droop 150' exists along this portion of the foil. Outboard edge droop 150' creates an outboard droop surface 96" between outboard end 84" and trailing edge 90".

Airfoil tip 80" is at a negative actual angle of attack relative to an oncoming flow 116h, which is represented by two pairs of ribbon shaped streamlines flowing passed airfoil tip 80". One pair of streamlines pass through the boundary layer existing above outboard droop surface 96", while the other pair of streamlines pass through the boundary layer existing beneath outboard end 84".

The two streamlines that enter the boundary layer above outboard droop surface 96" flow smoothly across this surface in an attached manner. After passing behind trailing edge 90", the more inboard of these two streamlines form into a miniature induced drag vortex 156, and the more outboard of these two streamlines form into a miniature induced drag vortex 156' (the term induced drag vortex is used because the direction of spin is similar to that of an induced drag vortex).

The two streamlines entering the boundary layer below outboard end 84" enter into vorticical flow after passing through the boundary layer beneath outboard edge 84. Of these two streamlines, the more inboard streamline forms into a miniature beneficial vortex 158, and the more outboard streamline forms into a miniature beneficial vortex 158' (The term beneficial vortex is used because the direction of spin is similar to a that of a beneficial vortex).

FIGS. 23a and 23b show a rear view of the same airfoil tip 80" shown in FIG. 22. In FIG. 23a and 23b, an inboard droop surface 100" is visible from this view between outboard end 84" and trailing edge 90". FIG. 23a shows a group of miniature beneficial vortices 158" forming as a group of streamlines (represented by curling arrows) exit the boundary layer below outboard end 84". From this view, the vortices within group 158" rotate in a counter clockwise direction. An inboard cross flow 160 is formed below the boundary layer that exists below outboard end 84".

FIG. 23b shows the same view of airfoil tip 80" as shown in FIG. 23a, except that FIG. 23b shows a group of miniature induced drag vortices 156" forming as streamlines (represented by curling arrows) exit trailing edge 90" after passing through the boundary layer above airfoil tip 80". From this view, each vortex within group 156" spins in a clockwise direction. A inboard cross flow 160' forms above the boundary layer that exists above airfoil tip 80'.

Operation—FIGS. 22 and 23

In FIG. 22, the cylindrically shaped miniature beneficial vortex 158' forming nearest to tip 88p spins extremely fast. The speed of vortex 158' can be increased by increasing the anhedral orientation of outboard edge droop 150'. This is particularly effective when outboard edge droop 150' is increased substantially near tip 88p. In many embodiments, the core of vortex 158' forms the axis of rotation for the larger beneficial vortex (not shown) which develops farther back in the wake behind airfoil tip 80".

The formation of vortex 158' near tip 88p can substantially improve the performance of airfoil tip 80". While centrifugal force created by rapid rotation pushes upward beneath airfoil tip 80" to increase lift, the gyroscopic inertia created by vortex 158' stabilizes the movement of the foil, as well as the advantageous flow conditions occurring around it. The size, strength, and angular velocity of vortex 158' can be varied according to desire to suit different needs, conditions, and purposes.

The characteristics of each vortex shown in FIGS. 22 and 23 can be controlled by modifying the shape, contour, and attack angles of airfoil tip 80". By increasing the negative inclination of airfoil tip 80", the diameter of each vortex is increased. Increasing the size of these vortices is useful in low speed and, or high load conditions. By decreasing the negative angle of attack, the diameter of rotation within each vortex is decreased. Minimizing the sizes of these vortices in this manner, increases efficiency in high speed and, or low load applications.

FIG. 23a shows a rear view which displays that the lower portion of each vortex within group 158" flows in an inboard direction, and therefore assists in the movement of inboard cross flow 160 below airfoil tip 80". FIG. 23b shows that the upper portion of each vortex within group 156" flows in an inboard direction to assist in the movement of inboard cross flow 160' above airfoil tip 80".

This is just one example of many various vortex formations that can be created by a fluid medium exiting the boundary layers above and below an airfoil tip which forms a large beneficial vortex in its wake. One of the primary reasons that the vortices form as they do in FIGS. 23a and 23b, is that airfoil tip 80" is swept back while inclined at a negative angle of attack. If the outboard portion of airfoil tip 80" is instead made to sweep forward while inclined at a negative angle of attack, these small vortices can be arranged differently. However, because airfoil tip 80" remains at a negative angle of attack, such a forward swept airfoil tip 80" still produces a larger beneficial vortex farther back in the wake.

With the purpose of encouraging advantageous cross flow conditions around the tip of a foil, an alternate embodiment can include the use of strip, or rib type vortex generators. One or more of such vortex generators can be divergently mounted on the lower and upper surfaces near the tip of an airfoil. Each upper surface generator creates a miniature induced drag vortex adjacent to its inboard surface, while each lower surface generator creates a miniature beneficial vortex adjacent to its inboard surface. These vortices form because the outboard surface of each divergent generator is the attacking surface. The direction of spin of each generated vortex encourages an inboard cross flow to occur above and below the airfoil tip.

The upper surface generators can also be convergently aligned while the lower surface generators remain divergent. Because this causes the inboard surface of each upper surface generator to be the attacking surface, a miniature beneficial vortex is produced adjacent to the outboard surface of each upper surface generator. This arrangement encourages an outboard cross flow above the airfoil. Meanwhile, the lower surface generators are producing an inboard cross flow below the airfoil tip's lower surface. The height of these generators can be shorter than the depth of the boundary layer, or they can extend to any desired height above the boundary layer. Any number of generators can be used on either surface. If desired, only one surface can be equipped with at least one such generator. These generators can also be made movable by permitting them to pivot around an axis that is substantially perpendicular to the surface to which they are mounted. This permits the alignment of the generators to be adjustable so that cross flow conditions can be controlled. The angle of attack of attack of each generator can be controllable so that the size, strength, and direction of spin of its vortex can be manipulated.

Description—FIG. 24

FIG. 24a shows a perspective view of a vortex flap network 162 connected to an outboard end 60z of an airfoil 82j. A leading edge 50z of airfoil 82j is closest to the viewer and a trailing edge 56z is farthest from the viewer. An upper surface 54z is convexly curved and is seen above leading edge 50z. A lower surface 52z is seen between leading edge 50z and trailing edge 56z. A root 58z of airfoil 82j can be attached to any desired surface or object in any suitable manner.

FIG. 24b shows a top view, or plan view of the embodiment shown in FIG. 24a. An upper surface 54z of airfoil 82j is visible from this view. Flap network 162 is made up of an inboard flap 164, an outboard flap 166, and an intermediate flap 168. Although three flaps are used in this embodiment, any number of flaps and, or configurations may be used as well. The shape of each flap can also be varied significantly.

Outboard flap 166 has an inboard end 204, an outboard end 206, a trailing edge 210, and an upper surface 214. Intermediate flap 168 has an inboard end 304, an outboard end 306, a leading edge 308, and an upper surface 314. Inboard flap 164 has an inboard end 404, an outboard end 406, a leading edge 408, and an upper surface 414.

In FIGS. 24a and 24b, inboard end 404 of inboard flap 164 is connected to outboard end 60z of airfoil 82j in any suitable manner which permits inboard flap 164 to move relative to airfoil 82j. This movement is preferably a substantially pivotal motion which occurs around an axis that is substantially parallel to the alignment of either inboard end 404 of inboard flap 164, or outboard end 60z of airfoil 82j. In a similar manner, inboard end 304 of intermediate flap 168 is connected to outboard end 406 of inboard flap 164, and inboard end 204 of outboard flap 166 is connected to outboard end 306 of intermediate flap 168.

In FIG. 24a, flap network 162 is deployed in a manner which forms a multi-faceted anhedral tip droop while airfoil 82j is at a positive angle of attack. Because flap network 162 is deployed in this manner, upper surface 414, upper surface 314, and upper surface 214 are visible from this view. Any number of inclination combinations can be used to suit different purposes, needs, and conditions. Flap network 162 can also be used on or near the outboard edges of any foil which utilizes reciprocating angles of attack. These include rudders, ailerons, elevators, trim flaps, and reciprocating propulsion foils. In theses situations, flap network 162 can be designed to assume the desired configurations relative to each alternative attacking surface as the foil pivots back and forth relative to the surrounding flow.

Many variations of flap network 162 are possible. In addition to varying each flap's size, width, length, shape, thickness, alignment, pivot angles, and other similar parameters, trim flaps can added on to each flap's leading and trailing edges. Such trim flaps can be made to pivot along an axis that is substantially parallel to the alignment of each flap's leading and trailing edges. Outboard flap 166 can also have one or more trim flaps mounted along its outboard end 206. An aileron flap system may also be used along the trailing portion of one or more flaps within flap network 162.

In alternate embodiments, the divergence of each flap's pivot angle can be changed to suit different purposes. Some of the flaps can be made to pivot around a streamwise axis, or even a convergent axis if desired. Many flaps can be used in flap network 162 to decrease the amount of change in divergence between each adjacent flap's pivotal axis. Some of the flaps can also pivot along parallel axes in order to create a desired contour. A series of narrow flaps can be used to bridge the gap between each of the larger flaps within flap network 162 so that a more rounded transition is formed between each flap. The flaps can also be retractable within one another in a manner that is commonly used in standard flap mechanisms. A flexible gasket or skirt can also be used between each flap to create a smoother transition between flaps. This can also be used to prevent ice build up in airplane applications.

Operation—FIG. 24

The embodiment shown in FIGS. 24a and 24b offer a method for controlling and adjusting the shape and contour of an anhedral tip droop. A wide variety of shapes and contours can be constructed in an effort to control and manipulate the cross flow conditions existing around flap network 162, and outboard end 60z. Although this embodiment employs divergently pivoting flaps, any system which is able to offer variable control over such cross flow conditions can be used as well. Flap network 162 is more versatile that the embodiments shown in FIGS. 9 to 15 where only one vortex flap is used. In FIGS. 24a and 24b, one of the most significant advantages is that each flap within flap network 162 pivots around a different divergent axis, and therefore the overall divergence of the anhedral tip droop can be changed.

A simple way to do this is to deploy one flap at a time while the relative positions of the other flaps remain fixed. By pivoting outboard flap 166 below the plane of airfoil 82j while both intermediate flap 168 and inboard flap 164 remain parallel to the plane of airfoil 82j, a relatively small anhedral tip droop is formed which is slightly divergent. This arrangement is advantageous in high speed and, or low load conditions. If outboard flap 166 is held parallel to intermediate flap 168 while intermediate flap 168 is pivoted below the plane of airfoil 82j, and inboard flap 164 is held parallel to airfoil 82j, both outboard flap 166 and intermediate flap 168 act a single flap which forms an anhedral tip droop. The span of the droop is increased because two flaps act as one. This droop is more divergent than solely deploying outboard flap 166 because inboard end 304 of intermediate flap 168 is more divergent than inboard end 204 of outboard flap 166. This arrangement is generally more advantageous in lower speed and, or higher load conditions. Similarly, if inboard flap 164 is pivoted below the plane of airfoil 82j while the alignments of both intermediate flap 168 and outboard flap 166 remain parallel with inboard flap 164, flap network 162 acts like one large flap that forms a larger anhedral tip droop. Because all three flaps are inclined together, the span of the droop is at its maximum. This droop is also highly divergent because inboard flap 164 pivots around the most divergent axis in flap network 162. This arrangement is generally more advantageous in low speed and, or high load conditions.

A more sophisticated way of using flap network 162 is to manipulate each flap individually to create a multi-faceted anhedral tip droop. Because each flap's pivotal axis is oriented in at least a slightly chordwise direction, flap network 162 is able to assume a more rounded form across its span by deploying each flap independently. For example: outboard flap 166 can be inclined at a slight anhedral angle relative to the plane of intermediate flap 168, while at the same time intermediate flap 168 is at a slight anhedral angle relative to the plane of inboard flap 164, and inboard flap 164 is at a slight anhedral angle relative to the plane of airfoil 82j. Although the amount of anhedral droop between each flap is relatively low, the accumulative effect permits the degree of overall droop to be significantly high across the span of flap network 162. The resulting curved shape decreases drag by reducing abrupt changes in contour. The greater the number of flaps used in flap network 162, the more streamlined the shape.

The perspective view shown in FIG. 24a displays that while each flap within flap network 162 pivots anhedrally, it pivots in a forward and downward direction as well. This is because the alignment of each flap's pivotal axis is oriented in at least a slightly spanwise direction. In FIG. 24b, inboard end 404 of inboard flap 164 is seen to be highly divergent and is aligned in more of a spanwise direction than in a chordwise direction. As a result, inboard flap 164 pivots downward in a forward direction significantly more than it pivots in an anhedral direction. Because inboard end 304 of intermediate flap 168 is less divergent than inboard end 404 of inboard flap 164, intermediate flap 168 pivots in a comparatively less forward and more anhedral manner than inboard flap 164. Similarly, inboard end 204 of outboard flap 166 is less divergent than inboard end 304 of intermediate flap 168, and therefore outboard flap 166 pivots in a comparatively less forward and more anhedral manner than intermediate flap 168.

Because inboard flap 164 mostly pivots in a forward direction and carries both intermediate flap 168 and outboard flap 166 with it as it moves, inboard flap 164 offers significant control over the entire actual angle of attack of flap network 162. When airfoil 82j is at a positive angle of attack, a slight downward movement of inboard flap 164 causes a decrease in the actual angle of attack of every flap within flap network 162. After this is done, intermediate flap 168 can be further inclined relative to inboard flap 164. Because intermediate flap 168 carries outboard flap 166 with it as it moves, this brings both intermediate flap 168 and outboard flap 166 into a lower angle of attack than inboard flap 164. Outboard flap 166 can then be inclined at a lower angle of attack than intermediate flap 168. Thus a major benefit to this design is that the desired angle of attack for flap network 162 can be reached gradually in a series of steps across the span of flap network 162. This improves the streamlined shape of flap 162 and decreases drag.

When looking at FIG. 24a, it can be seen that the combination of anhedral and forward pivoting exhibited by each flap permits flap network 162 to twist along its span while creating an anhedral droop. Flap network 162 successfully reproduces the general form of the embodiment shown in FIG. 19. This is particularly noticeable when comparing the perspective view shown in FIG. 24a to the side and front views shown in FIGS. 19c and 19d, respectively. In FIG. 24, inboard flap 164 and outboard flap 166 can be compared in FIG. 19 to leading edge droop 148 and outboard edge droop 150, respectively. In FIG. 24, intermediate flap 168 provides a gradual transition from the significantly forward pivoting motion of inboard flap 164, to the significantly anhedral pivoting motion of outboard flap 166.

The individual control offered by each flap permits the overall contour of flap network 162 to be trimmed to a wide variety of settings. For instance, when airfoil 82j is at a positive angle of attack, inboard flap 164 can be inclined at a slightly reduced positive angle of attack while intermediate flap 168 is inclined at a further reduced positive angle of attack, and outboard flap 166 is inclined at the most reduced positive angle of attack. This arrangement is useful when flap network 162 is employed as an improved winglet for the purpose of reducing overall tip vortex formation and induced drag.

Another way to trim flap network 162 is to incline inboard flap 164 at a reduced positive angle of attack, intermediate flap 168 at a further reduced positive angle of attack, and outboard flap 166 at a slightly negative angle of attack. This setting generates a beneficial vortex (not shown) in the wake behind airfoil 82j and flap network 162. This setting is efficient in high speed and, or low load conditions.

While this setting is maintained, a decrease in the negative angle of attack of outboard flap 166 reduces the separation (not shown) below outboard flap 166. Because outboard flap 166 pivots around an axis which is only slightly divergent, the separation it produces circulates around a significantly streamwise (or chordwise) axis which assists in the formation of a beneficial vortex in the wake. Consequently, a decrease in this separation decreases the power of the beneficial vortex and causes it to form farther back in the wake. This in turn decreases the intensity and the slope of the upwash field (not shown) behind airfoil 82j and flap network 162.

On an airplane, if the negative angle of attack of outboard flap 166 on each wing is decreased while the both the flow speed and the angle of attack of each wing (airfoil 82*j*) remain constant, the airplane enters into a descent. A further decrease produces a dive. Because the assistance of elevator flaps is not required, less drag is incurred by this maneuver. One way to restore level flight is to increase flow speed (such as by increasing engine thrust). This increases air pressure against upper surface 214 of outboard flap 166, and therefore increases the inboard cross flow beneath outboard end 206, which in turn increases the strength of the beneficial vortex. In addition, the increase in flow speed increases the air pressure below lower surface 52*z* of airfoil 82*j*. The increased compression to this high pressure field feeds the beneficial vortex as the air expands towards the low pressure vortex core at an increased rate. A continued increase in flow speed brings the airplane into a climb. Consequently, the negative inclination of outboard flap 166 can be gradually reduced while accelerating so that level flight can be maintained.

Similarly, by reducing its negative inclination on one wing only, outboard flap 166 can be used to initiate rolls, turns, and other similar maneuvers. For instance, by reducing the negative inclination of outboard flap 166 on the right wing only, lift on the right wing is reduced while lift on the left wing remains constant. This causes the airplane to roll right (right wing lowers) and enter into a right turn. The relative decrease in induced thrust on the right wing allows the plane to yaw right during this turn. This increases the efficiency of the turn and reduces the need for assistance from the plane's rudder. As a result, less drag is incurred from the maneuver.

Similar maneuvers can be achieved by increasing the negative inclination of outboard flap 166 while both inboard flap 164 and intermediate flap 168 remain at a reduced positive angle of attack. Because this increases separation beneath outboard flap 166, the size and power of the beneficial vortex is increased. This increases the intensity and the slope of the upwash field in the wake, and therefore increases lift, and induced thrust. If the negative inclination of outboard flap 166 is increased simultaneously on both wings of an airplane, an ascent or climb maneuver is initiated. Because the assistance of elevator flaps is not required, less drag is incurred by the maneuver. One way of restoring level flight is to reduce the flow speed by decreasing engine thrust. This permits high levels of lift to be created under low speed conditions. If the negative inclination of outboard flap 166 is increased on the right wing only, the airplane rolls left (right wing rises) and enters into a left turn. The relative increase in induced thrust on the right wing causes the plane to yaw left during the turn. Again, the need for assistance from the plane's rudder is reduced, or eliminated entirely. A wide variety of maneuvers are possible as the negative inclination of flap 166 on each wing is increased and decreased individually to exert control over both pitch and roll. This can permit a plane to be controllable if the tail section is somehow becomes inoperable. The presence of a tail section can also be eliminated entirely so that more cargo can be carried. If a tail section is desired, a much smaller one may be used to reduce weight penalties.

Another way of setting the trim of flap network 162 is to incline inboard flap 164 at a reduced positive angle of attack while intermediate flap 168 is inclined at a slightly negative angle of attack, and outboard flap 166 is inclined at an increased negative angle of attack. Because intermediate flap 168 is more divergent than outboard flap 166, the separation created below intermediate flap 168 circulates around more of a spanwise axis. The drag created by this separation can be used on one wing of an airplane to cause the plane to yaw, roll, and turn towards that wing. If intermediate flap 168 is lowered to a negative angle of attack on both wings simultaneously, the increased size of the beneficial vortex causes the plane to climb. By lowering the plane's speed, level flight can be restored. This setting permits the plane to fly more slowly while retaining high levels of lift. By deploying inboard flap 164 into a negative angle of attack, these same results occur to a greater extent because of the increased divergence of this flap.

As the more inboard flaps become further inclined relative to airfoil 82*j*, they carry the more outboard flaps with them. If the more outboard flaps are already anhedrally inclined, the downward movement of the more inboard flap can cause the more outboard flaps to be at highly negative angles of attack. Because inboard flap 164 and intermediate flap 168 pivot significantly forward direction and carry outboard flap 166 with them as their anhedral inclinations are increased, outboard flap 166 pivots significantly forward when these more inboard flaps become forwardly inclined. The accumulative effect of each flap's inclination can cause outboard flap 166 to be inclined at such a highly negative angle of attack that the separation created beneath outboard flap 166 increases to levels which cause increased levels of drag from transitional flow. This increased separation also increases the size of the beneficial vortex formed in the wake. In situations such as landing where increased drag is desired to slow the speed of the airplane, the negative inclination of each flap within flap network 162 can be increased in this manner. Because the size of the beneficial vortex is also increased, lift is increased simultaneously with this flap setting. This permits the plane to maintain flight as speed is decreased. If this setting is used on only one wing of an airplane, the increased drag can cause the plane to yaw, roll, and enter into a turn towards that wing. When this is done on both wings, the plane can enter into a climb from the increased strength of the beneficial vortex. To decrease the slope of the climb, airspeed can be reduced. Consequently, this highly anhedral setting can be used to attain extraordinarily high levels of lift at extremely low speeds.

This highly anhedral setting can also be used to regain control of a plane that has lost control (such as a stall, dive, free fall, tail spin, flat spin, etc.). If control over forward movement is lost, this setting restores forward movement because this direction offers significantly lower levels of drag than any other orientation of flight. For instance, if the out of control plane is moving sideways instead of forward, the air strikes each wing's divergent tip droop at a different angle. The divergent tip droop on the leading wing creates more transitional flow than the divergent tip droop on the trailing wing. This causes the plane to yaw towards the leading wing and point forward. As soon as the plane begins to aim substantially forward, each flap network 162 quickly forms a beneficial vortex beneath each wing tip and the plane straightens out in a forward direction. Beneficial vortex formation quickly restores advantageous cross flow and upwash conditions beneath flap network 162, and controlled flight is regained. If the plane is in a dive situation, the high lift created by this setting permits the plane to quickly reduce the rate of descent and regain level flight. As the plane levels off, the negative inclination of the flaps can be decreased so that the plane does not begin to enter into a climb from the increased lift of this setting. This highly anhedral setting can also be used to create high levels of lift so that a plane which has lost engine power can land safely.

If it is desired to have the more inboard flaps deployed at an increased anhedral inclination, but lower levels of drag are also desired, the anhedral inclinations of the more outboard flaps can be reduced relative to the inclination of the more inboard flaps. For example: if outboard flap 166 is already anhedrally inclined relative to the plane of intermediate flap 168, the anhedral orientation between these two flaps can be reduced as the anhedral inclination of intermediate flap 168 is increased. Similarly, if the anhedral inclination of inboard flap 164 is increased relative to the plane of airfoil 82j, the anhedral inclination existing between each flap within flap network 162 can be decreased. This prevents the more outboard flaps from being inclined to an excessively high negative angle of attack when they are carried downward by the more inboard flaps. This reduces separation below flap network 162, and therefore reduces drag from transitional flow. If drag is reduced in this manner on only one wing of an airplane, the plane can roll, yaw, and enter into a turn in the direction of the opposite wing. This is because the drag on the opposite wing remains comparatively high. Again, a turn maneuver is achieved without requiring assistance from the rudder or ailerons. This enables maneuvers to be executed with decreased difficulty. In addition, highly complex maneuvers can be executed in a great number of simultaneous combinations with increased ease and efficiency. Because less control surfaces are required, each maneuver creates less overall drag. This permits decreases fuel consumption during maneuvers. Automated control systems can be employed to make automatic adjustments between flaps for various maneuvers and flow speeds. This can greatly improve ease of use.

FIG. 24a displays that the combination of forward and anhedral pivoting within each flap enables flap network 162 to achieve a twisted shape across its span. The degree of such twisting across flap network 162 increases as each flap increases its anhedral orientation. By increasing the span of flap network 162 in comparison to the span of airfoil 82j, a greater portion of the overall span of the foil can undergo spanwise changes in angle of attack. Thus, flap network 162 enables a foil to achieve a twisted shape across its span that is variable and controllable.

Description—FIG. 25

FIGS. 25a and 25b show top views of two different variations of the embodiment shown in FIG. 24. In FIG. 25a, an airfoil 82j' has an upper surface 54z', a leading edge 50z', a trailing edge 56z', a root 58z', and an outboard end 60z'. A vortex flap network 162' has an inboard flap 164', an outboard flap 166', and an intermediate flap 168'. Outboard flap 166' has an inboard end 204', an outboard end 206', a trailing edge 210', and an upper surface 214'. Intermediate flap 168' has an inboard end 304', an outboard end 306', a leading edge 308', a trailing edge 310', and an upper surface 314'. Inboard flap 164' has an inboard end 404', an outboard end 406', a leading edge 408', a trailing edge 410', and an upper surface 414'. The method of connecting outboard end 60z' to inboard end 404', outboard end 406' to inboard end 304', and outboard end 306' to inboard end 204', is done in any suitable manner that permits movement thereof.

When comparing FIG. 25a to FIG. 24, it can be seen that in FIG. 25a the shapes of inboard flap 164' and intermediate flap 168' are different than that of flap 164 and flap 168 shown in FIG. 24, respectively. However, in FIG. 25a the shape of outboard flap 166' is substantially similar to that of flap 166 shown in FIG. 24. In FIG. 25a, the alignment of inboard end 404' of inboard flap 164', and inboard end 304' of intermediate flap 168' are both less divergent than the corresponding parts of the embodiment shown if FIG. 24. In FIG. 25a, inboard flap 164' has trailing edge 410', and intermediate flap 168' has trailing edge 310' where no leading edge exists on flap 164 and flap 168 in FIG. 24. FIG. 25a shows that the leading edges of both inboard flap 164' and intermediate flap 168' are smaller than those of the similar flaps shown in FIG. 24.

FIG. 25b shows a top view of an another embodiment in which an airfoil 82j" is connected to a flap network 162". Airfoil 82j" has a leading edge 50z", an upper surface 54z", a trailing edge 56z", a root 58z", and an outboard end 60z". Flap network 162" has an inboard flap 164", an outboard flap 166", and an intermediate flap 168". Outboard flap 166" has an inboard end 204", an outboard end 206", a leading edge 208", a trailing edge 210", and an upper surface 214". Intermediate flap 168" has an inboard end 304", an outboard end 306", a leading edge 308", a trailing edge 310", and an upper surface 314". Inboard flap 164" has an inboard end 404", an outboard end 406", a leading edge 408", a trailing edge 410", and an upper surface 414'. The method of connecting outboard end 60z' to inboard end 404", outboard end 406' to inboard end 304", and outboard end 306" to inboard end 204", is done in any suitable manner which permits movement thereof.

When comparing FIG. 25a to FIG. 25b, it can be seen that in FIG. 25b the shape of inboard flap 164" and intermediate flap 168" are both different than that of inboard flap 164' and intermediate flap 168' shown in FIG. 25a, respectively. In FIG. 35b, the shape of outboard flap 166" is similar to the shape of outboard flap 166' shown in FIG. 25a. In FIG. 25b, the alignments of inboard end 404" of inboard flap 164" and inboard end 304" of intermediate flap 168" are both less divergent than the comparable parts of the embodiment shown in FIG. 25a. In FIG. 25b, inboard flap 164" and intermediate flap 168" each have a smaller leading and trailing edges than those of the similar flaps shown in FIG. 25a.

Operation—FIG. 25

The variations displayed in FIGS. 25a and 25b offer an opportunity to better understand how slight changes in flap configurations can create a differently shaped anhedral tip droop. One of the factors that determine the possible shapes of an anhedral tip droop is the degree of divergence of each flap. The more divergent the flap, the greater its tendency to pivot in a forward direction rather than an anhedral direction. In addition, the greater the change in divergence among the flaps, the greater the degree of spanwise twisting. This is because a greater change in divergence between each flap creates a greater difference between the length of each flap's leading and trailing edges. An increase in a flap's divergence creates a proportional increase the length of the flap's leading edge in comparison to the length of its trailing edge.

By referring back to FIG. 24b, it can be seen that the change in divergence across the span of flap network 162 is significantly large. In this example, inboard flap 164 and intermediate flap 168 each have a significantly long leading edge, but do not have a trailing edge. As these flaps are pivoted anhedrally, the absence of a trailing edge prevents the trailing portions of inboard flap 164 and intermediate flap 168 from significantly pivoting below the plane of airfoil 82j. However, the long length of the leading edges on inboard flap 164 and intermediate flap 168 permit the leading portions of these two flaps to pivot significantly below the plane of airfoil 82j when these flaps are anhedrally inclined. This can be seen in FIG. 24a where the leading portions of these two flaps are more anhedrally inclined than the trailing portions. This enables flap network 162 to twist significantly along its span. The greater the divergence in a flap's pivotal axis, the greater the amount of spanwise twisting.

Referring now to FIG. 25a, it can be seen that the change in divergence across the span of flap network 162' is less than that of flap network 162 shown in FIG. 24b. In FIG. 25a, this decreases the overall difference in length existing between the leading and trailing edges of both inboard flap 166", and intermediate flap 168' (in comparison to FIG. 24b). This difference in length is equal to the length of a flap's leading edge minus the length of that flap's trailing edge. In FIG. 25a, this decreased change in divergence between the pivotal axis of each flap, causes less twisting to occur across the span of flap network 162'. Less spanwise twisting also occurs because inboard flap 164' and intermediate flap 168' pivot around less divergent axes than the similar axes shown in FIG. 24. This causes each flap to pivot in a less forward and more anhedral manner. A decreased tendency to twist allows more gradual adjustments to be made in the overall divergence, and angle of attack of the anhedral tip droop formed by flap network 162'. This is because a large increase in the anhedral orientation of inboard flap 164' and, or intermediate flap 168', produces proportionally less twisting (or change in angle of attack) across the span of flap network 162' in comparison to that produced by the embodiment in FIG. 24.

In FIG. 25a, the existence of trailing edges along the more inboard flaps of flap network 162' offer significant advantages to performance. Because inboard flap 164' and intermediate flap 168' have substantially long trailing edges, the trailing portions of these two flaps are able to pivot significantly below the plane of airfoil 82j'. This permits the overall height of the anhedral tip droop to be increased. By increasing the droop height in this manner, a greater volume of the high pressure field (not shown) existing below airfoil 82j' can be contained and compressed in a spanwise manner. Because this increases both lift and stability, increasing the height of the divergently aligned anhedral tip droop offers high levels of efficiency when airfoil 82j' is moving relative to a turbulent fluid medium. Another benefit to having a trailing edge on inboard flap 164', and a trailing edge on intermediate flap 168' is that the substantial length of each of these trailing edges enable the trailing portions of flap network 162' to have an increased radius of spanwise curvature while forming an anhedral tip droop. This increased radius of curvature along the trailing portions of flap network 162' permits the formation of a large arch shaped cavity along the underside of flap network 162'. This arch shaped cavity can be used to help create and contain a beneficial vortex. The increased size of this arch enables a larger volume of fluid to flow through it with less resistance. This can improve flow speed, power, and overall efficiency in a wide variety of applications.

In FIG. 25b, the change in divergence across the span of flap network 162" is less than that of flap network 162' shown in FIG. 25a. In FIG. 25b, the difference between the length of the leading and trailing edges on both inboard flap 164" and intermediate flap 168" are decreased in comparison to the similar parts of the embodiment shown in FIG. 25a. As a result, flap network 162" in FIG. 25b twists less across its span when each flap is pivoted anhedrally. Less spanwise twisting also occurs because each flap pivots around a less divergent axis. This causes each flap to pivot only slightly forward when pivoting anhedrally. The slight variations in divergence between each flap permit better fine tuning of the overall divergence and angle of attack existing within the anhedral tip droop formed by flap network 162". This is especially useful in high speed applications where subtle changes in tip divergence have an increased effect upon flight maneuvers and lift. In FIG. 25a, the lengths of both the leading and trailing edges on inboard flap 164" and intermediate flap 168" are decreased in comparison to the similar parts on the embodiment in FIG. 25a. In FIG. 25b, this decreases the overall radius of spanwise anhedral curvature created across the span of flap network 162" when the flaps are deployed downward. This also decreases the potential height of the anhedral tip droop formed by flap network 162".

Further embodiments of these designs can include various combinations of the different configurations shown in FIGS. 24, 25a, and 25b. The outermost flap can be made of a large number of substantially chordwise narrow flaps which have only a slight change in divergence across its span. This can permit more precise fine tuned adjustments to be made near the extreme tip of the foil for maximizing flow efficiency for a given situation. This array of flaps can also be designed so that the extreme tip region of the tip droop can curl into an anhedrally oriented corkscrew type shape in the direction of the beneficial vortex's spin. This curled form can be extremely subtle or more pronounced if desired. Such a setting can be used to increase stability in highly turbulent conditions. To form this shape, an outer flap segment, or series of segments can pivot anhedrally around at least one convergent axis (while the more inboard flaps, or segments pivot around at least one divergent axis).

Another embodiment can be an inverse of the embodiments show in FIGS. 24 and 25. Instead of having divergent flaps that pivot anhedrally, convergently aligned flaps can be used which pivot dihedrally. The more inboard flaps can be made more convergent while the more outboard flaps are made less convergent, or vice versa. These flaps can be used to initiate a gradual twist across the span of the foil so that upper surface of the flaps are the attacking surface. An increase in dihedral rise can be used at the outboard end to increase beneficial vortex production.

A combination of convergent and divergent flaps can also be used to cause a convergent dihedral rise to occur just inboard of a divergent anhedral tip droop. This can produce a arched trailing portion of the flap system for containing the beneficial vortex and its upwash field. This arrangement can also be used to create an adjustable cone shaped vortex generator (narrow end forward) at the tip of a foil.

Summary, Ramifications, and Scope

Thus the reader will see that the fluid flow control methods of the present invention enable a foil type devices to tap the power of a vortex pattern in a new manner which greatly improves performance, overcomes the disadvantages of the prior art, and achieves unexpected results. Numerous experiments demonstrate that foils employing these methods outperform all prior methods of lift enhancement by such extraordinary levels that the present invention antiquates the prior art. Using these methods, foils can be designed to duplicate and exceed the ultra-high performance levels observed in insects, birds, and finned animals.

Where the prior art and conventional aerodynamic theories consider tip generated vortices to be a source of energy loss, the methods of the present invention disclose how to form and use tip vortices as a source of energy gain.

Where the prior art and conventional aerodynamic theories unsuccessfully strive towards achieving laminar flow, the methods of the present invention demonstrate how to form and use tip generated vortices to achieve new heights of performance which cannot be achieved by laminar flow. This is because the performance characteristics created by the methods of the present invention depend upon the power of a vortex pattern. Such vortex induced performance characteristics of the present invention include:

(a) increasing lift by creating an inboard cross flow which opposes spanwise expansion of the high pressure field existing along a foil's attacking surface;

(b) increasing lift by creating an inboard cross flow from the tip of a foil which compresses the high pressure field existing along a foil's attacking surface;

(c) increasing lift by creating an upwash condition that pushes upward against a foil's attacking surface;

(d) increasing lift by creating an upwash condition which enables a foil's effective angle of attack to be greater than the foil's actual angle of attack;

(e) decreasing drag by creating an increase in a foil's effective angle of attack so that the foil's positive actual angle of attack can be significantly decreased;

(f) enabling a net increase in lift to occur when a portion of a foil is at a negative actual angle of attack;

(g) increasing lift by deflecting the flow leaving a foil's trailing edge at a increased upward angle;

(h) generating forward thrust by deflecting the flow leaving a foil's trailing edge at angle that causes the direction of lift on the foil to tilt sufficiently forward enough to derive a forward directed component from the lifting force;

(i) decreasing the net effects of surface drag and transitional flow on a foil by introducing a forward thrust component which counters such aftward directed forces;

(j) increasing efficiency by focusing the expansion of the high pressure field existing along a foil's attacking surface through the streamwise core of a sufficiently strong vortex pattern that is created inboard from the foil's tip and adjacent to the attacking surface, so that the attacking side's high pressure field expands in a significantly aftward and unidirectional manner before reaching the tip;

(k) increasing lift by creating a beneficial vortex adjacent to a foil's attacking surface, and utilizing its centrifugal force to create a net upward force against the foil;

(l) increasing stability by creating a beneficial vortex adjacent to a foil's attacking surface, and utilizing its gyroscopic inertia to stabilize the foil;

(m) increasing stability by creating a strong upwash field beneath a foil's attacking surface;

(n) eliminating induced drag on a foil by forcing a tip generated induced drag vortex to occupy a position sufficiently inboard from the tip of the foil, so that its upward flowing portion creates an upwash field that neutralizes the effects of the downwash field created by its downward flowing portion;

(o) achieving zero net induced drag even at ultra-high angles of attack;

(p) increasing lift by accelerating the rate of flow over the low pressure surface of a foil's tip region in an attached manner;

(q) preventing stall conditions at ultra-high angles of attack by maintaining attached flow over the tip region of a foil;

(r) improving maneuverability by manipulating the strength, and size of a beneficial vortex and its upwash field;

(s) increasing ease of executing maneuvers by reducing the number of control surfaces that need to be manipulated;

(t) decreasing drag created during maneuvers by reducing, or eliminating the need for use of rudder and elevator flaps, and by reducing, or eliminating unwanted yaw and pitch conditions;

(u) generating ultra-high levels of lift at both low and high flow speeds;

(v) achieving high levels of control and performance in significantly turbulent fluid mediums;

(w) efficiently restoring controlled flight to an airplane that is out of control;

(x) increasing the comfort and smoothness of an airplane's ride characteristics;

(y) increasing an airplane's flight range, glide range, and overall performance beyond the levels of the prior art; and (z) achieving unprecedented levels of power and efficiency from propulsion foils.

The methods of the present invention significantly improve the performance of foil type devices by providing increased lift, thrust, stability, control, dependability, efficiency, economy, power, maneuverability, adaptability, ease of use, and reduced levels of drag.

While my above description contains many specificities, these should not be construed as limitations on the scope of the invention, but rather as an exemplification of several preferred embodiments thereof. Many other variations are possible. For example: all of the described methods, embodiments, and variations can be combined with one another in any desired order. Existing foil technologies as well as any shaped foil or foil tip may be used in combination with the basic methods of the present invention.

Leading edge and trailing edge flaps can be used along the span of the foil to provide increased camber at higher angles of attack. The trailing edge flaps can be used to increase pressure along the foil's high pressure surface in order to feed the lift enhancing vortex pattern. This is particularly effective when these flaps pivot around a divergent axis so that they create an outboard cross flow beneath the foil that pushes air towards the vortex core. Because the beneficial vortex prevents the foil from losing control or stalling at ultra-high angles of attack, the foil's camber can be increased dramatically in order to take full advantage of such ultra-high angles of attack. These forms of accentuated camber can be pre-shaped in applications where the foil is intended to operate at a specific target angle of attack and, or target flow speed on a substantially constant basis.

A group of separate beneficial vortex generators can be used behind one another so that the upwash field is sequentially increased in a series of steps as it moves downstream. Such a group of generators can also be arranged in a substantially side by side configuration to increase the inboard cross flow below the attacking surface and, or above the low pressure surface. In addition, a beneficial vortex can be generated upstream from the foil rather than on the foil, so long as the beneficial vortex is oriented in a manner which creates desired results upon the foil. A beneficial vortex can also be formed by a vortex generator that is located downstream from the foil so that desired effects are still achieved. A beneficial vortex can be generated by a vortex generator that exists outboard of a foil's tip as well as above and, or below the plane of the foil. If desired, such generators can be mounted to a extension system which attaches to a position on the foil which is inboard from the tip, while the generator is located substantially near the tip. Multiple vortex generators can be used simultaneously in a wide variety of combinations and orientations relative to a foil to increase performance. An induced drag vortex can also be generated sufficiently inboard from a foil's tip in order to induce a beneficial vortex to form as a secondary vortex between the induced drag vortex and the foil's tip.

The lift enhancing effects of a beneficial vortex can also be used to create lift on a foil that has a zero actual angle of attack and a symmetrical airfoil shape. This permits the beneficial vortex to be the sole source of lift on the foil. A beneficial vortex can also be formed near the tip of a foil by having a reversed asymmetrical airfoil configuration existing at the tip portion of the foil. In this case the more curved surface of the airfoil shape is located adjacent to the high pressure surface of the foil. This can create a decrease in pressure along this more curved surface to cause a beneficial vortex to form near the tip of the foil.

The basic methods of the present invention can also be used on vortex generators to increase their efficiency and decrease their levels of parasitic drag. Because the beneficial vortex can increase the effective angle of attack of such generators, the actual angle of attack can be decreased to reduce surface drag, and unwanted chaotic turbulence. The overall size and aspect ratio of the vortex generators can be decreased while highly ordered vortices are produced.

Other embodiments can also use forced air, or forced fluid venting systems to generate a beneficial vortex and, or an inboard cross flow from the tip towards the attacking surface. Such forced air systems can be used in conjunction with passive vortex generators to increase the power of the beneficial vortex. The alignment of a forced air system can be oriented to aim aftward through, or towards the core of a beneficial vortex (or the cores of a multiple vortex pattern) in order to feed such vortices and increase the rate of rotation. If a streamwise vortex is already formed, a propulsion system can be aimed though the core of this vortex so that the exhaust from the propulsion system experiences less back pressure as it escapes rearwardly through the low pressure center of the vortex core. This can allow higher flow speeds to be attained with increased efficiency.

The basic methodologies of the present invention can also be used to improve performance in transonic, supersonic, and hypersonic aircraft. In these situations, the vortex formed in the shock wave around the tip of the wing can be reversed so that it curls in an inboard direction below the wing's lower surface and then upward behind the trailing edge. This can cause an upward deflection in the shockwave for increased lift and thrust. This can also be applied to control flaps to increase their efficiency. By neutralizing induced drag and producing induced thrust, high speed aircraft can significantly reduce fuel consumption. The beneficial vortex core can also be used to reduce the occurrence of extreme pressure gradients within the shock wave created near the wing tips. This can be used to significantly reduce sonic boom.

These aircraft as well as subsonic aircraft can also use feedback mechanisms near the areas affected by beneficial vortices. These devices can include air speed indicators, angle of attack indicators, flow separation indicators, and other similar devices in order to provide real-time data on the characteristics of the generated vortices. These mechanisms can be strategically located along the outboard portions of the wings to measure numerous flow characteristics such as upwash angle, cross flow strength, vortex angular velocity, etc. This can permit increased precision in flap adjustment, especially if this data is fed into a computer which is programmed to make automated adjustments.

Because the field of aerodynamics leads in the study and development of foil technologies, a majority of the embodiments in the above description are discussed in the context of airfoils. However, the fundamental methodologies, benefits and, or specific design features discussed in the above description are intended to be applicable to all foil type devices used in all fluid and fluid-like mediums. These devices include impeller blades, propeller blades, helicopter blades, turbine blades, vanes, nacelles, fans, propulsion foils, reciprocating propulsion foils, vortex generators, fluid flow controllers, fins, directional stabilizers, winglets, flap mechanisms, keels, skegs, rudders, sails, parachutes, gliders, hang gliders, kites, inflatable foils, hydrofoils, hydroplanes, ground effect devices, spoilers, swim fins, swimming aids, aerodynamic and hydrodynamic toys, flexible and semi-flexible foils, and other similar foil type devices. Accordingly, the scope of the invention should be determined not by the embodiments illustrated and discussed, but by the appended claims and their legal equivalents.

I claim:

1. A method for improving the performance of a foil type device, comprising the steps of:
   (a) providing relative movement between said foil and a fluid medium, wherein
      said relative movement occurs in a manner which creates a lifting force on said foil by forming a relative low pressure field within said fluid medium along the low pressure surface of said foil, and
      by forming a relative high pressure field within said fluid medium along the high pressure surface of said foil, and
      said lifting force on said foil is substantially directed from said high pressure field toward said low pressure field, and
   (b) providing a passive vortex generating means substantially near the tip of said foil, wherein
      said passive vortex generating means is attached with an attachment means to said foil so that said relative movement occurs between said generating means and said fluid medium to create a substantially streamwise vortex within said fluid medium substantially near said tip of said foil, and
      said passive vortex generating means is oriented relative to said foil in a manner which causes said vortex to spin in a direction which encourages said fluid medium to flow in a substantially inward spanwise direction from said tip toward said high pressure surface in an amount effective to create an increase in pressure within said high pressure field, whereby said increase in pressure substantially increases said lifting force on said foil.

2. The method of claim 1 wherein said vortex causes said fluid medium passing behind the trailing edge of said foil to experience a net deflection relative to the plane of said relative movement, and
   said deflection occurs substantially in the direction of said lifting force in an amount effective to increase the effective angle of attack of said foil.

3. The method of claim 2 wherein said net deflection causes said lifting force to tilt forward in an amount effective to create a forward directed thrust component from said lifting force.

4. The method of claim 2 wherein said net deflection causes said effective angle of attack of said foil to be greater than the actual angle of attack of said foil.

5. The method of claim 2 wherein said vortex generating means comprises an anhedral tip droop relative to said high pressure surface, wherein
   said anhedral tip droop bends around a divergent axis.

6. The method of claim 5 wherein said divergent axis causes said anhedral tip droop to have a divergent alignment relative to said relative movement, and the degree of said divergent alignment varies across the span of span of said anhedral tip droop.

7. The method of claim 6 wherein said vortex is positioned relative to said foil in a manner which causes a high pressure peak to form within said net deflection, and said high pressure peak expands substantially in said direction of said lifting force.

8. The method of claim 1 wherein said passive vortex generating means comprises an outer tip portion of said foil which is oriented at a predetermined angle of attack relative to said relative movement which causes said vortex to spin in the opposite direction of an induced drag type vortex.

9. The method of claim 1 wherein said vortex generating means comprises an anhedral tip droop relative to said high pressure surface, wherein said anhedral tip droop comprises an outboard droop surface and an inboard droop surface which terminate at an outboard end of said tip, and said outboard droop surface and said inboard droop surface are aligned relative to said relative movement in an orientation effective to cause a relative increase in pressure to occur within said fluid medium along said outboard droop surface and a relative decrease in pressure to occur within said fluid medium along said inboard droop surface so that said vortex forms adjacent to said inboard droop surface as said fluid medium flows in an inboard direction around said outboard end toward said inboard droop surface.

10. The method of claim 9 further providing a means for adjusting said orientation of at least one portion of said droop surfaces relative to said relative movement in amount effective to create changes in the flow characteristics of said vortex.

11. The method of claim 1 further providing a twist across the span of said foil, wherein said twist orients an inboard portion of said high pressure surface at a positive angle of attack relative to said relative movement, and said twist orients an outboard portion of said high pressure surface at a lower positive angle of attack than said positive angle of attack existing at said inboard portion.

12. The method of claim 11 wherein said twist orients a tip portion of said high pressure surface at a negative angle of attack relative to said relative movement.

13. The method of claim 1 wherein said vortex generating means comprises a tip portion of said high pressure surface which is oriented at a negative angle of attack relative to the direction of said relative movement.

14. The method of claim 13 further providing an anhedral tip droop relative to said high pressure surface which forms an outboard droop surface and an inboard droop surface which terminate at an outboard end of said tip.

15. The method of claim 14 wherein at least a portion of said inboard droop surface is at a negative angle of attack relative to said direction of said relative movement.

16. The method of claim 1 further providing a dihedral rise across the span of said foil.

17. The method of claim 1 further providing a containment means having attachment means for attaching to said foil, wherein said containment means is arranged to at least partially contains said vortex in a manner that permits the centrifugal force generated by said vortex to push said fluid medium against said containment means in an amount effective cause a compression within a portion of said fluid medium existing between the core of said vortex and said containment means, and said compression of said portion of said fluid medium pushes against said containment means in a direction effective to increase said lifting force upon said foil.

18. The method of claim 17 wherein said vortex is sufficiently strong enough to generate enough gyroscopic inertia within said fluid medium to create substantial resistance to changes in relative position between said vortex and said containment means.

19. The method of claim 1 wherein said attachment means has an adjustable means for adjusting said orientation of said generating means relative to said foil, and said adjustable means is arranged to permit the orientation of said generating means to be variable so that the flow characteristics of said vortex can be adjusted.

20. Utilizing a vortex pattern to improve performance of a foil:

A method for improving the performance of a foil comprising providing relative movement between said foil and a fluid medium in a manner which creates a lifting force on said foil, and generating a substantially streamwise vortex pattern within said fluid medium, wherein said vortex pattern is positioned relative to said foil in an orientation effective to cause said fluid medium behind the trailing edge of said foil to experience a deflection away from the plane of said relative movement, and said deflection occurs substantially in the direction of said lifting force, wherein said deflection causes said lifting force to tilt forward in an amount effective to create a forward thrust component from said lifting force, whereby said forward thrust component substantially reduces the net effect of drag forces on said foil.

21. The method of claim 20 wherein said vortex pattern creates an net inboard directed spanwise flow condition from the tip region of said foil towards the high pressure surface of said foil, whereby said spanwise flow condition compresses the relative high pressure field existing within said fluid medium along said high pressure surface.

22. A low drag method for reducing vortex formation near the tip of a foil, comprising the steps of:

(a) providing relative movement between said foil and a fluid medium in a manner which produces said vortex near the tip of said foil, wherein said vortex creates spanwise cross flow conditions substantially near said tip, (b) providing a control member mounted with mounting means to said tip of said foil in an orientation effective for reducing said spanwise cross flow conditions, wherein the interaction of said cross flow conditions and said member create a relative high pressure field within said fluid medium along a high pressure surface of said member and a relative low pressure field within said fluid medium along a low pressure surface of said member, and (c) reducing the angle of attack of said member relative to said cross flow conditions to achieve a substantial reduction in the pressure difference occurring between said high pressure surface and said low pressure surface in an amount effective to decrease turbulence formed along said low pressure surface near the tip portion of said member as said fluid medium flows around said tip portion from said high pressure surface toward said low pressure surface, and said decrease in turbulence significantly reduces drag on said member.

23. A method for improving the performance of a foil, comprising the steps of:
(a) providing a plane of relative movement between said foil and a fluid medium, wherein
    said relative movement occurs in a manner which permits a relative decrease in pressure to occur within said fluid medium along a low pressure surface of said foil and causes a relative increase in pressure to occur within said fluid medium along a high pressure surface of said foil, wherein
    the difference in pressure between said high pressure surface and said low pressure surface creates a lifting force on said foil, and
    said lifting force is substantially directed from said high pressure surface toward said low pressure surface,
(b) generating a beneficial vortex within said fluid medium which rotates around a substantially streamwise axis, wherein
    the direction of spin of said beneficial vortex around said streamwise axis causes said fluid medium inboard of said streamwise axis to rotate substantially in the direction of said lifting force, and
    the direction of spin of said beneficial vortex around said streamwise axis causes said fluid medium outboard of said streamwise axis to rotate substantially in the opposite direction of said lifting force, and
(c) positioning said streamwise axis at a location near said tip which permits a majority of said fluid medium inboard of said tip to rotate substantially in said direction of said lifting force, wherein
    said beneficial vortex is sufficiently strong enough to cause a substantial portion of said fluid medium behind the trailing edge of said foil to experience a deflection away from the plane of said relative movement, and
    said deflection occurs substantially in said direction of said lifting force, whereby
    said vortex creates a substantial increase in said lifting force.

24. The method of claim 23 further providing an adjustment means for varying the flow characteristics of said vortex so as to permit said deflection behind said trailing edge of said foil to be variable.

25. The method of claim 23 wherein said deflection causes said lifting force on said foil to tilt forward in an amount effective to create a forward thrust component from said lifting force.

26. The method of claim 25 further providing a streamwise directed induced drag vortex produced within said fluid medium by said relative movement, wherein
an outboard region of said induced drag vortex rotates substantially in said direction of said lifting force and an inboard region of said induced drag vortex rotates substantially in said opposite direction of said lifting force, and
said beneficial vortex forces said induced drag vortex to occupy a position that is inboard of said beneficial vortex, and
said position of said induced drag vortex causes said outboard region of said induced drag vortex to be sufficiently inboard from said tip to create an increase in said forward thrust component in an amount effective to substantially reduce the induced drag produced by said inboard region of said induced drag vortex.

27. The method of claim 26 wherein said increase in said forward thrust component occurs in an amount effective to neutralize said induced drag produced by said inboard region of said induced drag vortex.

28. The method of claim 26 wherein said positioning of said beneficial vortex permits said beneficial vortex to create an inboard spanwise flow condition within said fluid medium which flows from said tip toward said high pressure surface, whereby
    said inboard spanwise flow condition substantially increases said lifting force by increasing said pressure within said high pressure field along said high pressure surface.

29. The method of claim 28 wherein said induced drag vortex produces an outboard spanwise flow condition along said high pressure surface, and
    said outboard spanwise flow condition experiences a collision against said inboard spanwise flow condition created by said beneficial vortex in an amount effective to create an increase in pressure within said high pressure field existing along said high pressure surface, whereby
    said increase in pressure substantially increases said lifting force on said foil.

30. The method of claim 29 wherein said inboard spanwise flow condition is sufficiently strong enough to prevent said outboard spanwise flow condition from passing outboard of said tip of said foil so that said increase in pressure created by said collision expands in a substantially rearward direction behind said trailing edge of said foil at a position along the span of said foil that is substantially inboard of said tip.

31. A method for encouraging a spanwise flow condition adjacent to a surface of a foil, comprising the steps of:
(a) providing relative movement between said foil and a fluid medium so that said fluid medium flows in a substantially chordwise directed path across said surface of said foil,
(b) providing a vortex generating means for generating at least one vortex within said fluid medium, and
    said vortex generating means is attached to said surface with an attachment means which is arranged to permit said vortex generating means to generate said vortex within a predetermined height above said surface, wherein
    said vortex rotates around a substantially chordwise axis, and
    said chordwise axis substantially divides said fluid medium above said surface into
        a lower portion of said fluid medium which exists between said surface and said chordwise axis,
        an upper portion of said fluid medium which exists between said chordwise axis and said predetermined height, and
        a free stream portion of said fluid medium which exists above said predetermined height, and
(c) arranging the orientation of said generating means relative to said surface in a manner which causes said vortex to rotate around said chordwise axis in a direction that permits said upper portion of said fluid medium to flow in a predetermined spanwise direction relative to said surface in an amount effective to cause a substantial volume of said free stream portion of said fluid medium to achieve a net cross flow condition relative to said surface, wherein
    said net cross flow condition occurs substantially in said predetermined spanwise direction, and said predetermined spanwise direction is selected to improve the performance of said foil.

32. The method of claim 31 wherein said predetermined spanwise direction is oppositely directed to an undesirable spanwise flow condition within said fluid medium, and said net cross flow condition is sufficiently strong enough to substantially reduce said undesirable spanwise flow condition.

33. The method of claim 31 wherein said attachment means has an adjustment means for varying said orientation of said generating means relative to said foil in a manner which permits the flow characteristics of said vortex and said net cross flow condition to be variably controlled relative to said surface of said foil.

34. The method of claim 31 wherein said generating means comprises a passive vortex generator.

35. The method of claim 34 wherein said passive vortex generator is located substantially near the tip of said foil.

36. The method of claim 35 wherein said vortex is sufficiently strong enough to dominate over other turbulent conditions existing within said fluid medium near the outer region of said tip.

37. The method of claim 36 wherein said surface is adjacent to the high pressure surface of said foil, and said cross flow condition created by said vortex flows inboard from said tip toward said high pressure surface of said foil in an amount effective to increase pressure within said fluid medium along said high pressure surface.

38. The method of claim 36 wherein the rotational motion of said vortex applies centrifugal force against said surface in an amount effective to create a lifting force against said foil, wherein said lifting force is directed from said chordwise axis of said vortex toward said surface, whereby said lifting force significantly improves the performance of said foil.

39. The method of claim 38 wherein said rotational motion of said vortex creates gyroscopic inertia in an amount effective to permit said fluid existing within said vortex to offer increased resistance to relative changes in position between said vortex and said surface, whereby said increased resistance significantly improves the performance characteristics of said foil.

40. The method of claim 22 wherein said mounting means has adjustment means for adjusting said orientation of said member relative to said foil, and said adjustment means is arranged to permit the angle of attack of said member to be changed in a variable manner relative to said cross flow conditions existing near said tip of said foil.

41. A foil tip comprising:
(a) an inboard end having mounting means for mounting to an outboard end of a foil,
(b) said foil tip and said foil having relative movement to a fluid medium, and
(c) said foil tip having an upper surface and a lower surface relative to the plane of said relative movement, wherein
said upper surface is adjacent to the low pressure surface of said foil and said lower surface is adjacent to the high pressure surface of said foil, and
said upper surface and said lower surface bend substantially around at least one rearwardly divergent axis to form a divergent anhedral tip droop relative to said high pressure surface of said foil, wherein said upper surface transforms into an outboard droop surface existing substantially outboard of said divergent axis,
said lower surface transforms into an inboard droop surface existing substantially outboard of said divergent axis, and
said outboard droop surface and said inboard droop surface terminate at an outboard edge of said foil tip so that at least a portion of said outboard edge of said foil tip is substantially below the plane of said lower surface of said foil tip existing between said inboard end and said divergent axis, wherein said divergent axis is sufficiently divergent enough from said direction of said relative movement to cause a relative increase in pressure within said fluid medium along said outboard droop surface in an amount effective to create an inboard cross flow within said fluid medium below said outboard end of said foil tip, wherein
said inboard cross flow moves toward said high pressure surface of said foil to create an increase in pressure within said fluid medium existing along said high pressure surface of said foil.

42. The foil tip of claim 41 wherein said divergent axis is substantially divergent to the direction of said relative movement.

43. The foil tip of claim 41 wherein said divergent axis is less divergent than any aftward and outboard directed cross flow condition existing beneath said outboard end.

44. The foil tip of claim 42 wherein said foil tip has an airfoil shape in both its chordwise and spanwise dimension.

45. The foil tip of claim 41 wherein said inboard cross flow creates a lift enhancing beneficial vortex within said fluid medium, wherein said beneficial vortex spins in an inboard direction along its lower portion and spins in an outboard direction along its upper portion, and said beneficial vortex is formed adjacent to said inboard droop surface and extends in a substantially streamwise manner behind said foil tip.

46. The foil tip of claim 45 wherein said outboard end is inclined at an upward and rearward angle relative to said relative motion so that said beneficial vortex experiences an upward deflection relative to the plane of said relative movement, whereby said upward deflection increases the performance of said foil.

47. The foil tip of claim 45 wherein said outboard end of said foil tip extends rearwardly behind the trailing edge of said foil to form a trailing tip, whereby said trailing tip substantially increases the strength of said beneficial vortex.

48. The foil tip of claim 47 wherein said trailing tip has a beneficial vortex inducing twist therein.

49. The foil tip of claim 47 further including a twist across the span of said foil tip, and said twist is arranged to create a variance in the angle of attack of said foil tip relative to said relative movement between said inboard end and said trailing tip.

50. The foil tip of claim 49 further including means for permitting said variance in said angle of attack to be substantially variable between said inboard end and said trailing tip.

51. The foil tip of claim 45 wherein said beneficial vortex creates an upwash condition against said lower surface which increases fluid pressure thereof.

52. The foil tip of claim 41 further including an adjustment means for adjusting the orientation of said anhedral tip droop relative to the orientation of said foil, and said adjustment means is arranged to permit said anhedral tip droop to exert variable control over the vortex patterns created within said fluid medium near said foil tip by said relative movement.

53. The foil tip of claim 41 further including an adjustment means which is arranged to permit the contour of said foil tip to be varied relative to the orientation of said foil.

54. The foil tip of claim 41 wherein said upper surface and said lower surface bend substantially forward and downward at a leading edge portion of said foil tip to form a leading edge droop which extends below the plane of said lower surface.

55. The foil tip of claim 41 wherein at least a portion of said inboard droop surface is at a negative angle of attack relative to said relative movement.

56. The foil tip of claim 41 wherein said outboard edge is swept.

57. A flap system, comprising:
 (a) a foil having relative movement to a fluid medium in a manner which creates a lifting force on said foil,
 (b) a vortex flap having an inboard end, an outboard portion, a leading portion, a trailing portion, and two substantially opposing surfaces, and
 (c) an adjustable mounting means for mounting said inboard end of said vortex flap to the outboard end of said foil, wherein
   said adjustable mounting means is arranged to permit said vortex flap to pivot around a divergent axis, to a predetermined angle of attack thereby enabling said vortex flap to generate a vortex pattern within said fluid medium which is capable of creating a net deflection within said fluid medium behind the trailing edge of said foil, wherein said net deflection occurs substantially in the direction of said lifting force on said foil.

58. The vortex flap system of claim 57 further including an additional flap, wherein an inboard region of said additional flap is mounted to said outboard portion of said vortex flap with means which is arranged to enable the relative alignment of said additional flap to pivot relative to said alignment of said vortex flap in a variable manner.

59. The vortex flap system of claim 58 wherein said means of said additional flap is arranged to enable said additional flap to pivot around a divergent axis.

60. The vortex flap system of claim 59 wherein said adjustable mounting means of said vortex flap is arranged to enable said vortex flap to pivot around a different divergent axis.

61. The vortex flap system of claim 60 wherein said different divergent axis is more divergent than said divergent axis.

62. The vortex flap system of claim 61 further including an outboard flap, wherein an inboard portion of said outboard flap is mounted to the outboard end of said additional flap with an adjustment means for enabling the spanwise alignment of said outboard flap to pivot relative to said relative alignment of said additional flap.

63. The vortex flap of claim 62 wherein said adjustment means of said outboard flap is arranged to permit said outboard flap to pivot around a separate divergent axis.

64. The vortex flap of claim 63 wherein said separate divergent axis is less divergent than said divergent axis.

65. The vortex flap system of claim 58 wherein any one of the group containing said vortex flap and said additional flap is capable of being oriented at a negative angle of attack.

66. The vortex flap system of claim 62 wherein said outboard flap is capable of being oriented at a negative angle of attack.

* * * * *